(12) United States Patent
Kawasaki et al.

(10) Patent No.: US 8,054,731 B2
(45) Date of Patent: Nov. 8, 2011

(54) PHOTODETECTOR AND OPTICAL PICKUP APPARATUS

(75) Inventors: Ryoichi Kawasaki, Gunma (JP); Hiroyuki Shindo, Tokyo (JP)

(73) Assignees: Sanyo Electric Co., Ltd., Osaka (JP); Sanyo Optec Design Co., Ltd., Tokyo (JP)

( * ) Notice: Subject to any disclaimer, the term of this patent is extended or adjusted under 35 U.S.C. 154(b) by 792 days.

(21) Appl. No.: 11/846,419

(22) Filed: Aug. 28, 2007

(65) Prior Publication Data

US 2008/0056103 A1  Mar. 6, 2008

(30) Foreign Application Priority Data

Aug. 29, 2006  (JP) ................................. 2006-232172
Aug. 29, 2006  (JP) ................................. 2006-232173

(51) Int. Cl.
*G11B 7/00* (2006.01)
(52) U.S. Cl. ...................... 369/112.01; 369/94; 369/116
(58) Field of Classification Search .......................... None
See application file for complete search history.

(56) References Cited

U.S. PATENT DOCUMENTS

| 2007/0025228 A1* | 2/2007 | Matsubara et al. ........ 369/112.1 |
| 2009/0257340 A1 | 10/2009 | Nagata et al. |

FOREIGN PATENT DOCUMENTS

| JP | 6218502 | 1/1987 |
| JP | 08185635 | 7/1996 |
| JP | 11258544 | 9/1999 |
| JP | 2004281026 | 10/2004 |
| JP | 2005276435 | 10/2005 |
| JP | 2005298807 | 10/2005 |
| JP | 2005-346882 | 12/2005 |
| JP | 2005-353252 | 12/2005 |
| JP | 2005353252 | 12/2005 |
| JP | 2007179711 | 7/2007 |
| JP | 2008287851 | 11/2008 |
| WO | WO2007043663 | 4/2007 |

OTHER PUBLICATIONS

Nakano, Hiromasa (Japan);Application No. 2006-232172; Japanese Office Action dated Jun. 22, 2010—mailing No. 433600 (English translation) (3 pages).
Nakano, Hiromasa (Japan); Application No. 2006-232173; Japanese Office Action dated Jun. 22, 2010—mailing No. 433601 (3 pages).

* cited by examiner

*Primary Examiner* — Wayne Young
*Assistant Examiner* — Brenda Bernardi
(74) *Attorney, Agent, or Firm* — Fish & Richardson P.C.

(57) ABSTRACT

A photodetector comprising: a first light-receiving surface configured to receive reflected light of zero-order light generated based on a laser beam, from one information recording layer of a multilayer optical disc; a second light-receiving surface that is adjacent to the first light-receiving surface with a predetermined interval, the second light-receiving surface being configured to receive reflected light of diffracted light generated based on the laser beam, from the one information recording layer; and a third light-receiving surface for canceling out reflected light of the zero-order light from other information recording layer of the multilayer optical disc, received by the first light-receiving surface or the second light-receiving surface, the third light-receiving surface being configured to receive the reflected light of the zero-order light from other information recording layer.

13 Claims, 26 Drawing Sheets

PHOTODETECTOR AND OPTICAL PICKUP APPARATUS

CROSS-REFERENCE TO RELATED APPLICATIONS

This application claims the benefit of priority to Japanese Patent Application Nos. 2006-232172 and 2006-232173, both of them being filed Aug. 29, 2006, of which full contents are incorporated herein by reference.

BACKGROUND OF THE INVENTION

1. Field of the Invention

The present invention relates to a photodetector and an optical pickup apparatus.

2. Description of the Related Art

Recently, optical pickup apparatuses are widely used for reproducing or recording information from or in optical discs (CD (Compact Disc), DVD (Digital Versatile Disc), HD DVD (High Definition DVD), Blu-ray Disc®, etc.). To reproduce or record information from or in an information recording layer of the optical discs, the optical pickup apparatuses perform: tracking control based on the differential push-pull method, the three-beam method, etc.; and focus control based on the differential astigmatic method, etc., both using e.g. zero-order light and ±first-order diffracted light generated from laser beams (see, e.g., Japanese Patent Application Laid-Open Publication Nos. 2005-353252 and 2005-346882).

The tracking control based on the differential push-pull method and the focus control based on the differential astigmatic method will be descried with reference to FIG. 28. First, for example, zero-order light and ±first-order diffracted light are generated by a laser beam emitted from semiconductor laser passing through a diffraction grating, etc. The diffraction grating, etc., have diffraction efficiency that generally sets the light amount ratio between zero-order light and ±first-order diffracted light to 10 to 20:1. The zero-order light and ±first-order diffracted light pass through optical systems (polarizing beam splitter, collimator lens, objective lens, etc.) and are condensed onto and reflected by an information recording layer of an optical disc. The reflected light of the zero-order light (hereinafter, referred to as zero-order reflected light) and the reflected light of the ±first-order diffracted light (hereinafter, referred to as ±first-order reflected light) are reflected by the polarizing beam splitter, for example, and received by light-receiving surfaces of photodetectors. That is, as shown in FIG. 28, the zero-order reflected light is received by light-receiving areas A' to D' of a light-receiving surface 101 included in the photodetector, the +first-order reflected light is received by light-receiving areas E' to H' of a light-receiving surface 102 included in the photodetector, and the −first-order reflected light is received by light-receiving areas I' to L' of a light-receiving surface 103 included in the photodetector. Based on photoelectric conversion signals A' to L' corresponding to the light amounts of the reflected light of the light-receiving areas A' to L', there is performed an operation of: (photoelectric conversion signal A'+photoelectric conversion signal B')−(photoelectric conversion signal C'+photoelectric conversion signal D')−k·{(photoelectric conversion signal E'+photoelectric conversion signal F')−(photoelectric conversion signal G'+photoelectric conversion signal H')+(photoelectric conversion signal I'+photoelectric conversion signal J')−(photoelectric conversion signal K'+photoelectric conversion signal L')} (k: light amount of zero-order light/light amount of ±first-order diffracted light), thereby to detect a good tracking error signal that offsets due to lens shifts, inclination of the optical disc, etc. are removed from. There is also performed an operation of: (photoelectric conversion signal A'+photoelectric conversion signal C')−(photoelectric conversion signal B'+photoelectric conversion signal D')−k·{(photoelectric conversion signal E'+photoelectric conversion signal G')−(photoelectric conversion signal F'+photoelectric conversion signal H')+(photoelectric conversion signal I'+photoelectric conversion signal K')−(photoelectric conversion signal J'+photoelectric conversion signal L')}, thereby to detect a good focus error signal that leaking-in of the tracking error signal when crossing tracks, etc. is reduced from. Based on the tracking error signal and the focus error signal, the zero-order light can be focused on the information recording layer of the optical disc and driven to follow the track thereof, by moving the objective lens in the radial direction and the optical axis directions of the optical disc. As a result, information can favorably be reproduced or recorded from or in the optical disc.

In recent years, there are realized so-called multilayer optical discs with a plurality of information recording layers to be allowed to record more information, as compared to optical discs with only one information recording layer. The tracking control and the focus control are also necessary for the information recording layers of the multilayer optical discs to favorably reproduce or record information.

However, when the tracking control and the focus control are performed to reproduce or record information from or in one information recording layer in a multilayer optical disc, zero-order light (so-called, stray light) is generated from another information recording layer different from the one information recording layer and a tracking error signal and a focus error signal may not be detected precisely. Therefore, it may become difficult to perform good tracking control and focus control, and precise information reproduction or recording may become difficult or impossible.

With reference to FIGS. 29A, 29B, and 30, there will be described effects of stray light for reproduction and recording of information of an optical disc 100 including two information recording layers L0 and L1, for example. The information recording layer L1 of the optical disc 100 is made of a translucent reflective film to enable reproduction or recording of information for either of the information recording layers L0 and L1. Therefore, as shown in FIG. 29A, when zero-order light is condensed on the information recording layer L0, there is generated not only zero-order reflected light from the information recording layer L0 (solid line) but also zero-order reflected light from the information recording layer L1 (broken line). As shown in FIG. 29B, when zero-order light is condensed on the information recording layer L1, there is generated not only zero-order reflected light from the information recording layer L1 (solid line) but also zero-order reflected light that is obtained from zero-order light having passed through the information recording layer L1 and being reflected from the information recording layer L0 (broken line). As a result, the light-receiving surfaces 101 to 103 of the photodetector receive not only the zero-order reflected light and the ±first-order reflected light (solid lines) to be received from one information recording layer, but also the zero-order reflected light from another information layer as shown by a shaded portion within a broken line in FIG. 30. Therefore, the tracking error signal and the focus error signal based on the photoelectric conversion signals A' to L' from the light-receiving areas A' to L' become signals including a component of the zero-order reflected light from another information layer. In accordance with the zero-order reflected light from another information layer, the tracking error signal and the focus error signal may become signals having offsets and amplitude variations generated in the tracking error signal and the focus error signal not including the component of the zero-order reflected light from another information layer That is, the detected tracking error and focus error signals may not accurately reflect the displacement of the zero-order light for the one information recording layer of the optical disc 100. Especially, since the photoelectric conversion signals E' to L' from the light-receiving areas E' to L' to receive only the ±first-order reflected light are amplified (by k-times) to correct a light amount ratio between the zero-order light and the ±first-order diffracted light, the effect of the zero-order reflected light from another information recording layer may be increased and more inaccurate tracking error signal and focus error signal may be detected. As a result, it may become difficult to perform good tracking control and focus control, and precise information reproduction or recording may become difficult or impossible.

Therefore, conventional technologies shown in the above patent documents 1, 2, etc., have proposed a method of disposing a light-receiving surface for canceling out the zero-order reflected light from another information recording layer received by the light-receiving surfaces 102 and 103 separately from the light-receiving surfaces 102 and 103 for receiving the first-order diffracted light. However, in these conventional technologies, the light-receiving surface must newly be disposed for canceling out the zero-order reflected light from another information layer, which may cause increases in the number of processes, cost, complexity, size etc., of the photodetector.

SUMMARY OF THE INVENTION

A photodetector according to an aspect of the present invention, comprises: a first light-receiving surface configured to receive reflected light of zero-order light generated based on a laser beam, from one information recording layer of a multilayer optical disc; a second light-receiving surface that is adjacent to the first light-receiving surface with a predetermined interval, the second light-receiving surface being configured to receive reflected light of diffracted light generated based on the laser beam, from the one information recording layer; and a third light-receiving surface for canceling out reflected light of the zero-order light from other information recording layer of the multilayer optical disc, received by the first light-receiving surface or the second light-receiving surface, the third light-receiving surface being configured to receive the reflected light of the zero-order light from other information recording layer.

Other features of the present invention will become apparent from descriptions of this specification and of the accompanying drawings.

BRIEF DESCRIPTION OF THE DRAWINGS

For more thorough understanding of the present invention and advantages thereof, the following description should be read in conjunction with the accompanying drawings, in which.

DETAILED DESCRIPTION OF THE INVENTION

At least the following details will become apparent from descriptions of this specification and of the accompanying drawings.

==Overall Configuration of Optical Pickup Apparatus==

Figure 2:
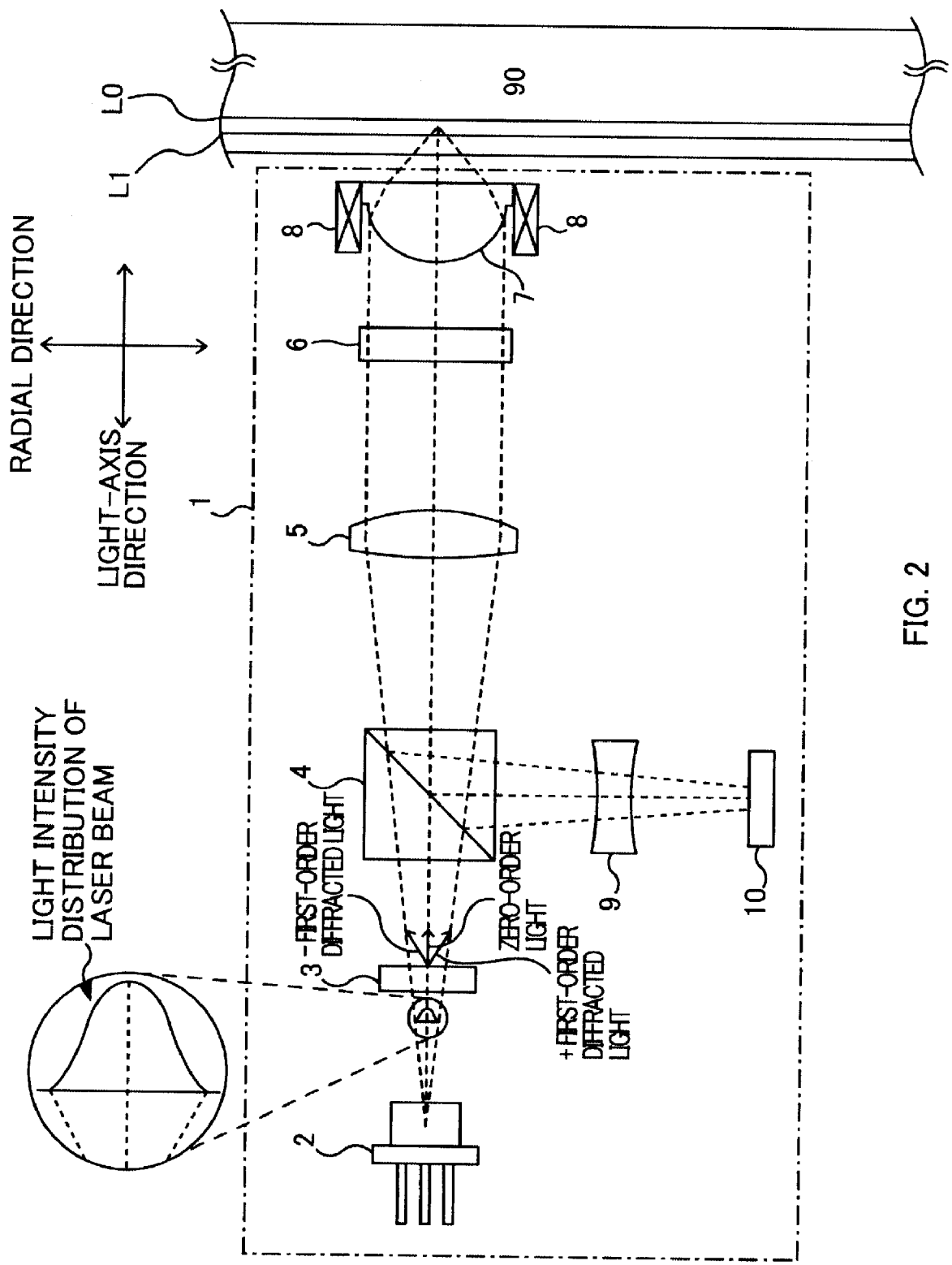
FIG. 2 is a diagram of an overall configuration of an optical pickup apparatus including the photodetector according to one embodiment of the present invention.

There will hereinafter be described an overall configuration of an optical pickup apparatus 1 including a photodetector 10 according to one embodiment of the present invention with reference to FIG. 2. FIG. 2 is a diagram of an example of an overall configuration of the optical pickup apparatus 1 including the photodetector 10 according to one embodiment of the present invention. An optical disc 90 shown in FIG. 2 will hereinafter be described, assuming that it is a Blu-ray disc including two information recording layers, i.e., an information recording layer L0 and an information recording layer L1 made of a translucent reflective film, as an example of a multilayer optical disc including a plurality of information recording layers. The optical pickup apparatus 1 will hereinafter be described, assuming that it performs, for example, the tracking control based on the differential push-pull method and the focus control based on the differential astigmatic method.

The optical pickup apparatus 1 includes a semiconductor laser 2, a diffraction grating 3, a polarizing beam splitter 4, a collimator lens 5, a quarter-wave plate 6, an objective lens 7, an actuator 8, a detection lens 9, and the photodetector 10. A front monitor diode, etc., included in a typical optical pickup apparatus are omitted in the optical pickup apparatus 1 shown in FIG. 2.

The semiconductor laser 2 is comprised of a PN junction diode formed by performing consisting of P-type semiconductor and N-type semiconductor, for example. With the application of a control voltage from a laser drive circuit (not shown), the semiconductor laser 2 emits a laser beam linearly-polarized in a predetermined direction and having a wavelength (400 nm to 410 nm) corresponding to a thickness (0.1 mm to 0.075 mm) of a protective layer to the information recording layer L0 of the optical disc 90. The light intensity distribution of the laser light is so-called Gaussian distribution (normal distribution), where the light intensity is the highest at the center and becomes lower with distance from the center as shown in a circle of FIG. 2.

The diffraction grating 3 generates, for example, zero-order light (also called main beam) and ±first-order diffracted light (diffracted light of a positive diffraction order and diffracted light of a negative diffraction order; also called (leading and following) sub-beams), based on the laser beam from the semiconductor laser 2. The diffraction grating 3 has diffraction efficiency that sets a light amount ratio between the zero-order light and the ±first-order diffracted light to 10 to 20:1, for example.

The polarizing beam splitter 4 includes a polarization film that allows the above linearly-polarized light in the predetermined direction passed therethrough and reflects to the detection lens 9 the linearly-polarized light orthogonal to the predetermined direction. Therefore, the polarizing beam splitter 4 allows the zero-order light and the ±first-order diffracted light from the diffraction grating 3 passed therethrough. The polarizing beam splitter 4 reflects to the detection lens 9 the zero-order reflected light and the ±first-order reflected light from one information recording layer that is a target of reproduction or recording of information of the optical disc 90 (L0 or L1, hereinafter, referred to as a target information recording layer). The polarizing beam splitter 4 reflects to the detection lens 9 the zero-order reflected light (hereinafter, referred to as stray light; reflected light of zero-order) and the ±first-order reflected light from another information recording layer that is not the target of reproduction or recording of information of the optical disc 90 (L1 or L0, hereinafter, referred to as non-target information recording layer). Since the light amount of the ±first-order reflected light from the non-target information recording layer of the optical disc 90 is such an amount that the detection of the tracking error signal and the focus error signal is not affected, due to the diffraction efficiency of the diffraction grating 3, non-condensing of the ±first-order diffracted light onto the non-target information recording layer, etc. Therefore, description is omitted in this embodiment.

The collimator lens 5 converts the zero-order light and the ±first-order diffracted light from the polarizing beam splitter 4 into substantially parallel lights, to be emitted to the quarter-wave plate 6. The collimator lens 5 also converts the zero-order reflected light, the ±first-order reflected light, and the stray light from the quarter-wave plate 6 into converging lights to be emitted to the polarizing beam splitter 4.

The quarter-wave plate 6 converts the linearly-polarized light in a predetermined direction into circularly-polarized light in a predetermined rotational direction with an optical axis direction set such that circularly-polarized light in a direction opposite to the predetermined rotational direction is converted into linearly-polarized light orthogonal to the predetermined direction and is configured with a birefringent sheet, a high-molecular material such as a polymer material, crystal, etc. Therefore, the quarter-wave plate 6 converts the zero-order light and the ±first-order diffracted light from the collimator lens 5 into the circularly-polarized lights in the predetermined direction. The quarter-wave plate 6 converts the zero-order reflected light, the ±first-order reflected light, and the stray light from the objective lens 7, which are circularly-polarized light in a direction opposite to the predetermined rotational direction, into the linearly-polarized lights orthogonal to the predetermined direction.

The objective lens 7 has a numerical aperture (0.85) corresponding to the specification of the optical disc 90 and is held by a holder (not shown) including a tracking control coil and a focus control coil. The objective lens 7 condenses the zero-order light and the ±first-order diffracted light from the quarter-wave plate 6 on the target information recording layer (L0 or L1) of the optical disc 90. As a result, the zero-order light and the ±first-order diffracted light are condensed on the target information recording layer (L0 or L1) of the optical disc 90 and also applied to the non-target information recording layer (L1 or L0) of the optical disc 90. Therefore, in the optical disc 90, there are generated the zero-order reflected light, the ±first-order reflected light, and the stray light, which are the circularly-polarized light in a direction opposite to the predetermined rotational direction. The objective lens 7 converts the zero-order reflected light, the ±first-order reflected light, and the stray light from the optical disc 90 into substantially parallel lights, to be emitted to the quarter-wave plate 6.

This zero-order reflected light indicates, for example, a zero-order light and ±first-order diffracted lights generated by the reflection and diffraction of a zero-order light from and on a track that is a target of reproduction or recording of information (hereinafter, referred to as target track) among spiral tracks formed on the target information recording layer (L0 and L1) of the optical disc 90. Therefore, in this embodiment, the above light is normally referred to as the zero-order reflected light. As needed, a zero-order light and ±first-order diffracted lights comprising the zero-order reflected light are referred to as zero-order reflected light of zero-order and zero-order reflected lights of ±first-order, respectively. The ±first-order reflected lights indicate, for example, a zero-order light and ±first-order diffracted lights generated by the reflection and diffraction of ±first-order diffracted lights from and on tracks opposed and adjacent to the target track (hereinafter, referred to as first adjacent track and second adjacent track) of the target information recording layer of the optical disc 90. Therefore, in this embodiment, one of the above lights is normally referred to as the +first-order reflected light. As needed, a zero-order light that the +first-order reflected light is comprised of is referred to as +first-order reflected light of zero-order (first reflected light of zero-order, fourth reflected light of zero-order), and ±first-order diffracted lights (diffracted second reflected light) that the +first-order reflected light is comprised of are referred to respectively as +first-order reflected lights of ±first-order (second reflected light of positive diffraction order, third reflected light of negative diffraction order, fifth reflected light of positive diffraction order, sixth reflected light of negative diffraction order). Similarly, the other of the above lights is normally referred to as the −first-order reflected light. As needed, a zero-order light that the −first-order reflected light is comprised of is referred to as −first-order reflected light of zero-order (first reflected light of zero-order), and ±first-order diffracted lights (diffracted second reflected light) that the −first-order reflected light is comprised of are referred to respectively as −first-order reflected lights of ±first-order (second reflected light of positive diffraction order, third reflected light of negative diffraction order, eighth reflected light of positive diffraction order, ninth reflected light of negative diffraction order).

The actuator 8 is configured with magnetic members (magnet, yoke, etc.) for tracking control, magnetic members (same as above) for focus control, a suspension wire with one end fixed to a holder that holds the objective lens 7, etc. The actuator 8 moves the objective lens 7 in the radial direction of the optical disc 90 with the magnetic action between the magnetic members and the above coil for the tracking control, which is generated by application of the control voltage based on the tracking error signal from a servo control circuit (not shown). The actuator 8 moves the objective lens 7 in the optical axis direction with the magnetic action between the magnetic members and the above coil for the focus control, which is generated by application of the control voltage based on the focus error signal from the servo control circuit (not shown).

The detection lens 9 is configured with a cylindrical lens, etc., and introduces astigmatism to the zero-order reflected light, the ±first-order reflected light, and the stray light from the polarizing beam splitter 4

The photodetector 10 includes light-receiving surfaces 11 to 13 described later and receives the zero-order reflected light, the ±first-order reflected light, and the stray light from the detection lens 9. A configuration of the photodetector 10 will hereinafter be described in detail.

==Configuration of Photodetector (1)==

Figure 1:
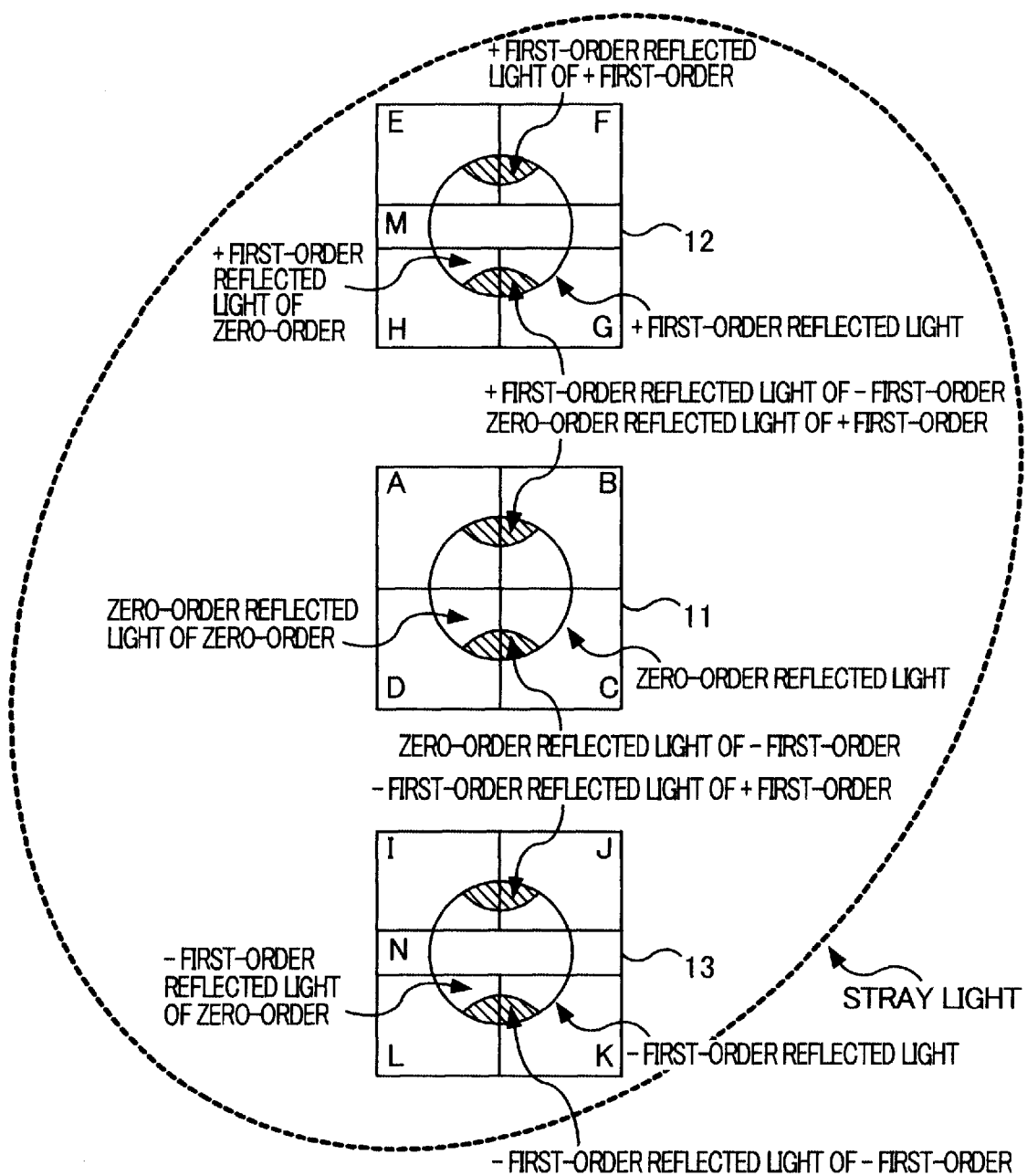
FIG. 1 is a diagram of light-receiving surfaces included in a photodetector according to one embodiment of the present invention.

A configuration of the photodetector 10 according to one embodiment of the present invention will hereinafter be described with reference to FIG. 1. FIG. 1 is a diagram of the light-receiving surfaces 11 to 13 included in the photodetector 10 according to one embodiment of the present invention. FIG. 1 shows a light receiving state where the zero-order reflected light and the ±first-order reflected light are received by the light-receiving surfaces 11 to 13 when the zero-order light is focused on and driven to follow the track of the target information recording layer (L0 or L1) of the optical disc 90.

The light-receiving surface 11 (first light-receiving surface) includes light-receiving areas A to D. The light-receiving areas A to D are formed by dividing the whole light-receiving area into four areas, such that the radial angles formed by any adjacent two thereof with respect to the center of the whole light-receiving area are the same. The dividing direction between the light-receiving areas A, B and the light-receiving areas C, D corresponds to the tangential direction of the track of the target information recording layer (L0 or L1) of the optical disc 90, and the dividing direction between the light-receiving areas A, D and the light-receiving areas B, C corresponds to the radial direction of the optical disc 90. In the light-receiving areas A and B, the light-receiving surface 11 receives the zero-order reflected light of zero-order and a portion of the zero-order reflected light of +first-order (shaded portion) among the zero-order reflected light from the target information recording layer (L0 or L1) of the optical disc 90. In the light-receiving areas C and D, the light-receiving surface 11 receives the zero-order reflected light of zero-order and a portion of the zero-order reflected light of −first-order (shaded portion) among the zero-order reflected light from the target information recording layer (L0 or L1) of the optical disc 90. In the light-receiving areas A to D, the light-receiving surface 11 receives the stray light from the non-target information recording layer (L1 or L0) of the optical disc 90. However, since the stray light received by the light-receiving surface 11 is not amplified as the stray light received by the light-receiving surfaces 12 and 13 (second light-receiving surface) is amplified, the effects of the stray light received by the light-receiving surfaces 11 on the tracking error signal and the focus error signal are smaller than that of the stray light received by the light-receiving surfaces 12 and 13. Therefore, in this embodiment, the stray light received by the light-receiving surface 11 will not be described. The light-receiving surface 11 generates photoelectric conversion signals A to D corresponding to the light amount of the zero-order reflected light received in the light-receiving areas A to D, to be output to an operation circuit 40 (see FIG. 3 described later) that generates the tracking error signal and an operation circuit 60 (see FIG. 5 described later) that generates the focus error signal in the subsequent stage.

Since the light-receiving surface 11 receives the zero-order reflected light as shown in FIG. 1 when the zero-order light is focused on and driven to follow the track of the target information recording layer (L0 or L1) of the optical disc 90, there become equal in amount: the zero-order reflected light of zero-order and a portion of the zero-order reflected light of +first-order received in the light-receiving area A; the zero-order reflected light of zero-order and a portion of the zero-order reflected light of +first-order received in the light-receiving area B; the zero-order reflected light of zero-order and a portion of the zero-order reflected light of −first-order received in the light-receiving area C; and the zero-order reflected light of zero-order and a portion of the zero-order reflected light of −first-order received in the light-receiving area D.

The light-receiving surface 12 (fourth light-receiving surface) is adjacent to the light-receiving surface 11 with a predetermined interval and includes light-receiving areas E to H and a light-receiving surface M (third light-receiving surface, sixth light-receiving surface). The dividing direction between the light-receiving areas E, F (first light-receiving area) and the light-receiving surface M corresponds to the tangential direction of the track of the information recording layers (L0 and L1) of the optical disc 90, and the dividing direction between the light-receiving area E and the light-receiving area F corresponds to the radial direction of the optical disc 90. In the light-receiving areas E and F, the light-receiving surface 12 receives the +first-order reflected light of zero-order and a portion of the +first-order reflected light of +first-order (shaded portion) among the +first-order reflected light from the target information recording layer (L0 or L1) of the optical disc 90. In the light-receiving areas E and F, the light-receiving surface 12 also receives the stray light from the non-target information recording layer (L1 or L0) of the optical disc 90. The dividing direction between the light-receiving areas G, H (second light-receiving area) and the light-receiving surface M corresponds to the tangential direction of the track of the information recording layers (L0 and L1) of the optical disc 90, and the dividing direction between the light-receiving area G and the light-receiving area H corresponds to the radial direction of the optical disc 90. In the light-receiving areas G and H, the light-receiving surface 12 receives the +first-order reflected light of zero-order and a portion of the +first-order reflected light of −first-order (shaded portion) among the +first-order reflected light from the target information recording layer (L0 or L1) of the optical disc 90. In the light-receiving areas G and H, the light-receiving surface 12 also receives the stray light from the non-target information recording layer (L1 or L0) of the optical disc 90.

The light-receiving surface M is disposed for canceling out: the stray light received by the light-receiving surface 12 in the light-receiving areas E to H; by the stray light received by the light-receiving surface M. The light-receiving surface M is disposed, for example, in substantially rectangular shape between the light-receiving areas E, F and the light-receiving areas G, H. Specifically, the light-receiving surface M is disposed such that one longitudinal side thereof contacts with the light-receiving areas E and F, the other longitudinal side thereof contacts with the light-receiving areas G and H, and width sides thereof orthogonal to one and the other longitudinal sides have lengths for avoiding the reception of: a portion of the +first-order reflected light of +first-order that should be received by the light-receiving areas E and F; and a portion of the +first-order reflected light of −first-order that should be received by the light-receiving areas G and H. The light-receiving surface M is disposed such that the center of the +first-order reflected light of zero-order when the zero-order light is focused on the track of the target information recording layer (L0 or L1) of the optical disc 90 coincides with an intersecting point of two lines, one of the two lines consisting of intermediate points (not shown) between: the dividing line of the light-receiving areas E, F and the light-receiving surface M; and the dividing line of the light-receiving areas G, H and the light-receiving surface M, the other of the two lines being an interpolation line (not shown) of: the dividing line between the light-receiving area E and the light-receiving area F; and the dividing line between the light-receiving area G and the light-receiving area H. There will hereinafter be described a reason why the light-receiving surface M is disposed in this way. When the zero-order light is displaced with respect to the track of the target information recording layer (L0 or L1) of the optical disc 90, in the tracking control based on the differential push-pull method, there are changed the light amounts of the portion of the +first-order reflected light of +first-order and of the portion of the +first-order reflected light of −first-order in accordance with a displacement amount. Since the tracking error signal is also changed in accordance with the changes in the light amounts of the portion of the +first-order reflected light of +first-order and the portion of the +first-order reflected light of −first-order, good tracking control can be performed by using the change in the tracking error signal. Therefore, it is desirable that the portion of the +first-order reflected light of +first-order and the portion of the +first-order reflected light of −first-order be received only in the light-receiving areas E to H, which are the basis of detection of the tracking error signal. Therefore, the light-receiving surface M is disposed so as to avoid the reception of the portion of the +first-order reflected light of +first-order and the portion of the +first-order reflected light of −first-order. The light-receiving surface M receives the +first-order reflected light of zero-order among the +first-order reflected light from the target information recording layer (L0 or L1) of the optical disc 90. The light-receiving surface M also receives the stray light from the non-target information recording layer (L1 or L0) of the optical disc 90 to cancel out the stray light received by the light-receiving surface 12 in the light-receiving areas E to H.

The light-receiving surface 12 generates photoelectric conversion signals E to H corresponding to the light amounts of the +first-order reflected light and the stray light received in the light-receiving areas E to H, to be output to the operation circuits 40 and 60 in the subsequent stage. The light-receiving surface M generates a photoelectric conversion signal M corresponding to the light amounts of the +first-order reflected light of zero-order and the stray light received in the light-receiving surface M, to be output to the operation circuits 40 and 60 in the subsequent stage.

Since the light-receiving surface 12 receives the +first-order reflected light as shown in FIG. 1 when the zero-order light is focused on and driven to follow the track of the target information recording layer (L0 or L1) of the optical disc 90, there become equal in amount: the +first-order reflected light of zero-order and a portion of the +first-order reflected light of +first-order received in the light-receiving area E; the +first-order reflected light of zero-order and a portion of the +first-order reflected light of +first-order received in the light-receiving area F; the +first-order reflected light of zero-order and a portion of the +first-order reflected light of −first-order received in the light-receiving area G; and the +first-order reflected light of zero-order and a portion of the +first-order reflected light of −first-order received in the light-receiving area H.

The light-receiving surface 13 (fifth light-receiving surface) is adjacent to the light-receiving surface 11 with a predetermined interval on the opposite side of the light-receiving surface 12 and includes light-receiving areas I to L and a light-receiving surface N (third light-receiving surface, seventh light-receiving surface). The dividing direction between the light-receiving areas I, J (first light-receiving area) and the light-receiving surface N corresponds to the tangential direction of the track of the information recording layers (L0 and L1) of the optical disc 90, and the dividing direction between the light-receiving area I and the light-receiving area J corresponds to the radial direction of the optical disc 90. In the light-receiving areas I and J, the light-receiving surface 13 receives the −first-order reflected light of zero-order and a portion of the −first-order reflected light of +first-order (shaded portion) among the −first-order reflected light from the target information recording layer (L0 or L1) of the optical disc 90. In the light-receiving areas I and J, the light-receiving surface 13 also receives the stray light from the non-target information recording layer (L1 or L0) of the optical disc 90. The dividing direction between the light-receiving areas K, L (second light-receiving area) and the light-receiving surface N corresponds to the tangential direction of the track of the information recording layers (L0 and L1) of the optical disc 90, and the dividing direction between the light-receiving area K and the light-receiving area L corresponds to the radial direction of the optical disc 90. In the light-receiving areas K and L, the light-receiving surface 13 receives the −first-order reflected light of zero-order and a portion of the −first-order reflected light of −first-order (shaded portion) among the −first-order reflected light from the target information recording layer (L0 or L1) of the optical disc 90. In the light-receiving areas K and L, the light-receiving surface 13 also receives the stray light from the non-target information recording layer (L1 or L0) of the optical disc 90.

The light-receiving surface N is disposed for canceling out: the stray light received by the light-receiving surface 13 in the light-receiving areas I to L; by the stray light received by the light-receiving surface N. The light-receiving surface N is disposed, for example, in substantially rectangular shape between the light-receiving areas I, J and the light-receiving areas K, L. Specifically, the light-receiving surface N is disposed such that one longitudinal side thereof contacts with the light-receiving areas I and J, the other longitudinal side thereof contacts with the light-receiving areas K and L, and width sides thereof orthogonal to one and the other longitudinal sides have lengths for avoiding the reception of: a portion of the −first-order reflected light of +first-order that should be received by the light-receiving areas I and J; and a portion of the −first-order reflected light of −first-order that should be received by the light-receiving areas K and L. The light-receiving surface N is disposed such that the center of the −first-order reflected light of zero-order when the zero-order light is focused on the track of the target information recording layer (L0 or L1) of the optical disc 90 coincides with an intersecting point of two lines, one of the two lines consisting of intermediate points (not shown) between: the dividing line of the light-receiving areas I, J and the light-receiving surface M; and the dividing line of the light-receiving areas K, L and the light-receiving surface M, the other of the two lines being an interpolation line (not shown) of: the dividing line between the light-receiving area I and the light-receiving area J; and the dividing line between the light-receiving area K and the light-receiving area L. A reason why the light-receiving surface N is disposed in this way is the same as the reason in the case of the above light-receiving surface M of the light-receiving surface 12. The light-receiving surface N receives the −first-order reflected light of zero-order among the −first-order reflected light from the target information recording layer (L0 or L1) of the optical disc 90. The light-receiving surface N also receives the stray light from the non-target information recording layer (L1 or L0) of the optical disc 90 to cancel out the stray light received by the light-receiving surface 13 in the light-receiving areas I to L.

The light-receiving surface 13 generates photoelectric conversion signals I to L corresponding to the light amounts of the −first-order reflected light and the stray light received in the light-receiving areas I to L, to be output to the operation circuits 40 and 60 in the subsequent stage. The light-receiving surface N generates a photoelectric conversion signal N corresponding to the light amounts of the −first-order reflected light of zero-order and the stray light received in the light-receiving surface N, to be output to the operation circuits 40 and 60 in the subsequent stage.

Since the light-receiving surface 13 receives the −first-order reflected light as shown in FIG. 1 when the zero-order light is focused on and driven to follow the track of the target information recording layer (L0 or L1) of the optical disc 90, there become equal in amount: the −first-order reflected light of zero-order and a portion of the −first-order reflected light of +first-order received in the light-receiving area I; the −first-order reflected light of zero-order and a portion of the −first-order reflected light of +first-order received in the light-receiving area J; the −first-order reflected light of zero-order and a portion of the −first-order reflected light of −first-order received in the light-receiving area K; and the −first-order reflected light of zero-order and a portion of the −first-order reflected light of −first-order received in the light-receiving area L.

==Cancellation of Stray Light Using Photodetector (1)==

Cancellation of the stray light based on the light reception result of the photodetector 10 according to one embodiment of the present invention will hereinafter be described with reference to FIGS. 3 to 5, and FIGS. 1 and 2 as needed.

<<When Generating Tracking Error Signal>>

Figure 3:
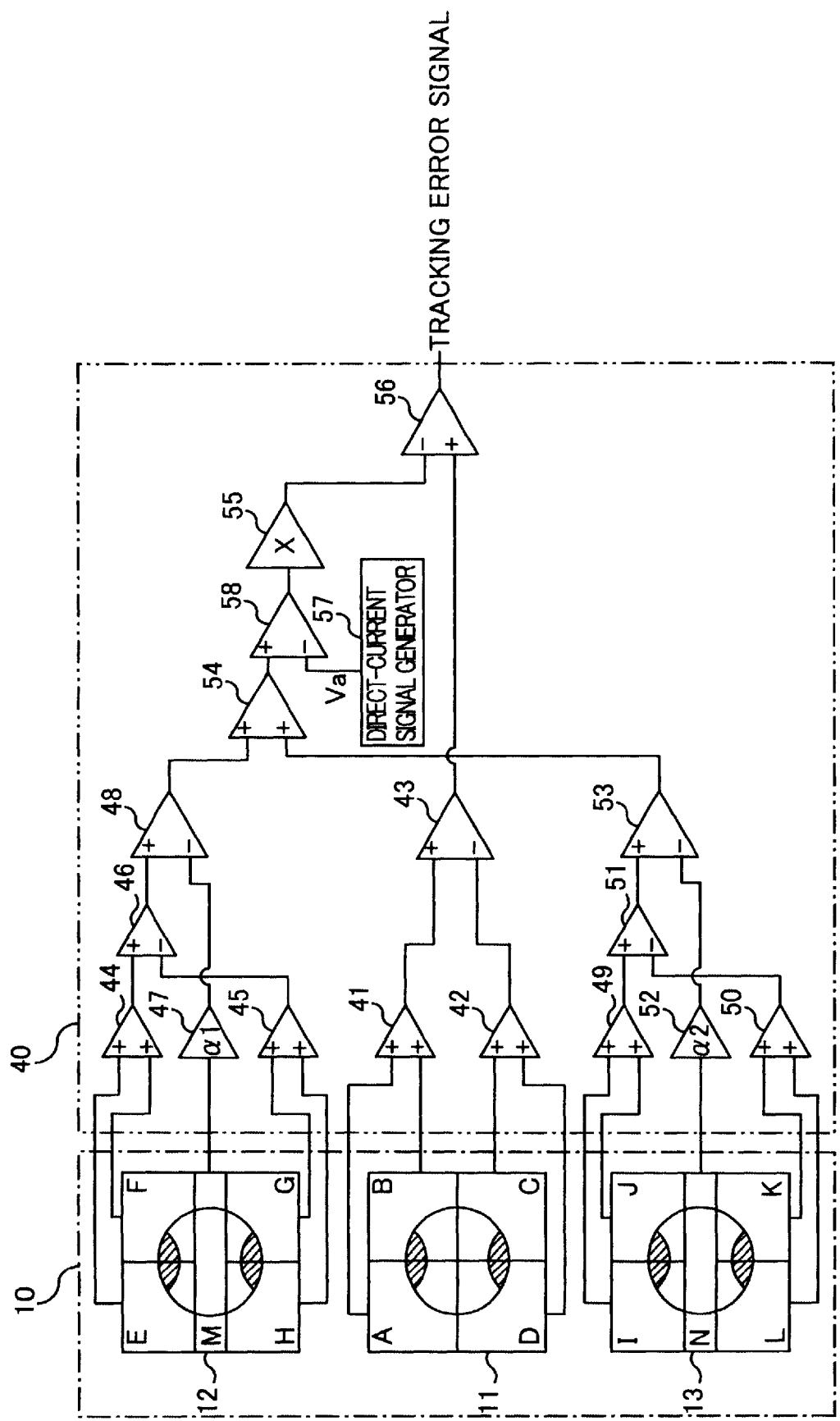
FIG. 3 is a circuit diagram of an overall configuration of an operation circuit that generates a tracking error signal.
Figure 4:
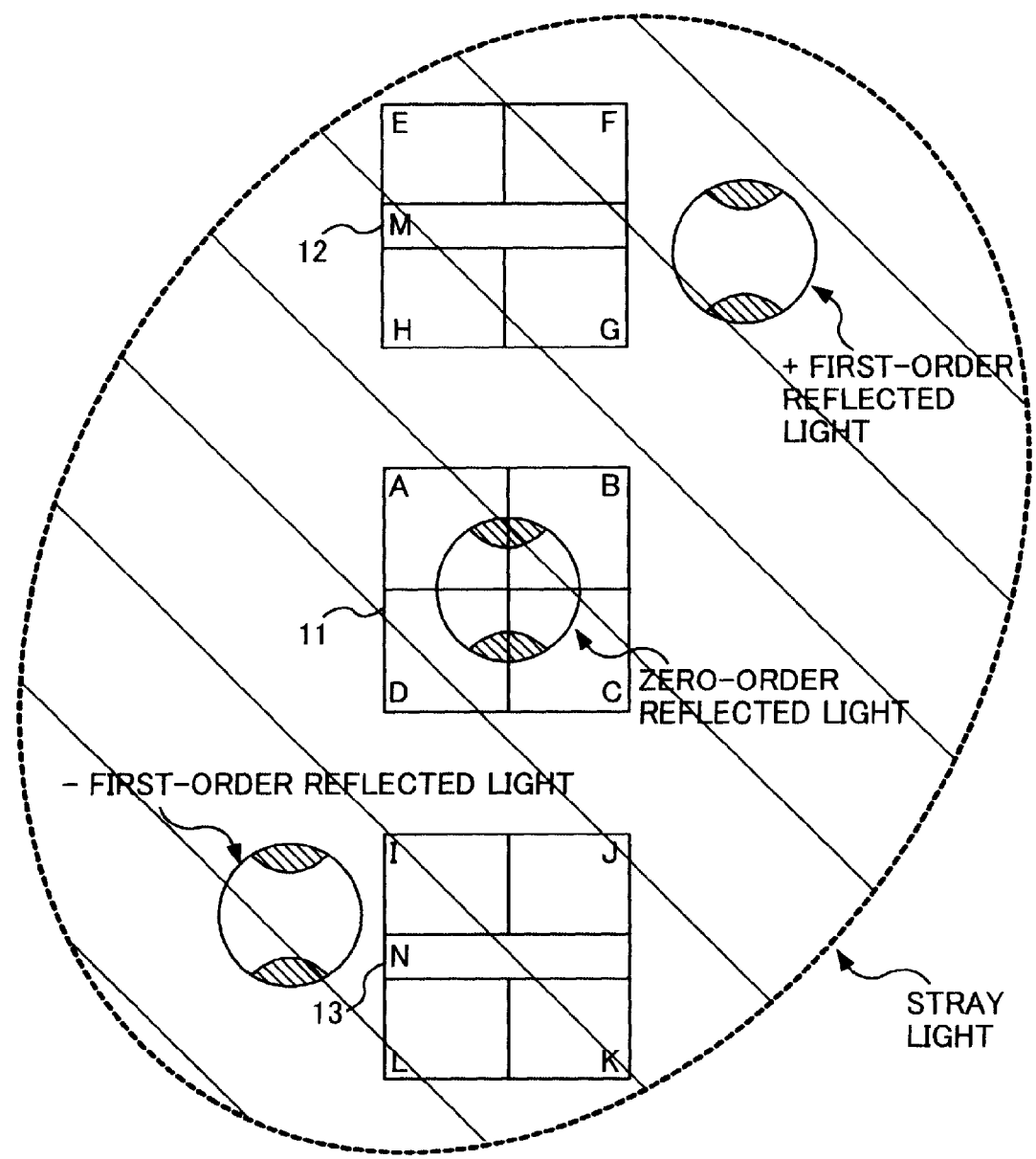
FIG. 4 is a diagram showing a state where only zero-order reflected light and stray light are received in the photodetector according to one embodiment of the present invention.

FIG. 3 is a circuit diagram of an example of an overall configuration of the operation circuit 40 that generates a tracking error signal based on the light reception result of the photodetector 10 according to one embodiment of the present invention. FIG. 4 is a diagram showing a state where only the zero-order reflected light is received in the photodetector 10 according to one embodiment of the present invention by rotating the diffraction grating 3.

The operation circuit 40 includes adders 41, 42, 44, 45, 49, 50, 54, subtracters 43, 46, 48, 51, 53, 56, 58, amplifiers 47, 52, 55, and a direct-current signal generator 57.

The adders 41, 42, and the subtracter 43 are disposed for generating a signal corresponding to the light amount of the zero-order reflected light, which is a basis of the tracking error signal. The adder 41 adds: the photoelectric conversion signal A corresponding to the light amounts of the zero-order reflected light of zero-order and a portion of the zero-order reflected light of +first-order received in the light-receiving area A of the light-receiving surface 11 of the photodetector 10; and the photoelectric conversion signal B corresponding to the light amounts of the zero-order reflected light of zero-order and a portion of the zero-order reflected light of +first-order received in the light-receiving area B.

The adder 42 adds: the photoelectric conversion signal C corresponding to the light amounts of the zero-order reflected light of zero-order and a portion of the zero-order reflected light of −first-order received in the light-receiving area C of the light-receiving surface 11 of the photodetector 10; and the photoelectric conversion signal D corresponding to the light amounts of the zero-order reflected light of zero-order and a portion of the zero-order reflected light of −first-order received in the light-receiving area D.

The subtracter 43 subtracts the addition result of the adder 42 (photoelectric conversion signal C+photoelectric conversion signal D) from the addition result of the adder 41 (photoelectric conversion signal A+photoelectric conversion signal B). As a result, the subtracter 43 outputs a signal {(photoelectric conversion signal A+photoelectric conversion signal B)−(photoelectric conversion signal C+photoelectric conversion signal D)} corresponding to the light amount of the zero-order reflected light, which is a basis of the tracking error signal.

The adders 44, 45, the subtracters 46, 48, and the amplifier 47 are disposed for generating a signal corresponding to the light amount of the +first-order reflected light with the stray light canceled out, which is a basis of the tracking error signal. The adder 44 adds: the photoelectric conversion signal E corresponding to the light amounts of the +first-order reflected light of zero-order, a portion of the +first-order reflected light of +first-order, and the stray light received in the light-receiving area E of the light-receiving surface 12 of the photodetector 10; and the photoelectric conversion signal F corresponding to the light amounts of the +first-order reflected light of zero-order, a portion of the +first-order reflected light of +first-order, and the stray light received in the light-receiving area F. In the photoelectric conversion signals E and F, the components corresponding to the light amounts of the +first-order reflected light of zero-order and a portion of the +first-order reflected light of +first-order are hereinafter referred to as photoelectric conversion signals E(1) and F(1), and the components corresponding to the light amount of the stray light are referred to as photoelectric conversion signals E(2) and F(2).

The adder 45 adds: the photoelectric conversion signal G corresponding to the light amounts of the +first-order reflected light of zero-order, a portion of the +first-order reflected light of −first-order, and the stray light received in the light-receiving area G of the light-receiving surface 12 of the photodetector 10; and the photoelectric conversion signal H corresponding to the light amounts of the +first-order reflected light of zero-order, a portion of the +first-order reflected light of −first-order, and the stray light received in the light-receiving area H. In the photoelectric conversion signals G and H, the components corresponding to the light amounts of the +first-order reflected light of zero-order and a portion of the +first-order reflected light of −first-order are hereinafter referred to as photoelectric conversion signals G(1) and H(1), and the components corresponding to the light amount of the stray light are referred to as photoelectric conversion signals G(2) and H(2).

The subtracter 46 subtracts the addition result of the adder 45 (photoelectric conversion signal G(1)+photoelectric conversion signal G(2)+photoelectric conversion signal H(1)+photoelectric conversion signal H(2)) from the addition result of the adder 44 (photoelectric conversion signal E(1)+photoelectric conversion signal E(2)+photoelectric conversion signal F(1)+photoelectric conversion signal F(2)).

The amplifier 47 amplifies at an amplification rate $\alpha 1$ the photoelectric conversion signal M corresponding to the light amounts of the +first-order reflected light of zero-order and the stray light received by the light-receiving surface M of the light-receiving surface 12 of the photodetector 10. In the photoelectric conversion signal M, the component corresponding to the light amount of the +first-order reflected light of zero-order is hereinafter referred to as a photoelectric conversion signal M(1), and the component corresponding to the light amount of the stray light is referred to as a photoelectric conversion signal M(2). This amplification rate $\alpha 1$ is set to a value at which the stray light received by the light-receiving areas E to H of the light-receiving surface 12 is canceled out by the stray light received by the light-receiving surface M. An example of setting the amplification rate $\alpha 1$ will hereinafter be described. When the diffraction grating 3 is rotated in a predetermined direction (e.g., from the top side toward the back side of the page of FIG. 2), the light-receiving surface 12 receives only the stray light in the light-receiving areas E to H and the light-receiving surface M, as shown in FIG. 4. Therefore, the photoelectric conversion signals output by the light-receiving surface 12 and the light-receiving surface M in this case are the photoelectric conversion signals E(2) to H(2) and M(2) including only the stray light components.

Therefore, the amplification rate $\alpha 1$ is set to a value satisfying the following equation:

photoelectric conversion signal $E(2)$+photoelectric conversion signal $F(2)$−photoelectric conversion signal $G(2)$−photoelectric conversion signal $H(2)$−photoelectric conversion signal $M(2) \cdot \alpha 1 = 0$.

That is, the amplification rate $\alpha 1$ is set as follows:

(photoelectric conversion signal $E(2)$+photoelectric conversion signal $F(2)$−photoelectric conversion signal $G(2)$−photoelectric conversion signal $H(2)$)/photoelectric conversion signal $M(2)$.

As a result, the amplifier 47 outputs photoelectric conversion signal M(1)·$\alpha 1$+(photoelectric conversion signal E(2)+photoelectric conversion signal F(2)−photoelectric conversion signal G(2)−photoelectric conversion signal H(2)), which is obtained by multiplying photoelectric conversion signal M(1)+photoelectric conversion signal M(2) by $\alpha 1$.

The subtracter 48 subtracts: the amplification result of the amplifier 47 {photoelectric conversion signal M(1)·$\alpha 1$+(photoelectric conversion signal E(2)+photoelectric conversion signal F(2)−photoelectric conversion signal G(2)−photoelectric conversion signal H(2))}; from the subtraction result of the subtracter 46 {(photoelectric conversion signal E(1)+photoelectric conversion signal E(2)+photoelectric conversion signal F(1)+photoelectric conversion signal F(2))−(photoelectric conversion signal G(1)+photoelectric conversion signal G(2)+photoelectric conversion signal H(1)+photoelectric conversion signal H(2)). This subtraction result of the subtracter 48 is as follows:

photoelectric conversion signal $E(1)$+photoelectric conversion signal $F(1)$−photoelectric conversion signal $G(1)$−photoelectric conversion signal $H(1)$−photoelectric conversion signal $M(1) \cdot \alpha 1$.

As shown by this equation, the subtraction result of the subtracter 48 indicates that the stray light received by the light-receiving areas E to H of the light-receiving surface 12 is canceled out by the stray light received by the light-receiving surface M. As a result, the subtracter 48 outputs the signal corresponding to the light amount of the +first-order reflected light with the stray light canceled out, which is a basis of the tracking error signal.

The adders 49, 50, the subtracters 51, 53, and the amplifier 52 are disposed for generating a signal corresponding to the light amount of the −first-order reflected light with the stray light canceled out, which is a basis of the tracking error signal. The adder 49 adds: the photoelectric conversion signal I corresponding to the light amounts of the −first-order reflected light of zero-order, a portion of the −first-order reflected light of +first-order, and the stray light received in the light-receiving area I of the light-receiving surface 13 of the photodetector 10; and the photoelectric conversion signal J corresponding to the light amounts of the −first-order reflected light of zero-order, a portion of the −first-order reflected light of +first-order, and the stray light received in the light-receiving area J. In the photoelectric conversion signals I and J, the components corresponding to the light amounts of the −first-order reflected light of zero-order and a portion of the −first-order reflected light of +first-order are hereinafter referred to as photoelectric conversion signals I(1) and J(1), and the components corresponding to the light amount of the stray light are referred to as photoelectric conversion signals I(2) and J(2).

The adder 50 adds: the photoelectric conversion signal K corresponding to the light amounts of the −first-order reflected light of zero-order, a portion of the −first-order reflected light of −first-order, and the stray light received in the light-receiving area K of the light-receiving surface 13 of the photodetector 10; and the photoelectric conversion signal L corresponding to the light amounts of the −first-order reflected light of zero-order, a portion of the −first-order reflected light of −first-order, and the stray light received in the light-receiving area L. In the photoelectric conversion signals K and L, the components corresponding to the light amounts of the −first-order reflected light of zero-order and a portion of the −first-order reflected light of −first-order are hereinafter referred to as photoelectric conversion signals K(1) and L(1), and the components corresponding to the light amount of the stray light are referred to as photoelectric conversion signals K(2) and L(2).

The subtracter 51 subtracts: the addition result of the adder 50 (photoelectric conversion signal K(1)+photoelectric conversion signal K(2)+photoelectric conversion signal L(1)+photoelectric conversion signal L(2)); from the addition result of the adder 49 (photoelectric conversion signal I(1)+photoelectric conversion signal I(2)+photoelectric conversion signal J(1)+photoelectric conversion signal J(2)).

The amplifier 52 amplifies at an amplification rate $\alpha 2$ the photoelectric conversion signal N corresponding to the light amounts of the −first-order reflected light of zero-order and the stray light received by the light-receiving surface N in the light-receiving surface 13 of the photodetector 10. In the photoelectric conversion signal N, the component corresponding to the light amount of the −first-order reflected light of zero-order is hereinafter referred to as a photoelectric conversion signal N(1), and the component corresponding to the light amount of the stray light is referred to as a photoelectric conversion signal N(2). This amplification rate $\alpha 2$ is set to a value at which the stray light received by the light-receiving areas I to L of the light-receiving surface 13 is canceled out by the stray light received by the light-receiving surface N. An example of setting the amplification rate $\alpha 2$ will hereinafter be described. When the diffraction grating 3 is rotated in a predetermined direction (e.g., from the top side toward the back side of the page of FIG. 2), the light-receiving surface 13 receives only the stray light in the light-receiving areas I to L and the light-receiving surface N, as shown in FIG. 4. Therefore, the photoelectric conversion signals output by the light-receiving surface 13 and the light-receiving surface N in this case are the photoelectric conversion signals I(2) to L(2) and N(2) including only the stray light components.

Therefore, the amplification rate $\alpha 2$ is set to a value satisfying the following equation:

photoelectric conversion signal $I(2)$+photoelectric conversion signal $J(2)$−photoelectric conversion signal $K(2)$−photoelectric conversion signal $L(2)$−photoelectric conversion signal $N(2)\cdot\alpha 2 = 0$.

That is, the amplification rate $\alpha 1$ is set as follows:

(photoelectric conversion signal $I(2)$+photoelectric conversion signal $J(2)$−photoelectric conversion signal $K(2)$−photoelectric conversion signal $L(2)$)/photoelectric conversion signal $N(2)$.

As a result, the amplifier 52 outputs photoelectric conversion signal N(1)·$\alpha 2$+(photoelectric conversion signal I(2)+photoelectric conversion signal J(2)−photoelectric conversion signal K(2)−photoelectric conversion signal L(2)), which is obtained by multiplying photoelectric conversion signal N(1)+photoelectric conversion signal N(2) by $\alpha 2$.

The subtracter 53 subtracts: the amplification result of the amplifier 52 {photoelectric conversion signal N(1)·$\alpha 2$+(photoelectric conversion signal I(2)+photoelectric conversion signal J(2)−photoelectric conversion signal K(2)−photoelectric conversion signal L (2))}; from the subtraction result of the subtracter 51 {(photoelectric conversion signal I(1)+photoelectric conversion signal I(2)+photoelectric conversion signal J(1)+photoelectric conversion signal J(2))−(photoelectric conversion signal K(1)+photoelectric conversion signal K(2)+photoelectric conversion signal L(1)+photoelectric conversion signal L(2))}. This subtraction result of the subtracter 53 is as follows:

photoelectric conversion signal $I(1)$+photoelectric conversion signal $J(1)$−photoelectric conversion signal $K(1)$−photoelectric conversion signal $L(1)$−photoelectric conversion signal $N(1)\cdot\alpha 2$.

As shown by this equation, the subtraction result of the subtracter 53 indicates that the stray light received by the light-receiving areas I to L of the light-receiving surface 13 is canceled out by the stray light received by the light-receiving surface N. As a result, the subtracter 53 outputs the signal corresponding to the light amount of the −first-order reflected light with the stray light canceled out, which is a basis of the tracking error signal.

The adder 54 adds: the subtraction result of the subtracter 48 (photoelectric conversion signal E(1)+photoelectric conversion signal F(1)−photoelectric conversion signal G(1)−photoelectric conversion signal H(1)−photoelectric conversion signal M(1)·$\alpha 1$); and the subtraction result of the subtracter 53 (photoelectric conversion signal I(1)+photoelectric conversion signal J(1)−photoelectric conversion signal K(1)−photoelectric conversion signal L(1)−photoelectric conversion signal N(1)·$\alpha 2$). As a result, the adder 54 outputs (photoelectric conversion signal E(1)+photoelectric conversion signal F(1))−(photoelectric conversion signal G(1)+photoelectric conversion signal H(1))+(photoelectric conversion signal I(1)+photoelectric conversion signal J(1))−(photoelectric conversion signal K(1)+photoelectric conversion signal L(1))−photoelectric conversion signal M(1)·$\alpha 1$−photoelectric conversion signal N(1)·$\alpha 2$.

The direct-current signal generator 57 generates a direct-current signal Va for canceling out {−photoelectric conversion signal M(1)·$\alpha 1$−photoelectric conversion signal N(1)·$\alpha 2$} of the addition results of the adder 54, to be output to the subtracter 58. Describing the direct-current signal Va in specific, the photoelectric conversion signal M(1) is a signal corresponding to the light amount of the +first-order reflected light of zero-order, which is obtained by removing the stray light components from the +first-order reflected light of zero-order and the stray light received by the light-receiving surface M. The photoelectric conversion signal M(1) is a direct-current signal having signal components unchanged since the light amount of the +first-order reflected light of zero-order is constant, irrespective of whether or not the +first-order diffracted light intersects the track of the target information recording layer (L0 or L1) of the optical disc 90. Similarly, the photoelectric conversion signal N(1) is a signal corresponding to the light amount of the −first-order reflected light of zero-order, which is obtained by removing the stray light components from the −first-order reflected light of zero-order and the stray light received by the light-receiving surface N. The photoelectric conversion signal N(1) is a direct-current signal having signal components unchanged since the light amount of the −first-order reflected light of zero-order is constant, irrespective of whether or not the −first-order diffracted light intersects the track of the target information recording layer (L0 or L1) of the optical disc 90. Therefore, the direct-current signal generator 57 generates the direct-current signal Va equivalent to {−photoelectric conversion signal M(1)·$\alpha 1$−photoelectric conversion signal N(1)·$\alpha 2$}, which is a direct-current signal. The above direct-current signal Va generated by the direct-current signal generator 57 can be obtained from actual measurement values, simulations, etc., after setting the amplification rate α1 of the amplifier 47 and the amplification rate α2 of the amplifier 52.

The subtracter 58 subtracts: the direct-current signal Va of the direct-current signal generator 57; from the addition result of the adder 54 (photoelectric conversion signal E(1)+photoelectric conversion signal F(1))−(photoelectric conversion signal G(1)+photoelectric conversion signal H(1))+(photoelectric conversion signal I(1)+photoelectric conversion signal J(1))−(photoelectric conversion signal K(1)+photoelectric conversion signal L(1))−photoelectric conversion signal M(1)·α1−photoelectric conversion signal N(1)·α2. As a result, the subtraction result of the subtracter 58 is (photoelectric conversion signal E(1)+photoelectric conversion signal F(1))−(photoelectric conversion signal G(1)+photoelectric conversion signal H(1))+(photoelectric conversion signal I(1)+photoelectric conversion signal J(1))−(photoelectric conversion signal K(1)+photoelectric conversion signal L(1)), which is obtained by the subtraction of the component of the +first-order reflected light of zero-order received by the light-receiving surface M and the component of the −first-order reflected light of zero-order received by the light-receiving surface N.

The amplifier 55 amplifies at an amplification rate X the subtraction result of the subtracter 58 (photoelectric conversion signal E(1)+photoelectric conversion signal F(1))−(photoelectric conversion signal G(1)+photoelectric conversion signal H(1))+(photoelectric conversion signal I(1)+photoelectric conversion signal J(1))−(photoelectric conversion signal K(1)+photoelectric conversion signal L(1)). The amplification rate X is a value defined to adjust a difference in light intensity between the zero-order light and the ±first-order diffracted light due to the diffraction efficiency of the diffraction grating 3. The amplifier 55 outputs X·{(photoelectric conversion signal E(1)+photoelectric conversion signal F(1))−(photoelectric conversion signal G(1)+photoelectric conversion signal H(1))+(photoelectric conversion signal I(1)+photoelectric conversion signal J(1))−(photoelectric conversion signal K(1)+photoelectric conversion signal L(1))}, to the subtracter 56.

The subtracter 56 subtracts: the amplification result of the amplifier 55 [X·{(photoelectric conversion signal E(1)+photoelectric conversion signal F(1))−(photoelectric conversion signal G(1)+photoelectric conversion signal H(1))+(photoelectric conversion signal I(1)+photoelectric conversion signal J(1))−(photoelectric conversion signal K(1)+photoelectric conversion signal L(1))}]; from the subtraction result of the subtracter 43 {(photoelectric conversion signal A+photoelectric conversion signal B)−(photoelectric conversion signal C+photoelectric conversion signal D)}, to generate a tracking error signal. The tracking error signal is {(photoelectric conversion signal A+photoelectric conversion signal B)−(photoelectric conversion signal C+photoelectric conversion signal D)}−X·{(photoelectric conversion signal E(1)+photoelectric conversion signal F(1))−(photoelectric conversion signal G(1)+photoelectric conversion signal H(1))+(photoelectric conversion signal I(1)+photoelectric conversion signal J(1))−(photoelectric conversion signal K(1)+photoelectric conversion signal L(1))}, which is a signal obtained by canceling out: the stray light received by the light-receiving areas E to H and I to L of the light-receiving surfaces 12 and 13; by the stray light received by the light-receiving surfaces M and N. That is, there is generated a tracking error signal that accurately corresponds to the displacement of the zero-order light with respect to the track of the target information recording layer (L0 or L1) of the optical disc 90.

<<When Generating Focus Error Signal>>

Figure 5:
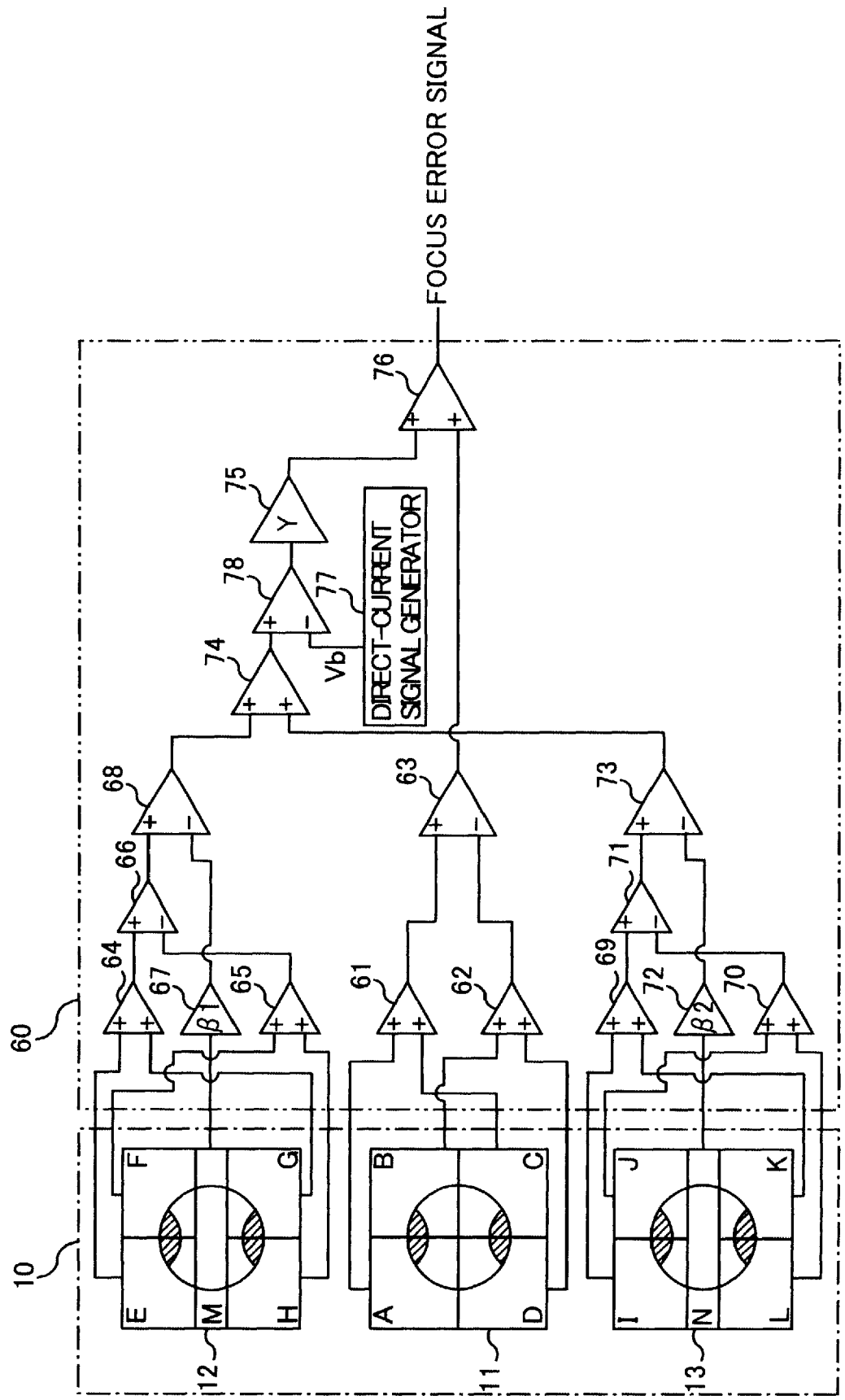
FIG. 5 is a circuit diagram of an overall configuration of an operation circuit that generates a focus error signal.

FIG. 5 is a circuit diagram of an example of an overall configuration of the operation circuit 60 that generates a focus error signal based on the light reception result of the photodetector 10 according to one embodiment of the present invention.

The operation circuit 60 includes adders 61, 62, 64, 65, 69, 70, 74, 76, subtracters 63, 66, 68, 71, 73, 78, amplifiers 67, 72, 75, and a direct-current signal generator 77.

The adders 61, 62 and the subtracter 63 are disposed for generating a signal corresponding to the light amount of the zero-order reflected light, which is a basis of the focus error signal. The adder 61 adds: the photoelectric conversion signal A corresponding to the light amounts of the zero-order reflected light of zero-order and a portion of the zero-order reflected light of +first-order received in the light-receiving area A of the light-receiving surface 11 of the photodetector 10; and the photoelectric conversion signal C corresponding to the light amounts of the zero-order reflected light of zero-order and a portion of the zero-order reflected light of −first-order received in the light-receiving area C.

The adder 62 adds: the photoelectric conversion signal B corresponding to the light amounts of the zero-order reflected light of zero-order and a portion of the zero-order reflected light of +first-order received in the light-receiving area B of the light-receiving surface 11 of the photodetector 10; and the photoelectric conversion signal D corresponding to the light amounts of the zero-order reflected light of zero-order and a portion of the zero-order reflected light of −first-order received in the light-receiving area D.

The subtracter 63 subtracts: the addition result of the adder 62 (photoelectric conversion signal B+photoelectric conversion signal D); from the addition result of the adder 61 (photoelectric conversion signal A+photoelectric conversion signal C). As a result, the subtracter 63 outputs a signal {(photoelectric conversion signal A+photoelectric conversion signal C)−(photoelectric conversion signal B+photoelectric conversion signal D)} corresponding to the light amount of the zero-order reflected light, which is a basis of the focus error signal.

The adders 64, 65, the subtracters 66, 68, and the amplifier 67 are disposed for generating a signal corresponding to the light amount of the +first-order reflected light with the stray light canceled out, which is a basis of the focus error signal. The adder 64 adds: the photoelectric conversion signal E(1) corresponding to the light amounts of the +first-order reflected light of zero-order and a portion of the +first-order reflected light of +first-order and the photoelectric conversion signal E(2) corresponding to the light amount of the stray light, received in the light-receiving area E of the light-receiving surface 12 of the photodetector 10; and the photoelectric conversion signal G(1) corresponding to the light amounts of the +first-order reflected light of zero-order and a portion of the +first-order reflected light of −first-order and the photoelectric conversion signal G(2) corresponding to the light amount of the stray light, received in the light-receiving area G.

The adder 65 adds: the photoelectric conversion signal F(1) corresponding to the light amounts of the +first-order reflected light of zero-order and a portion of the +first-order reflected light of +first-order and the photoelectric conversion signal F(2) corresponding to the light amount of the stray light, received in the light-receiving area F of the light-receiving surface 12 of the photodetector 10; and the photoelectric conversion signal H(1) corresponding to the light amounts of the +first-order reflected light of zero-order and a portion of the +first-order reflected light of −first-order and the photoelectric conversion signal H(2) corresponding to the light amount of the stray light, received in the light-receiving area H.

The subtracter 66 subtracts: the addition result of the adder 65 (photoelectric conversion signal F(1)+photoelectric conversion signal F(2)+photoelectric conversion signal H(1)+photoelectric conversion signal H(2)); from the addition result of the adder 64 (photoelectric conversion signal E(1)+photoelectric conversion signal E(2)+photoelectric conversion signal G(1)+photoelectric conversion signal G(2)).

The amplifier 67 amplifies at an amplification rate β1 the photoelectric conversion signal M(1) corresponding to the light amount of the +first-order reflected light of zero-order and the photoelectric conversion signal M(2) corresponding to the light amount of the stray light received by the light-receiving surface M of the light-receiving surface 12 of the photodetector 10. This amplification rate β1 is set to a value at which the stray light received by the light-receiving areas E to H of the light-receiving surface 12 is canceled out by the stray light received by the light-receiving surface M. An example of setting the amplification rate β1 will hereinafter described. When the diffraction grating 3 is rotated in a predetermined direction (e.g., from the top side toward the back side of the page of FIG. 2), the light-receiving surface 12 receives only the stray light in the light-receiving areas E to H and the light-receiving surface M, as described before with reference to FIG. 4. Therefore, the photoelectric conversion signals output by the light-receiving surface 12 and the light-receiving surface M in this case are the photoelectric conversion signals E(2) to H(2) and M(2) including only the stray light components.

Therefore, the amplification rate β1 is set to a value satisfying the following equation:

photoelectric conversion signal E(2)+photoelectric conversion signal G(2)−photoelectric conversion signal F(2)−photoelectric conversion signal H(2)−photoelectric conversion signal M(2)·β1=0.

That is, the amplification rate β1 is set as follows:

(photoelectric conversion signal E(2)+photoelectric conversion signal G(2)−photoelectric conversion signal F(2)−photoelectric conversion signal H(2))/photoelectric conversion signal M(2).

As a result, the amplifier 67 outputs photoelectric conversion signal M(1)·β1+(photoelectric conversion signal E(2)+photoelectric conversion signal G(2)−photoelectric conversion signal F(2)−photoelectric conversion signal H(2)), which is obtained by multiplying photoelectric conversion signal M(1)+photoelectric conversion signal M(2) by β1.

The subtracter 68 subtracts: the amplification result of the amplifier 67 {photoelectric conversion signal M(1)·β1+(photoelectric conversion signal E(2)+photoelectric conversion signal G(2)−photoelectric conversion signal F(2)−photoelectric conversion signal H(2))}; from the subtraction result of the subtracter 66 {(photoelectric conversion signal E(1)+photoelectric conversion signal E(2)+photoelectric conversion signal G(1)+photoelectric conversion signal G(2))−(photoelectric conversion signal F(1)+photoelectric conversion signal F(2)+photoelectric conversion signal H(1)+photoelectric conversion signal H(2)). This subtraction result of the subtracter 68 is as follows:

photoelectric conversion signal E(1)+photoelectric conversion signal F(1)−photoelectric conversion signal G(1)−photoelectric conversion signal H(1)−photoelectric conversion signal M(1)·β1.

As shown by this equation, the subtraction result of the subtracter 68 indicates that the stray light received by the light-receiving areas E to H of the light-receiving surface 12 is canceled out by the stray light received by the light-receiving surface M. As a result, the subtracter 68 outputs the signal corresponding to the light amount of the +first-order reflected light with the stray light canceled out, which is a basis of the focus error signal.

The adders 69, 70, the subtracters 71, 73, and the amplifier 72 are disposed for generating a signal corresponding to the light amount of the −first-order reflected light with the stray light canceled out, which is a basis of the focus error signal. The adder 69 adds: the photoelectric conversion signal I(1) corresponding to the light amounts of the −first-order reflected light of zero-order and a portion of the −first-order reflected light of +first-order and the photoelectric conversion signal I(2) corresponding to the light amount of the stray light, received in the light-receiving area I of the light-receiving surface 13 of the photodetector 10; and the photoelectric conversion signal K(1) corresponding to the light amounts of the −first-order reflected light of zero-order, a portion of the −first-order reflected light of −first-order and the photoelectric conversion signal K(2) corresponding to the light amount of the stray light, received in the light-receiving area K.

The adder 70 adds: the photoelectric conversion signal J(1) corresponding to the light amounts of the −first-order reflected light of zero-order and a portion of the −first-order reflected light of +first-order and the photoelectric conversion signal J(2) corresponding to the light amount of the stray light, received in the light-receiving area J of the light-receiving surface 13 of the photodetector 10; and the photoelectric conversion signal L(1) corresponding to the light amounts of the −first-order reflected light of zero-order and a portion of the −first-order reflected light of −first-order and the photoelectric conversion signal L(2) corresponding to the light amount of the stray light, received in the light-receiving area L.

The subtracter 71 subtracts: the addition result of the adder 70 (photoelectric conversion signal J(1)+photoelectric conversion signal J(2)+photoelectric conversion signal L(1)+photoelectric conversion signal L(2)); from the addition result of the adder 69 (photoelectric conversion signal I(1)+photoelectric conversion signal I(2)+photoelectric conversion signal K(1)+photoelectric conversion signal K(2)).

The amplifier 72 amplifies at an amplification rate β2 the photoelectric conversion signal N(1) corresponding to the light amount of the −first-order reflected light of zero-order and the photoelectric conversion signal N(2) corresponding to the light amount of the stray light, received by the light-receiving surface N in the light-receiving surface 13 of the photodetector 10. This amplification rate β2 is set to a value at which the stray light received by the light-receiving areas I to L of the light-receiving surface 13 is canceled out by the stray light received by the light-receiving surface N. An example of setting the amplification rate β2 will hereinafter be described. When the diffraction grating 3 is rotated in a predetermined direction (e.g., from the top side toward the back side of the page of FIG. 2), the light-receiving surface 13 receives only the stray light in the light-receiving areas I to K and the light-receiving surface N, as described before with reference to FIG. 4. Therefore, the photoelectric conversion signals output by the light-receiving surface 13 and the light-receiving surface N in this case are the photoelectric conversion signals I(2) to L(2) and N(2) including only the stray light components.

Therefore, the amplification rate β2 is set to a value satisfying the following equation:

photoelectric conversion signal I(2)+photoelectric conversion signal K(2)−photoelectric conversion signal J(2)−photoelectric conversion signal L(2)−photoelectric conversion signal N(2)·β2=0.

That is, the amplification rate β2 is set as follows:

(photoelectric conversion signal I(2)+photoelectric conversion signal K(2)−photoelectric conversion signal J(2)−photoelectric conversion signal L(2))/photoelectric conversion signal N(2).

As a result, the amplifier 72 outputs photoelectric conversion signal N(1)·β2+(photoelectric conversion signal I(2)+photoelectric conversion signal K(2)−photoelectric conversion signal J(2)−photoelectric conversion signal L(2)), which is obtained by multiplying photoelectric conversion signal N(1)+photoelectric conversion signal N(2) by β2.

The subtracter 73 subtracts: the amplification result of the amplifier 72 {photoelectric conversion signal N(1)·β2+(photoelectric conversion signal I(2)+photoelectric conversion signal K(2)−photoelectric conversion signal J(2)−photoelectric conversion signal L(2))}; from the subtraction result of the subtracter 71 {(photoelectric conversion signal I(1)+photoelectric conversion signal I(2)+photoelectric conversion signal K(1)+photoelectric conversion signal K(2))−(photoelectric conversion signal J(1)+photoelectric conversion signal J(2)+photoelectric conversion signal L(1)+photoelectric conversion signal L(2))}. This subtraction result of the subtracter 73 is as follows:

photoelectric conversion signal I(1)+photoelectric conversion signal K(1)−photoelectric conversion signal J(1)−photoelectric conversion signal L(1)−photoelectric conversion signal N(1)·β2.

As shown by this equation, the subtraction result of the subtracter 73 indicates that the stray light received by the light-receiving areas I to L of the light-receiving surface 13 is canceled out by the stray light received by the light-receiving surface N. As a result, the subtracter 73 outputs the signal corresponding to the light amount of the −first-order reflected light with the stray light canceled out, which is a basis of the focus error signal.

The adder 74 adds: the subtraction result of the subtracter 68 (photoelectric conversion signal E(1)+photoelectric conversion signal G (1)−photoelectric conversion signal F(1)−photoelectric conversion signal H(1)−photoelectric conversion signal M(1)·β1); and the subtraction result of the subtracter 73 (photoelectric conversion signal I(1)+photoelectric conversion signal K(1)−photoelectric conversion signal J(1)−photoelectric conversion signal L(1)−photoelectric conversion signal N(1)·β2). As a result, the adder 74 outputs (photoelectric conversion signal E(1)+photoelectric conversion signal G(1))−(photoelectric conversion signal F(1)+photoelectric conversion signal H(1))+(photoelectric conversion signal I(1)+photoelectric conversion signal K(1))−(photoelectric conversion signal J(1)+photoelectric conversion signal L(1))−photoelectric conversion signal M(1)·β1−photoelectric conversion signal N(1)·β2.

The direct-current signal generator 77 generates a direct-current signal Vb for canceling out {−photoelectric conversion signal M(1)·β1−photoelectric conversion signal N(1)·β2} of the addition result of the adder 74, to be output to the subtracter 78. Describing the direct-current signal Vb in specific, the photoelectric conversion signal M(1) is a direct-current signal corresponding to the constant light amount of the +first-order reflected light of zero-order as described above. Similarly, the photoelectric conversion signal N(1) is a direct-current signal corresponding to the constant light amount of the −first-order reflected light of zero-order as described above. Therefore, the direct-current signal generator 77 generates the direct-current signal Vb equivalent to {−photoelectric conversion signal M(1)·β1−photoelectric conversion signal N(1)·β2}, which is a direct-current signal. The above direct-current signal Vb generated by the direct-current signal generator 77 can be obtained from actual measurement values, simulations, etc., after setting the amplification rate β1 of the amplifier 67 and the amplification rate β2 of the amplifier 72.

The subtracter 78 subtracts: the direct-current signal Vb of the direct-current signal generator 77; from the addition result of the adder 74 (photoelectric conversion signal E(1)+photoelectric conversion signal G(1))−(photoelectric conversion signal F(1)+photoelectric conversion signal H(1))+(photoelectric conversion signal I(1)+photoelectric conversion signal K(1))−(photoelectric conversion signal J(1)+photoelectric conversion signal L(1))−photoelectric conversion signal M(1)·β1−photoelectric conversion signal N(1)·β2. As a result, the subtraction result of the subtracter 78 is (photoelectric conversion signal E(1)+photoelectric conversion signal G(1))−(photoelectric conversion signal F(1)+photoelectric conversion signal H(1))+(photoelectric conversion signal I(1)+photoelectric conversion signal K(1))−(photoelectric conversion signal J(1)+photoelectric conversion signal L(1)), which is obtained by the subtraction of the component of the +first-order reflected light of zero-order received by the light-receiving surface M and the component of the −first-order reflected light of zero-order received by the light-receiving surface N.

The amplifier 75 amplifies at an amplification rate Y the subtraction result of the subtracter 78 (photoelectric conversion signal E(1)+photoelectric conversion signal G(1))−(photoelectric conversion signal F(1)+photoelectric conversion signal H(1))+(photoelectric conversion signal I(1)+photoelectric conversion signal K(1))−(photoelectric conversion signal J(1)+photoelectric conversion signal L(1). The amplification rate Y is a value defined to adjust a difference in light intensity between the zero-order light and the ±first-order diffracted light due to the diffraction efficiency of the diffraction grating 3. The amplifier 75 outputs Y·{(photoelectric conversion signal E(1)+photoelectric conversion signal G(1))−(photoelectric conversion signal F(1)+photoelectric conversion signal H(1))+(photoelectric conversion signal I(1)+photoelectric conversion signal K(1))−(photoelectric conversion signal J(1)+photoelectric conversion signal L(1))}, to the subtracter 76.

The adder 76 adds: the subtraction result of the subtracter 63 {(photoelectric conversion signal A+photoelectric conversion signal C)−(photoelectric conversion signal B+photoelectric conversion signal D)}; and the amplification result of the amplifier 75 [Y·{(photoelectric conversion signal E(1)+photoelectric conversion signal G(1))−(photoelectric conversion signal F(1)+photoelectric conversion signal H(1))+(photoelectric conversion signal I(1)+photoelectric conversion signal K(1))−(photoelectric conversion signal J(1)+photoelectric conversion signal L(1))}], to generate a focus error signal. The focus error signal is {(photoelectric conversion signal A+photoelectric conversion signal C)−(photoelectric conversion signal B+photoelectric conversion signal D)}+Y·{(photoelectric conversion signal E(1)+photoelectric conversion signal G(1))−(photoelectric conversion signal F(1)+photoelectric conversion signal H(1))+(photoelectric conversion signal I(1)+photoelectric conversion signal K(1))−(photoelectric conversion signal J(1)+photoelectric conversion signal L(1))}, which is a signal obtained by canceling out: the stray light received by the light-receiving areas E to H and I to L of the light-receiving surfaces 12 and 13; with the stray light received by the light-receiving surfaces M and N. That is, there is generated a focus error signal that accurately corresponds to the displacement of the zero-order light with respect to the track of the target information recording layer (L0 or L1) of the optical disc 90. As a result, the zero-order light can accurately be condensed on one information recording layer (L0 or L1) of the optical disc 90 and information can favorably be reproduced from or recorded in the optical disc 90 by performing the focus control based on this focus error signal and the tracking control based on the above tracking error signal.

According to the above embodiment, the stray light from the other information recording layer (L1 or L0) received by the light-receiving surfaces 12 and 13 can be canceled out and the zero-order light can accurately be condensed on one information recording layer (L0 or L1) of the optical disc 90. Since the light-receiving surfaces M and N are included in a portion of the light-receiving surfaces 12 and 13, the increases in size, costs, etc., can be prevented or alleviated in the optical detecting apparatus 10.

By being disposed on areas other than areas for receiving portions of the ±first-order diffracted light of ±first-order in the light-receiving surfaces 12 and 13, the light-receiving surfaces M and N can avoid receiving portions of the ±first-order diffracted light of ±first-order, which light is the most important for detecting the tracking error signal based on the differential push-pull method, for example. As a result, an accurate tracking error signal based on the differential push-pull method can be detected, and the zero-order light can accurately be condensed on one information recording layer (L0 or L1) of the optical disc 90.

Since the light-receiving surface M and the light-receiving surface N are disposed on the light-receiving surface 12 and the light-receiving surface 13, respectively, the cancellation can appropriately be performed for the stray light from the other information recording layer (L1 or L0) received by the light-receiving surface 12 and for the stray light from the other information recording layer received by the light-receiving surface 13. As a result, more accurate tracking error signal and focus error signal can be detected based on the reception results of the light-receiving surfaces 12 and 13, and the zero-order light can more accurately be condensed on one information recording layer (L0 or L1) of the optical disc 90.
==Configuration of Photodetector (2)==

Figure 6:
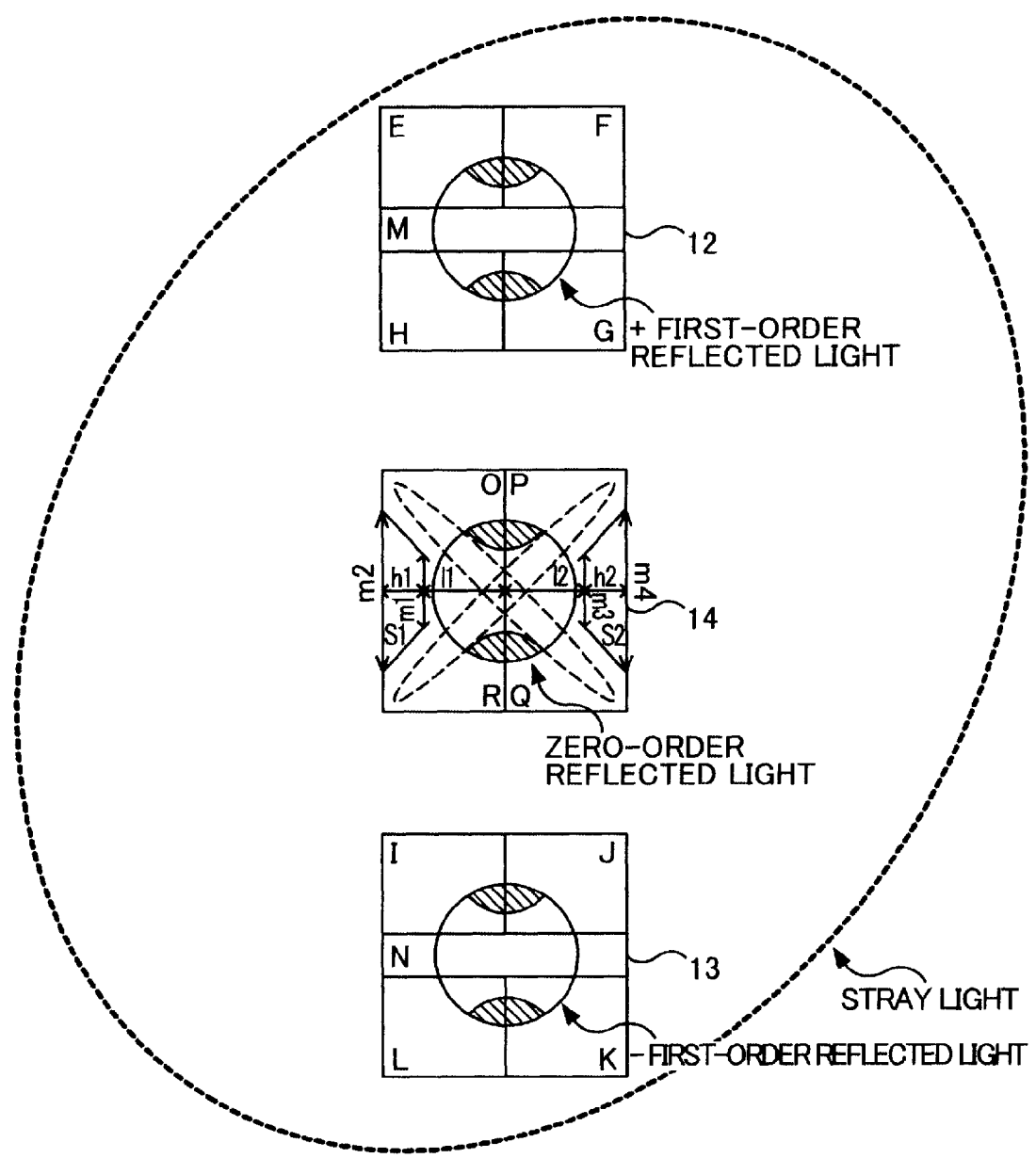
FIG. 6 is a diagram of the light-receiving surfaces included in the photodetector according to one embodiment of the present invention.

The configuration of the photodetector 10 according to one embodiment of the present invention will be described with reference to FIG. 6, and FIG. 1 as needed. FIG. 6 is a diagram of the light-receiving surfaces 12 to 14 included in the photodetector 10 according to one embodiment of the present invention. In the light-receiving surfaces 12 to 14 of FIG. 6, the same reference numerals are added to the same constituent elements as those in FIG. 1 and the description thereof will be omitted.

The light-receiving surface 14 (first light-receiving surface) includes light-receiving areas O to R, light receiving surfaces S1 (third light-receiving surface) and S2 (third light-receiving surface).

In the light-receiving areas O and P, the dividing direction between the light-receiving areas O, P and the light-receiving areas Q, R corresponds to the tangential direction of the track of the target information recording layer (L0 or L1) of the optical disc 90, and the dividing direction between the light-receiving area O and light-receiving area P corresponds to the radial direction of the optical disc 90. Also in the light-receiving areas O and P, the light-receiving surface 14 receives the zero-order reflected light of zero-order and a portion of the zero-order reflected light of +first-order (shaded portion) among the zero-order reflected light from the target information recording layer (L0 or L1) of the optical disc 90. In the light-receiving areas O to P, the light-receiving surface 14 receives the stray light from the non-target information recording layer (L1 or L0) of the optical disc 90.

In the light-receiving areas Q and R, the dividing direction between the light-receiving areas Q, R and the light-receiving areas O, P corresponds to the tangential direction of the track of the target information recording layer (L0 or L1) of the optical disc 90, and the dividing directions between the light-receiving area Q and light-receiving area R corresponds to the radial direction of the optical disc 90. Also in the light-receiving areas Q and R, the light-receiving surface 14 receives the zero-order reflected light of zero-order and a portion of the zero-order reflected light of −first-order (shaded portion) among the zero-order reflected light from the target information recording layer (L0 or L1) of the optical disc 90. In the light-receiving areas Q and R, the light-receiving surface 14 receives the stray light from the non-target information recording layer (L1 or L0) of the optical disc 90.

The light-receiving surfaces S1 and S2 are disposed for canceling out the stray light received by the light-receiving surface 14 in the light-receiving areas O to R by the stray light received by the light-receiving surfaces S1 and S2. In the whole light-receiving area of the light-receiving surface 14 in square shape, the light-receiving surfaces S1 and S2 are disposed on areas other than areas where the zero-order reflected light of zero-order is changed (from a solid line to broken lines, or from the broken lines to the solid line) since astigmatism is introduced into the zero-order reflected light. Therefore, the light-receiving surface S1 is disposed, for example, in trapezoidal shape between the light-receiving area O and the light-receiving area R. Specifically, a height h1 of the light-receiving surface S1 in trapezoidal shape is set such that a length l1 of the boundary line between the light-receiving area O and light-receiving area R becomes longer than the radius of the zero-order reflected light of zero-order (solid line). Lengths m1 and m2 of the upper and lower sides of the light-receiving surface S1 in trapezoidal shape are set so as not to intersect the zero-order reflected light of zero-order (broken lines) changed in shape due to the introduction of astigmatism. The light-receiving surface S2 is disposed, for example, in trapezoidal shape between the light-receiving areas P and Q. Specifically, a height h2 of the light-receiving surface S2 in trapezoidal shape is set such that a length l2 of the boundary line between the light-receiving areas P and Q becomes longer than the radius of the zero-order reflected light of zero-order (solid line). Lengths m3 and m4 of the upper and lower sides of the light-receiving surface S2 in trapezoidal shape are set so as not to intersect the zero-order reflected light of zero-order (broken lines) changed in shape due to the introduction of astigmatism. The light-receiving surfaces S1 and S2 receive the stray light from the non-target information recording layer (L1 or L0) of the optical disc 90.

The light-receiving surface 14 generates photoelectric conversion signals O to R corresponding to the light amounts of the zero-order reflected light and the stray light received in the light-receiving areas O to R, to be output to an operation circuit 80 (see FIG. 7 described later) that generates a reproduction signal in the subsequent stage. The light-receiving surfaces S1 and S2 generate photoelectric conversion signals S1 and S2 corresponding to the light amount of the received stray light, to be output to the operation circuit 80 in the subsequent stage.

Since the light-receiving surface 14 receives the zero-order reflected light as shown in FIG. 6 when the zero-order light is focused on and driven to follow the track of the target information recording layer (L0 or L1) of the optical disc 90, there become equal in light amount: the zero-order reflected light of zero-order and a portion of the zero-order reflected light of +first-order received in the light-receiving area O; the zero-order reflected light of zero-order and a portion of the zero-order reflected light of +first-order received in the light-receiving area P; the zero-order reflected light of zero-order and a portion of the zero-order reflected light of −first-order received in the light-receiving area Q; and the zero-order reflected light of zero-order and a portion of the zero-order reflected light of −first-order received in the light-receiving area R.

==Cancellation of Stray Light Using Photodetector (2)==

Cancellation of the stray light based on the light reception result of the photodetector 10 according to one embodiment of the present invention will be described with reference to FIG. 7, and FIG. 6 as needed.

Figure 7:
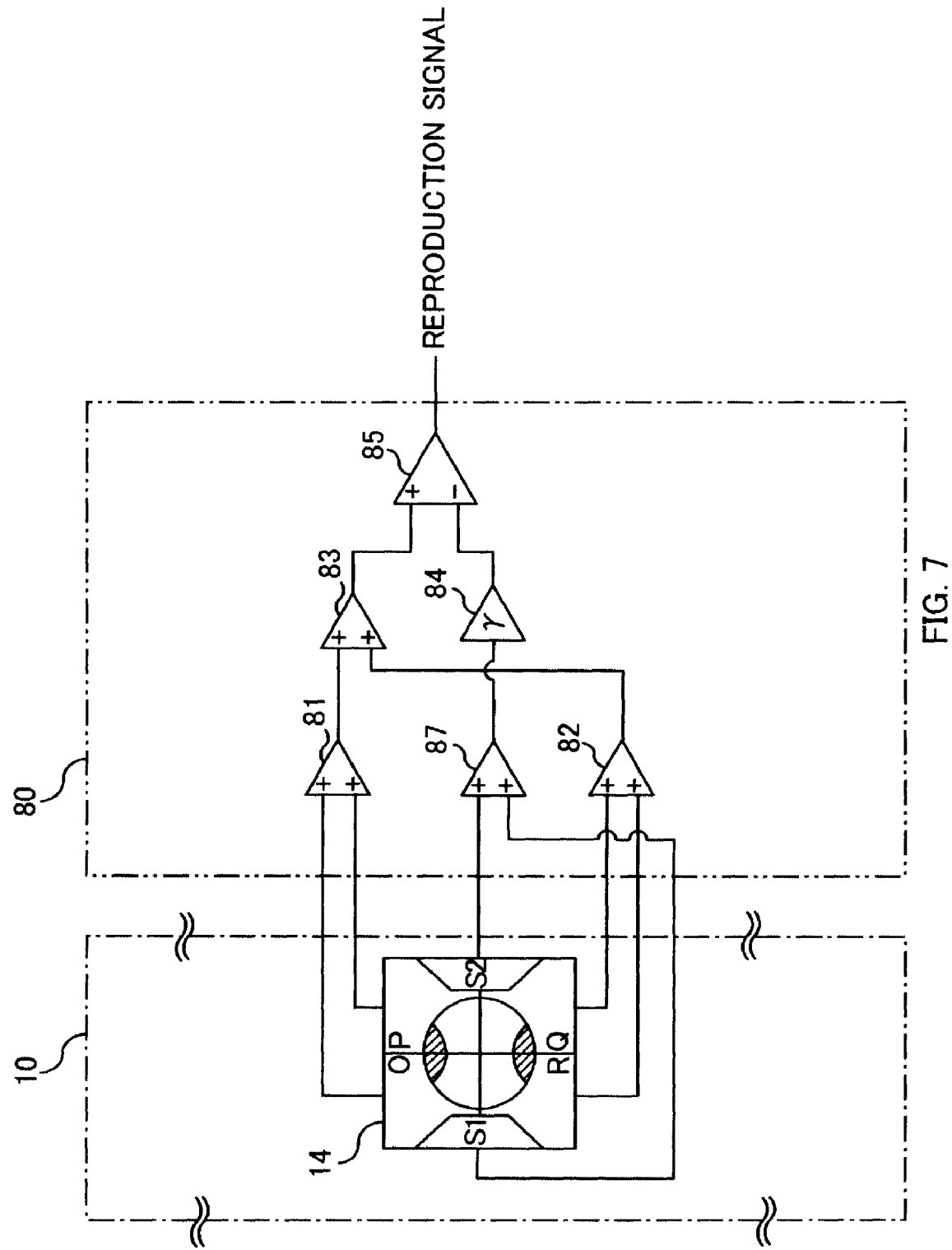
FIG. 7 is a circuit diagram of an overall configuration of an operation circuit that generates a reproduction signal.

FIG. 7 is a circuit diagram of an example of an overall configuration of the operation circuit 80 that generates a reproduction signal based on the light reception result of the photodetector 10 according to one embodiment of the present invention.

The operation circuit 80 includes adders 81 to 83, 87, an amplifier 84, a subtracter 85.

The adders 81 to 83 are disposed for generating a reproduction signal corresponding to the light amount of the zero-order reflected light including the stray light. The adder 81 adds: the photoelectric conversion signal O corresponding to the light amounts of the zero-order reflected light of zero-order, a portion of the zero-order reflected light of +first-order, and the stray light, received in the light-receiving area O of the light-receiving surface 14 of the photodetector 10; and the photoelectric conversion signal P corresponding to the light amounts of the zero-order reflected light of zero-order, a portion of the zero-order reflected light of +first-order, and the stray light received in the light-receiving area P. In the photoelectric conversion signals O and P, the components corresponding to the light amounts of the zero-order reflected light of zero-order and a portion of the zero-order reflected light of +first-order are hereinafter referred to as photoelectric conversion signals O(1) and P(1), and the components corresponding to the light amount of the stray light are referred to as photoelectric conversion signals O(2) and P(2).

The adder 82 adds: the photoelectric conversion signal Q corresponding to the light amounts of the zero-order reflected light of zero-order, a portion of the zero-order reflected light of −first-order, and the stray light received in the light-receiving area Q of the light-receiving surface 14 of the photodetector 10; and the photoelectric conversion signal R corresponding to the light amounts of the zero-order reflected light of zero-order, a portion of the zero-order reflected light of −first-order, and the stray light received in the light-receiving area R. In the photoelectric conversion signals Q and R, the components corresponding to the light amounts of the zero-order reflected light of zero-order and a portion of the zero-order reflected light of −first-order are hereinafter referred to as photoelectric conversion signals Q(1) and R(1), and the components corresponding to the light amount of the stray light are referred to as photoelectric conversion signals Q(2) and R(2).

The adder 83 adds: the addition result of the adder 81 (photoelectric conversion signal O(1)+photoelectric conversion signal O(2)+photoelectric conversion signal P(1)+photoelectric conversion signal P(2)); and the addition result of the adder 82 (photoelectric conversion signal Q(1)+photoelectric conversion signal Q(2)+photoelectric conversion signal R(1)+photoelectric conversion signal R(2)). As a result, the adder 83 outputs the reproduction signal (photoelectric conversion signal O(1)+photoelectric conversion signal O(2)+photoelectric conversion signal P(1)+photoelectric conversion signal P(2)+photoelectric conversion signal Q(1)+photoelectric conversion signal Q(2)+photoelectric conversion signal R(1)+photoelectric conversion signal R(2)), which corresponds to the light amount of the zero-order reflected light including the stray light.

The adder 87 adds: a photoelectric conversion signal S1 corresponding to the light amount of the stray light received by the light-receiving surface S1 of the light-receiving surface 14 of the photodetector 10; and a photoelectric conversion signal S2 corresponding to the light amount of the stray light received by the light-receiving surface S2.

The amplifier 84 amplifies the additional result of the adder 87 (photoelectric conversion signal S1+photoelectric conversion signal S2) at an amplification rate γ. This amplification rate γ is set to a value at which the stray light received by the light-receiving areas O to R of the light-receiving surface 14 is cancels out by the stray light received by the light-receiving surfaces S1 and S2. An example of setting the amplification rate γ will hereinafter be described. The light-receiving areas O to R and the light-receiving surfaces S1 and S2 of the light-receiving surface 14 are driven to receive only the stray light. The photoelectric conversion signals output by the light-receiving surface 14 and the light-receiving surfaces S1 and S2 in this case are the photoelectric conversion signals O(2) to R(2), S1, and S2 including only the stray light components.

Therefore, the amplification rate γ is set to a value satisfying the following equation:

photoelectric conversion signal $O(2)$+photoelectric conversion signal $P(2)$+photoelectric conversion signal $Q(2)$+photoelectric conversion signal $R(2)$−(photoelectric conversion signal $S1$+photoelectric conversion signal $S2$)·γ=0.

That is, the amplification rate γ is set as follows:

(photoelectric conversion signal $O(2)$+photoelectric conversion signal $P(2)$+photoelectric conversion signal $Q(2)$+photoelectric conversion signal $R(2)$)/(photoelectric conversion signal $S1$+photoelectric conversion signal $S2$).

As a result, the amplifier 84 outputs photoelectric conversion signal O(2)+photoelectric conversion signal P(2)+photoelectric conversion signal Q(2)+photoelectric conversion signal R(2), which is obtained by multiplying photoelectric conversion signal S1+photoelectric conversion signal S2 by γ.

The subtracter 85 subtracts: the amplification result of the amplifier 84 (photoelectric conversion signal O(2)+photoelectric conversion signal P(2)+photoelectric conversion signal Q(2)+photoelectric conversion signal R(2)); from the addition result of the adder 83 (photoelectric conversion signal O(1)+photoelectric conversion signal O(2)+photoelectric conversion signal P(1)+photoelectric conversion signal P(2)+photoelectric conversion signal Q(1)+photoelectric conversion signal Q(2)+photoelectric conversion signal R(1)+photoelectric conversion signal R(2)). This subtraction result of the subtracter 85 is as follows:

photoelectric conversion signal $O(1)$+photoelectric conversion signal $P(1)$+photoelectric conversion signal $Q(1)$+photoelectric conversion signal $R(1)$.

As shown by this equation, the subtraction result of the subtracter 85 indicates that the stray light received by the light-receiving areas O to R of the light-receiving surface 14 is canceled out by the stray light received by the light-receiving surfaces S1 and S2. As a result, the subtracter 85 outputs the reproduction signal corresponding to the light amount of the zero-order reflected light with the stray light canceled out. As a result, information can favorably be reproduced from or recorded in the target information recording layer (L0 or L1) of the optical disc 90.

Figure 8:
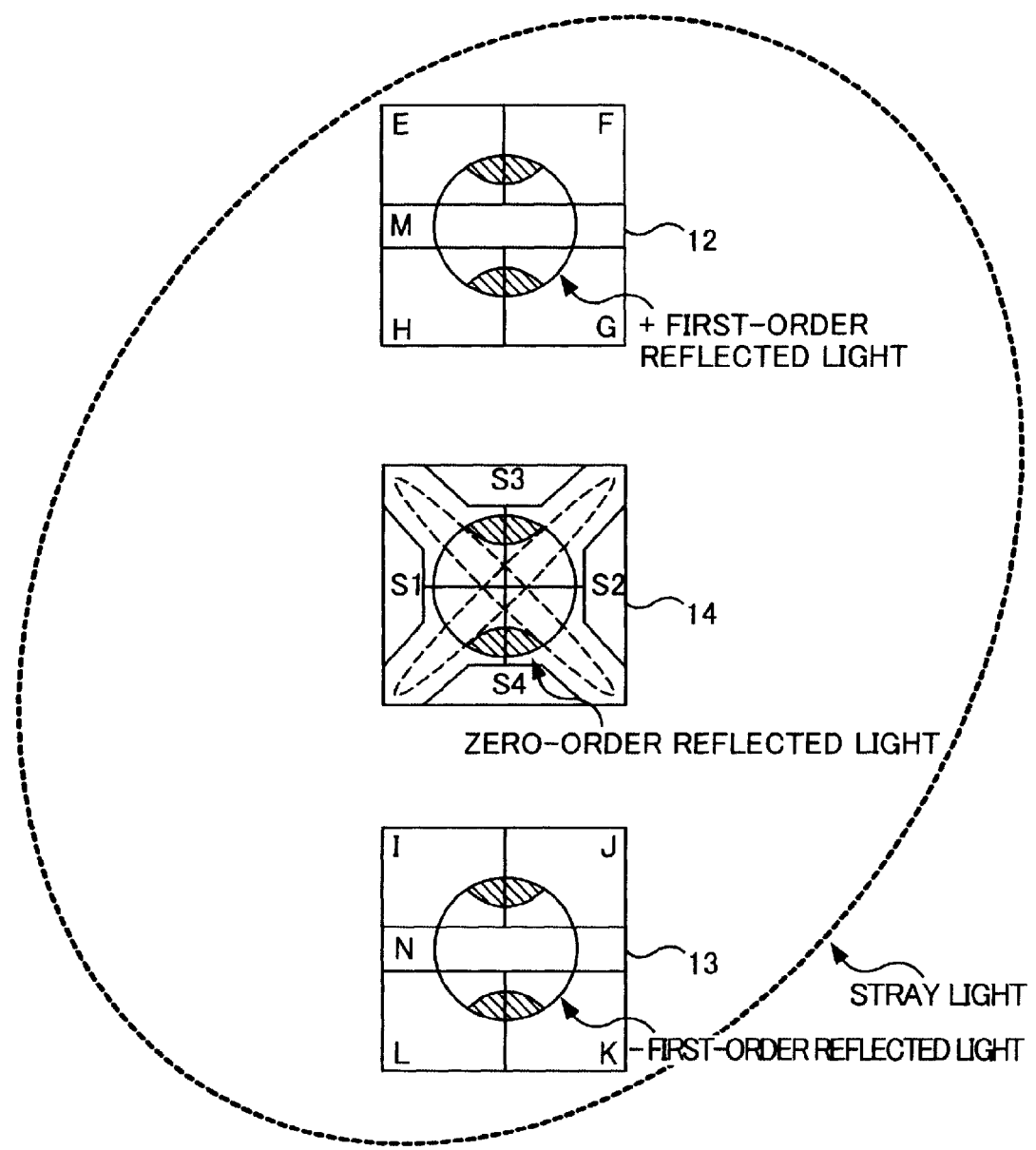
FIG. 8 is a diagram of another embodiment of the light-receiving surfaces included in the photodetector shown in FIG. 6.

Although the two light-receiving surfaces S1 and S2 are provided for canceling out the stray light received by the light-receiving areas O to R of the light-receiving surface 14 according to the above embodiment, this is not a limitation. For example, as shown in FIG. 8, four light-receiving surfaces S1 to S4 may be disposed such that a value of the amplification rate γ of the amplifier 84 is set in accordance with the light amount of the stray light received by the light-receiving surfaces S1 to S4 to cancel out the stray light received by the light-receiving areas O to R. The number of the light-receiving surfaces for canceling out the stray light received by the light-receiving areas O to R can be set to any numbers by adjusting a value of the amplification rate γ of the amplifier 84.

Although the shape of the light-receiving surfaces S1 and S2 is trapezoidal, this is not a limitation. The light-receiving surfaces S1 and S2 can be of any shapes as long as the light-receiving surfaces S1 and S2 are disposed on areas other than areas where the zero-order reflected light of zero-order is changed (from the solid line to the broken lines, or from the broken lines to the solid line) since astigmatism is introduced into the zero-order reflected light.

According to the above embodiment, the stray light from the other information recording layer received by the light-receiving surface 14 can be canceled out, and there can be alleviated or prevented the generation of jitter, etc., of the reproduction signal based on the zero-order reflected light of zero-order from the one information recording layer (L1 or L0) received by the light-receiving surface 14. As a result, information can favorably be reproduced from or recorded in the optical disc 90. Since the light-receiving surfaces S1 and S2 are included in a portion of the light-receiving surface 14, the increases in size, costs, etc., can be prevented or alleviated in the optical detecting apparatus 10. Since the light-receiving surfaces S1 and S2 are included in a portion of the light-receiving surface 14, increases in size, costs, etc., can be prevented or alleviated in the optical detecting apparatus 10.

Since the light-receiving surfaces S1 and S2 are disposed on areas other than areas where the zero-order reflected light of zero-order is changed, the effect on the reproduction signal can be prevented even if the zero-order reflected light of zero-order is received by the light-receiving surfaces S1 and S2. That is, a more accurate reproduction signal can be obtained by disposing the light-receiving surfaces S1 and S2 in areas other than areas where the zero-order reflected light of zero-order is changed.

Other Embodiments of Photodetector (1) and (2)

First Other Embodiment

Figure 9:
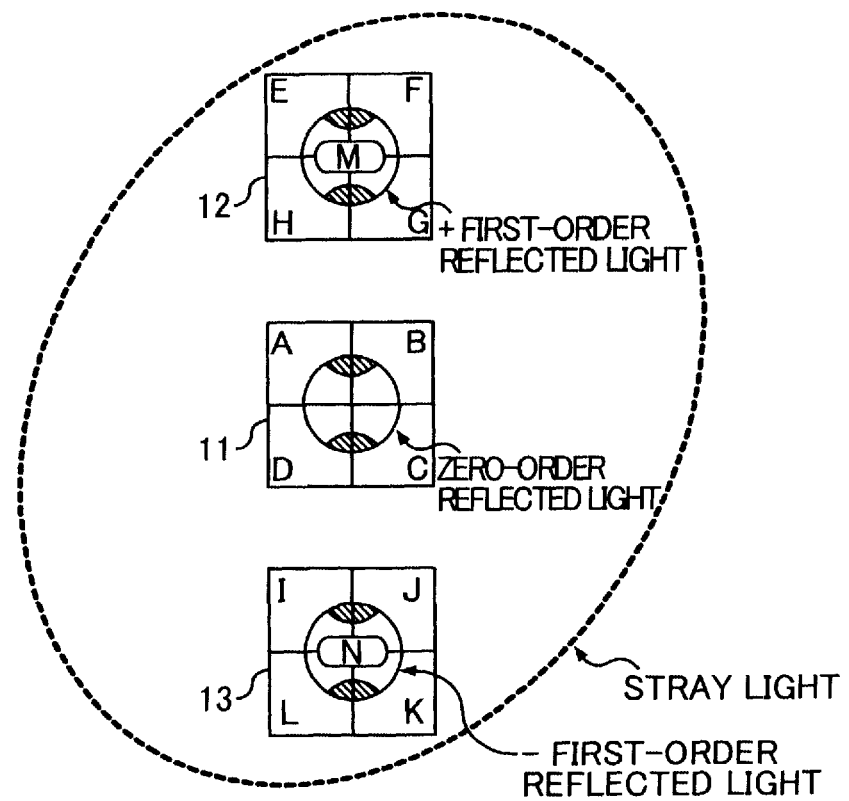
FIG. 9 is a diagram of another embodiment of the light-receiving surfaces included in the photodetector according to one embodiment of the present invention.

Although the light-receiving surface M and the light-receiving surface N shown in FIG. 1 (FIG. 6) are disposed in substantially rectangular shape in the above embodiment, this is not a limitation. For example, an elliptical shape may be employed, as shown in FIG. 9. The elliptical light-receiving surface M shown in FIG. 9 has a greatest diameter disposed in the dividing direction between the light-receiving areas E, F and the light-receiving areas G, H (corresponding to the tangential direction of the track of the information recording layer (L0 or L1) of the optical disc 90) and a minimum diameter disposed in the dividing direction: between the light-receiving area E and the light-receiving area F; and between the light-receiving area G and the light-receiving area H. The minimum diameter is set to a length so as to avoid the reception of a portion of the +first-order reflected light of +first-order that should be received by the light-receiving areas E and F and a portion of the +first-order reflected light of −first-order that should be received by the light-receiving areas G and H. The elliptical light-receiving surface N shown in FIG. 9 has a greatest diameter disposed in the dividing direction between the light-receiving areas I, J and the light-receiving areas K, L (corresponding to the tangential direction of the track of the information recording layer (L0 or L1) of the optical disc 90) and a minimum diameter disposed in the dividing direction: between the light-receiving area I and the light-receiving area J; and between the light-receiving area K and the light-receiving area L. The minimum diameter has a length so as to avoid the reception of: a portion of the −first-order reflected light of +first-order that should be received by the light-receiving areas I and J; and a portion of the −first-order reflected light of −first-order that should be received by the light-receiving areas K and L. With these elliptical light-receiving surfaces M and N, the same effects can be achieved. The light-receiving surface M is not limited to be elliptical and may be in any shape, as long as it is disposed between the light-receiving areas E, F and the light-receiving areas G, H and can avoid the reception of: a portion of the +first-order reflected light of +first-order that should be received by the light-receiving areas E and F; and a portion of the +first-order reflected light of −first-order that should be received by the light-receiving areas G and H. The light-receiving surface N may be in any shape, as long as it is disposed between the light-receiving areas I, J and the light-receiving areas K, L and can avoid the reception of: a portion of the −first-order reflected light of +first-order that should be received by the light-receiving areas I and J; and a portion of the −first-order reflected light of −first-order that should be received by the light-receiving areas K and L.

Second Other Embodiment

Figure 10:
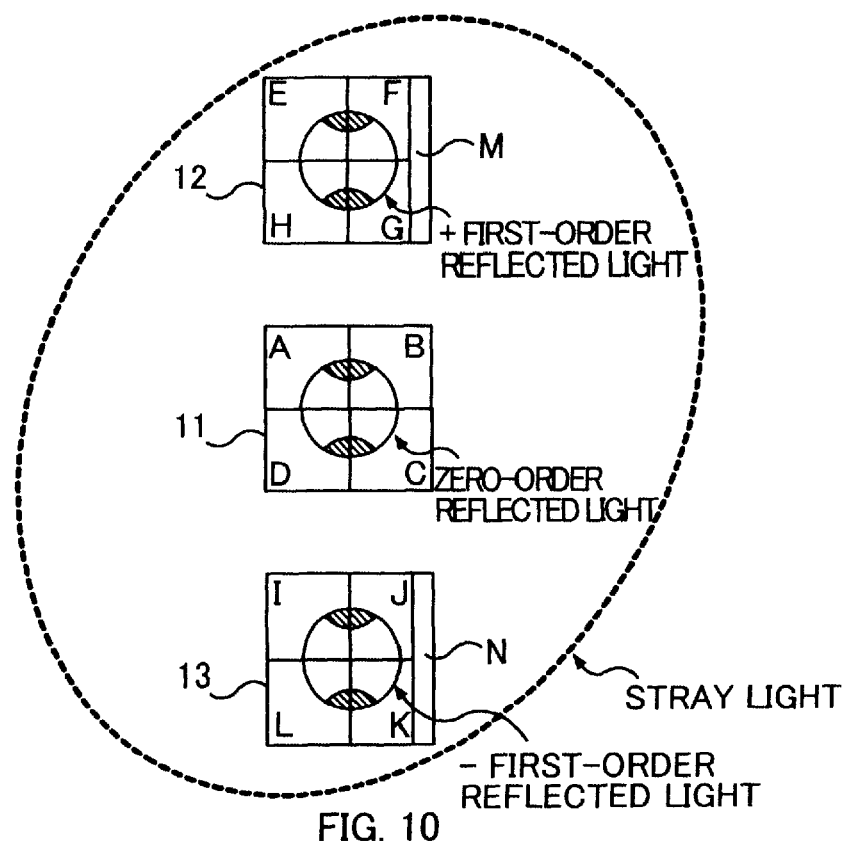
FIG. 10 is a diagram of another embodiment of the light-receiving surfaces included in the photodetector according to one embodiment of the present invention.

For example, as shown in FIG. 10, the light-receiving surfaces M and N may be disposed on areas other than areas for receiving the ±first-order reflected light in the light-receiving surfaces 12 and 13.

The light-receiving surface M shown in FIG. 10 is disposed in substantially rectangular shape on the side opposite to the side of the light-receiving areas F and G contacting with the light-receiving areas E and H. Specifically, the light-receiving surface M is disposed such that longitudinal side thereof contacts with the light-receiving areas F and G, and width sides thereof orthogonal to the longitudinal sides have lengths for avoiding the reception of the +first-order reflected light of zero-order and the +first-order reflected light of ±first-order that should be received by the light-receiving areas F and G. The longitudinal direction of the light-receiving surface M corresponds to the radial direction of the optical disc 90, and the width direction orthogonal to the dividing direction between the light-receiving areas E and F and orthogonal to the dividing direction between the light-receiving areas G and H corresponds to the tangential direction of the track of the target information recording layer (L0 or L1) of the optical disc 90. The light-receiving surface N shown in FIG. 10 is disposed in substantially rectangular shape on the side opposite to the side of the light-receiving areas J and K contacting with the light-receiving areas I and L. Specifically, the light-receiving surface N is disposed such that longitudinal side thereof contacts with the light-receiving areas J and K, and width sides thereof orthogonal to the longitudinal sides have lengths for avoiding the reception of the −first-order reflected light of zero-order and the −first-order reflected light of ±first-order that should be received by the light-receiving areas J and K. The longitudinal direction of the light-receiving surface N corresponds to the radial direction of the optical disc 90, and the width direction orthogonal to the dividing direction between the light-receiving areas I and J and orthogonal to the dividing direction between the light-receiving areas K and L corresponds to the tangential direction of the track of the target information recording layer (L0 or L1) of the optical disc 90. The light-receiving surfaces M and N may be disposed on the sides of the light-receiving areas E, H, I, and L.

By being disposed on areas other than areas for receiving receive the ±first-order reflected light in the light-receiving surfaces M and N of the light-receiving surfaces 12 and 13, the amplification rate X of the amplifier 55 (FIG. 3) and the amplification rate Y of the amplifier 75 (FIG. 5) can be set to a conventional value that equalizes the light amount ratio between zero-order light and ±first-order diffracted light.

Specifically, if the light-receiving surfaces M and N are disposed on areas other than areas for receiving in the light-receiving surfaces 12 and 13 the ±first-order reflected light, the photoelectric conversion signals M and N generated based on the light-receiving results of the light-receiving surfaces M and N are the photoelectric conversion signals M(2) and N(2) including only the stray light components. Therefore, the subtraction result of the subtracter 48 is photoelectric conversion signal E(1)+photoelectric conversion signal F(1)−photoelectric conversion signal G(1)−photoelectric conversion signal H(1). The subtraction result of the subtracter 53 is photoelectric conversion signal I(1)+photoelectric conversion signal J(1)−photoelectric conversion signal K(1)−photoelectric conversion signal L(1). The addition result of the adder 54 is (photoelectric conversion signal E(1)+photoelectric conversion signal F(1))−(photoelectric conversion signal G(1)+photoelectric conversion signal H(1))+(photoelectric conversion signal I(1)+photoelectric conversion signal J(1))−(photoelectric conversion signal K(1)+photoelectric conversion signal L(1)) As a result, the amplification rate X of the amplifier 55 may be set to a value at which the light amount ratio between zero-order light and ±first-order diffracted light is equalized without considering −photoelectric conversion signal M(1)·α1−photoelectric conversion signal N(1)·α2 as described above. That is, the amplification rate X of the amplifier 55 may be set to X1 described above. As a result, the amplification rate X of the amplifier 55 can easily be set by disposing the light-receiving surfaces M and N on areas other than for receiving the ±first-order reflected light in the light-receiving surfaces 12 and 13.

Similarly, the subtraction result of the subtracter 68 is photoelectric conversion signal E(1)+photoelectric conversion signal G(1)−photoelectric conversion signal F(1)−photoelectric conversion signal H(1). The subtraction result of the subtracter 73 is photoelectric conversion signal I(1)+photoelectric conversion signal K(1)−photoelectric conversion signal J(1)−photoelectric conversion signal L(1). The addition result of the adder 74 is (photoelectric conversion signal E(1)+photoelectric conversion signal G(1))−(photoelectric conversion signal F(1)+photoelectric conversion signal H(1))+(photoelectric conversion signal I(1)+photoelectric conversion signal K(1))−(photoelectric conversion signal J(1)+photoelectric conversion signal L(1)). As a result, the amplification rate Y of the amplifier 75 may be set to a value at which the light amount ratio between zero-order light and ±first-order diffracted light is equalized without considering −photoelectric conversion signal M(1)·β1−photoelectric conversion signal N(1)·β2 as described above. That is, the amplification rate Y of the amplifier 75 may be set to Y1 described above. As a result, the amplification rate Y of the amplifier 75 can more easily be set by disposing the light-receiving surfaces M and N on areas other than areas for receiving the ±first-order reflected light in the light-receiving surfaces 12 and 13.

According to the second other embodiment, by being disposed on areas other than areas for receiving the ±first-order reflected light in the light-receiving surfaces 12 and 13, the light-receiving surfaces M and N receive only the stray light from the other information recording layer. As a result, when detecting the tracking error signal and the focus error signal based on the reception result of the light-receiving surfaces 12 and 13, the tracking error signal and the focus error signal can be detected without correction to be made on the reception of the ±first-order reflected light in light-receiving surfaces M and N.

Although the detection of the tracking error signal based on the differential push-pull method has been described in the first and second other embodiments and the above embodiment, this is not a limitation. For example, the tracking error signal can be detected based on the three-beam method.

Third Other Embodiment

Figure 11:
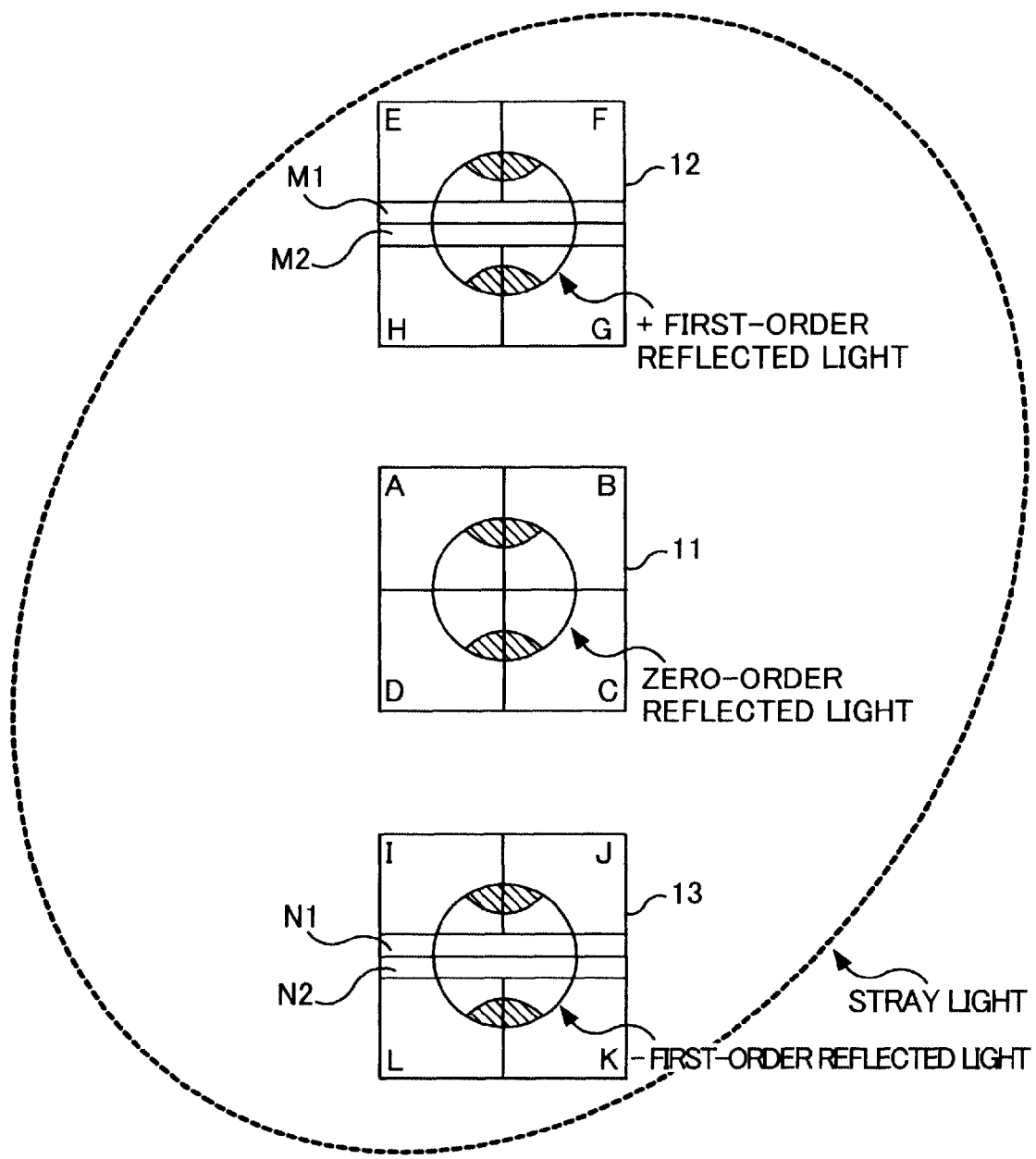
FIG. 11 is a diagram of another embodiment of the light-receiving surfaces included in the photodetector according to one embodiment of the present invention.

As shown in FIG. 11, a light-receiving surface M1, a light-receiving surface M2, a light-receiving surface N1, and a light-receiving surface N2 may be disposed for the light-receiving areas E and F, the light-receiving areas G and H, the light-receiving areas I and J, and the light-receiving areas K and L, respectively. The light-receiving surfaces M1, M2, N1, and N2 are disposed for supporting the characteristics of light intensity distribution of the stray light that the light intensity thereof is the highest at the center and becomes lower with distance from the center thereof.

The light-receiving surface M1 is disposed for canceling out: the stray light received by the light-receiving surface 12 in the light-receiving areas E and F; by the stray light received by the light-receiving surface M1. The light-receiving surface M2 is disposed for canceling out: the stray light received by the light-receiving surface 12 in the light-receiving areas G and H; by the stray light received by the light-receiving surface M2. The light-receiving surfaces M1 and M2 are formed by dividing the light-receiving surface M shown in FIG. 1 with a dividing line: passing through the center of the +first-order reflected light of zero-order when the zero-order light is focused on the track of the target information recording layer (L0 and L1) of the optical disc 90; and corresponding to the tangential direction of the track. The light-receiving surface M1 receives the +first-order reflected light of zero-order from the target information recording layer (L0 or L1) of the optical disc 90 and the stray light from the non-target information recording layer (L1 or L0) of the optical disc 90. The light-receiving surface M2 receives the +first-order reflected light of zero-order from the target information recording layer (L0 or L1) of the optical disc 90 and the stray light from the non-target information recording layer (L1 or L0) of the optical disc 90.

The light-receiving surface N1 is disposed for canceling out: the stray light received by the light-receiving surface 13 in the light-receiving areas I and J; by the stray light received by the light-receiving surface N1. The light-receiving surface N2 is disposed for canceling out: the stray light received by the light-receiving surface 13 in the light-receiving areas K and L; by the stray light received by the light-receiving surface N2. The light-receiving surfaces N1 and N2 are formed by dividing the light-receiving surface N shown in FIG. 1 with a dividing line: passing through the center of the −first-order reflected light of zero-order when the zero-order light is focused on the track of the target information recording layer (L0 and L1) of the optical disc 90; and corresponding to the tangential direction of the track. The light-receiving surface N1 receives: the −first-order reflected light of zero-order from the target information recording layer (L0 or L1) of the optical disc 90; and the stray light from the non-target information recording layer (L1 or L0) of the optical disc 90. The light-receiving surface N2 receives: the −first-order reflected light of zero-order from the target information recording layer (L0 or L1) of the optical disc 90; and the stray light from the non-target information recording layer (L1 or L0) of the optical disc 90.

Since the light-receiving surface M1 is disposed in the light-receiving areas E and F, a light intensity of the stray light received by the light-receiving surface M1 is more proximate to a light intensity thereof received by the light-receiving areas E and F than a light intensity thereof received by the light-receiving surface M2. Since the light-receiving surface M2 is disposed in the light-receiving areas G and H, a light intensity of the stray light received by the light-receiving surface M2 is more proximate to a light intensity thereof received by the light-receiving areas G and H than a light intensity thereof received by the light-receiving surface M1. Since the light-receiving surface N1 is disposed in the light-receiving areas I and J, a light intensity of the stray light received by the light-receiving surface N1 is more proximate to a light intensity thereof received by the light-receiving areas I and J than a light intensity thereof received by the light-receiving surface N2. Since the light-receiving surface N2 is disposed in the light-receiving areas K and L, a light intensity of the stray light received by the light-receiving surface N2 is more proximate to a light intensity thereof received by the light-receiving areas K and L than a light intensity thereof received by the light-receiving surface N1. Therefore, taking advantage of: the proximity between the light intensity of the stray light received by the light-receiving surface M1 and the light intensity thereof received by the light-receiving areas E and F of the light-receiving surface 12; and the proximity between the light intensity thereof received by the light-receiving surface M2 and the light intensity thereof received by the light-receiving areas G and H of the light-receiving surface 12, the stray light received by the light-receiving areas E and F of the light-receiving surface 12 is canceled out by the stray light received by the light-receiving surface M1, and the stray light received by the light-receiving areas G and H of the light-receiving surface 12 is canceled out by the stray light received by the light-receiving surface M2. Taking advantage of: the proximity between the light intensity of the stray light received by the light-receiving surface N1 and the light intensity thereof received by the light-receiving areas I and J of the light-receiving surface 13; and the proximity between the light intensity thereof received by the light-receiving surface N2 and the light intensity thereof received by the light-receiving areas K and L of the light-receiving surface 13, the stray light received by the light-receiving areas I and J of the light-receiving surface 13 is canceled out by the stray light received by the light-receiving surface N1, and the stray light received by the light-receiving areas K and L of the light-receiving surface 13 is canceled out by the stray light received by the light-receiving surface N2. The cancellation of the stray light in generation of a tracking error signal will hereinafter be described as an example with reference to FIG. 12.

Figure 12:
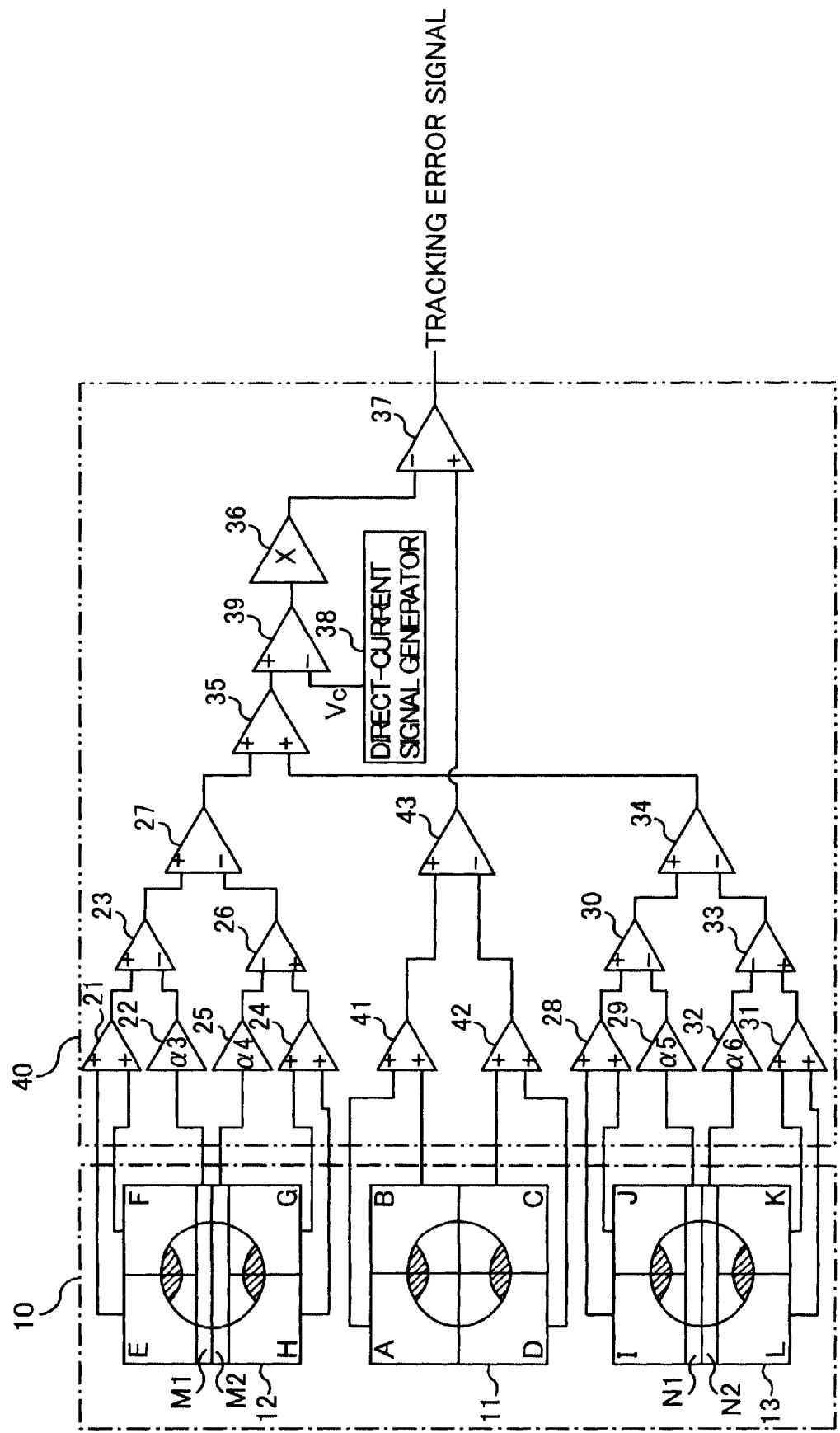
FIG. 12 is a circuit diagram of an overall configuration of an operation circuit that generates a tracking error signal.

FIG. 12 is a circuit diagram of an example of an overall configuration of the operation circuit 20 that generates a tracking error signal based on the light reception result of the photodetector 10 according to the third other embodiment. In the operation circuit 20 shown in FIG. 12, the same reference numerals are added to the same constituent elements as those in the operation circuit 40 shown in FIG. 3, and the description thereof will be omitted.

The operation circuit 20 includes adders 21, 24, 28, 31, 35, 41, 42, subtracters 23, 26, 27, 30, 33, 34, 37, 39, 43, amplifiers 22, 25, 29, 32, 36, and a direct-current signal generator 38.

The adders 21, 22, the amplifiers 22, 25, the subtracters 23, 26, and 27 are disposed for generating a signal corresponding to the light amount of the +first-order reflected light with the stray light canceled out, which is a basis of the tracking error signal.

The adder 21 adds: the photoelectric conversion signal E(1) corresponding to the light amounts of the +first-order reflected light of zero-order and a portion of the +first-order reflected light of +first-order and the photoelectric conversion signal E(2) corresponding to the light amount of the stray light, received in the light-receiving area E of the light-receiving surface 12 of the photodetector 10; and the photoelectric conversion signal F(1) corresponding to the light amounts of the +first-order reflected light of zero-order and a portion of the +first-order reflected light of +first-order and the photoelectric conversion signal F(2) corresponding to the light amount of the stray light, received in the light-receiving area F.

The amplifier 22 amplifies at an amplification rate $\alpha 3$ the photoelectric conversion signal M1 corresponding to the light amounts of the +first-order reflected light of zero-order and the stray light received by the light-receiving surface M1 of the light-receiving surface 12 of the photodetector 10. In the photoelectric conversion signal M1, the component corresponding to the light amount of the +first-order reflected light of zero-order is hereinafter referred to as a photoelectric conversion signal M1(1), and the component corresponding to the light amount of the stray light is referred to as a photoelectric conversion signal M1(2). This amplification rate $\alpha 3$ is set to a value at which the stray light received by the light-receiving areas E and F of the light-receiving surface 12 cancels out by the stray light received by the light-receiving surface M1. An example of setting the amplification rate $\alpha 3$ will hereinafter be described. When the diffraction grating 3 is rotated in a predetermined direction (e.g., from the top side toward the back side of the page of FIG. 2), the light-receiving surface 12 receives only the stray light in the light-receiving areas E and F and the light-receiving surface M1. Therefore, the photoelectric conversion signals output by the light-receiving surface 12 and the light-receiving surface M1 in this case are the photoelectric conversion signals E(2), F(2), and M1(2) including only the stray light components.

Therefore, the amplification rate $\alpha 3$ is set to a value satisfying the following equation:

photoelectric conversion signal $E(2)$+photoelectric conversion signal $F(2)$−photoelectric conversion signal $M1(2)\cdot\alpha 3=0$.

That is, the amplification rate $\alpha 3$ is set as follows:

(photoelectric conversion signal $E(2)$+photoelectric conversion signal $F(2)$)/photoelectric conversion signal $M1(2)$.

As a result, the amplifier 22 outputs photoelectric conversion signal M1(1)·α3+(photoelectric conversion signal E(2)+photoelectric conversion signal F(2)), which is obtained by multiplying photoelectric conversion signal M1(1)+photoelectric conversion signal M1(2) by α3.

The subtracter 23 subtracts: the amplification result of the amplifier 22 {M1(1)·α3+(photoelectric conversion signal E(2)+photoelectric conversion signal F(2))}; from the addition result of the adder 21 (photoelectric conversion signal E(1)+photoelectric conversion signal E(2)+photoelectric conversion signal F(1)+photoelectric conversion signal F(2). This subtraction result of the subtracter 23 is as follows:

> photoelectric conversion signal E(1)+photoelectric conversion signal F(1)−photoelectric conversion signal M1(1)·α3.

As shown by this equation, the subtraction result of the subtracter 23 indicates that the stray light received by the light-receiving areas E and F of the light-receiving surface 12 is canceled out by the stray light received by the light-receiving surface M1.

The adder 24 adds: the photoelectric conversion signal G(1) corresponding to the light amounts of the +first-order reflected light of zero-order and a portion of the +first-order reflected light of −first-order and the photoelectric conversion signal G(2) corresponding to the light amount of the stray light, received in the light-receiving area G of the light-receiving surface 12 of the photodetector 10; and the photoelectric conversion signal H(1) corresponding to the light amounts of the +first-order reflected light of zero-order and a portion of the +first-order reflected light of −first-order and the photoelectric conversion signal H(2) corresponding to the light amount of the stray light, received in the light-receiving area H.

The amplifier 25 amplifies at an amplification rate α4 the photoelectric conversion signal M2 corresponding to the light amounts of the +first-order reflected light of zero-order and the stray light received by the light-receiving surface M2 of the light-receiving surface 12 of the photodetector 10. In the photoelectric conversion signal M2, the component corresponding to the light amount of the +first-order reflected light of zero-order is hereinafter referred to as a photoelectric conversion signal M2(1), and the component corresponding to the light amount of the stray light is referred to as a photoelectric conversion signal M2(2). This amplification rate α4 is set to a value at which the stray light received by the light-receiving areas G and H of the light-receiving surface 12 is canceled out by the stray light received by the light-receiving surface M2. An example of setting the amplification rate α4 will hereinafter be described. When the diffraction grating 3 is rotated in a predetermined direction (e.g., from the top side toward the back side of the page of FIG. 2), the light-receiving surface 12 receives only the stray light in the light-receiving areas G and H and the light-receiving surface M2. Therefore, the photoelectric conversion signals output by the light-receiving surface 12 and the light-receiving surface M2 in this case are the photoelectric conversion signals G(2), H(2), and M2(2) including only the stray light components.

Therefore, the amplification rate α4 is set to a value satisfying the following equation:

> photoelectric conversion signal G(2)+photoelectric conversion signal H(2)−photoelectric conversion signal M2(2)·α4=0.

That is, the amplification rate α4 is set as follows:

> (photoelectric conversion signal G(2)+photoelectric conversion signal H(2))/photoelectric conversion signal M2(2).

As a result, the amplifier 25 outputs photoelectric conversion signal M2(1)·α4+(photoelectric conversion signal G(2)+photoelectric conversion signal H(2)), which is obtained by multiplying photoelectric conversion signal M2(1)+photoelectric conversion signal M2(2) by α4.

The subtracter 26 subtracts: the amplification result of the amplifier 25 {M2(1)·α 4+(photoelectric conversion signal G(2)+photoelectric conversion signal H(2))}; from the addition result of the adder 24 (photoelectric conversion signal G(1)+photoelectric conversion signal G(2)+photoelectric conversion signal H(1)+photoelectric conversion signal H(2)). This subtraction result of the subtracter 26 is as follows:

> photoelectric conversion signal G(1)+photoelectric conversion signal H(1)−photoelectric conversion signal M2(1)·α4.

As shown by this equation, the subtraction result of the subtracter 26 indicates that the stray light received by the light-receiving areas G and H of the light-receiving surface 12 is canceled out by the stray light received by the light-receiving surface M2.

The subtracter 27 subtracts: the subtraction result of the subtracter 26 (photoelectric conversion signal G(1)+photoelectric conversion signal H(1)−photoelectric conversion signal M2(1)·α4); from the subtraction result of the subtracter 23 (photoelectric conversion signal E(1)+photoelectric conversion signal F(1)−photoelectric conversion signal M1(1)·α3). This subtraction result of the subtracter 27 is as follows:

> photoelectric conversion signal E(1)+photoelectric conversion signal F(1)−photoelectric conversion signal G(1)−photoelectric conversion signal H(1)−photoelectric conversion signal M1(1)·α3+ photoelectric conversion signal M2(1)·α4.

As shown by this equation, the subtracter 27 outputs the signal corresponding to the light amount of the +first-order reflected light with the stray light canceled out, which is a basis of the tracking error signal.

The adders 28, 31, the amplifiers 29, 32, the subtracters 30, 33, and 34 are disposed for generating a signal corresponding to the light amount of the −first-order reflected light with the stray light canceled out, which is a basis of the tracking error signal.

The adder 28 adds: the photoelectric conversion signal I(1) corresponding to the light amounts of the −first-order reflected light of zero-order and a portion of the −first-order reflected light of +first-order and the photoelectric conversion signal I(2) corresponding to the light amount of the stray light, received in the light-receiving area I of the light-receiving surface 13 of the photodetector 10; and the photoelectric conversion signal J(1) corresponding to the light amounts of the −first-order reflected light of zero-order and a portion of the −first-order reflected light of +first-order and the photoelectric conversion signal J(2) corresponding to the light amount of the stray light, received in the light-receiving area J.

The amplifier 29 amplifies at an amplification rate α5 the photoelectric conversion signal N1 corresponding to the light amounts of the −first-order reflected light of zero-order and the stray light received by the light-receiving surface N1 of the light-receiving surface 13 of the photodetector 10. In the photoelectric conversion signal N1, the component corresponding to the light amount of the −first-order reflected light of zero-order is hereinafter referred to as a photoelectric conversion signal N1(1), and the component corresponding to the light amount of the stray light is referred to as a photoelectric conversion signal N1(2). This amplification rate α5 is set to a value at which the stray light received by the light-receiving areas I and J of the light-receiving surface 13 is canceled out by the stray light received by the light-receiving surface N1. An example of setting the amplification rate α5 will hereinafter be described. When the diffraction grating 3 is rotated in a predetermined direction (e.g., from the top side toward the back side of the page of FIG. 2), the light-receiving surface 13 receives only the stray light in the light-receiving areas I and J and the light-receiving surface N1. Therefore, the photoelectric conversion signals output by the light-receiving surface 13 and the light-receiving surface N1 in this case are the photoelectric conversion signals I(2), J(2), and N1(2) including only the stray light components.

Therefore, the amplification rate α5 is set to a value satisfying the following equation:

photoelectric conversion signal *I*(2)+photoelectric conversion signal *J*(2)−photoelectric conversion signal *N*1(2)·α5=0.

That is, the amplification rate α5 is set as follows:

(photoelectric conversion signal *I*(2)+photoelectric conversion signal *J*(2))/photoelectric conversion signal *N*1(2).

As a result, the amplifier 29 outputs photoelectric conversion signal N1(1)·α5+(photoelectric conversion signal I(2)+photoelectric conversion signal J(2)), which is obtained by multiplying photoelectric conversion signal N1(1)+photoelectric conversion signal N1(2) by α5.

The subtracter 30 subtracts: the amplification result of the amplifier 29 {N1(1)·α5+(photoelectric conversion signal I(2)+photoelectric conversion signal J(2))}; from the addition result of the adder 28 (photoelectric conversion signal I(1)+photoelectric conversion signal I(2)+photoelectric conversion signal J(1)+photoelectric conversion signal J(2)) This subtraction result of the subtracter 30 is as follows:

photoelectric conversion signal *I*(1)+photoelectric conversion signal *J*(1)−photoelectric conversion signal *N*1(1)·α5.

As shown by this equation, the subtraction result of the subtracter 30 indicates that the stray light received by the light-receiving areas I and J of the light-receiving surface 13 is canceled out by the stray light received by the light-receiving surface N1.

The adder 31 adds: the photoelectric conversion signal K(1) corresponding to the light amounts of the −first-order reflected light of zero-order and a portion of the −first-order reflected light of −first-order and the photoelectric conversion signal K(2) corresponding to the light amount of the stray light, received in the light-receiving area K of the light-receiving surface 13 of the photodetector 10; and the photoelectric conversion signal L(1) corresponding to the light amounts of the −first-order reflected light of zero-order and a portion of the −first-order reflected light of −first-order and the photoelectric conversion signal L(2) corresponding to the light amount of the stray light, received in the light-receiving area L.

The amplifier 32 amplifies at an amplification rate α6 the photoelectric conversion signal N2 corresponding to the light amounts of the −first-order reflected light of zero-order and the stray light received by the light-receiving surface N2 of the light-receiving surface 13 of the photodetector 10. In the photoelectric conversion signal N2, the component corresponding to the light amount of the −first-order reflected light of zero-order is hereinafter referred to as a photoelectric conversion signal N2(1), and the component corresponding to the light amount of the stray light is referred to as a photoelectric conversion signal N2(2). This amplification rate α6 is set to a value at which the stray light received by the light-receiving areas K and L of the light-receiving surface 13 is canceled out by the stray light received by the light-receiving surface N2. An example of setting the amplification rate α6 will hereinafter be described. When the diffraction grating 3 is rotated in a predetermined direction (e.g., from the top side toward the back side of the page of FIG. 2), the light-receiving surface 13 receives only the stray light in the light-receiving areas K and L and the light-receiving surface N2. Therefore, the photoelectric conversion signals output by the light-receiving surface 13 and the light-receiving surface N2 in this case are the photoelectric conversion signals K(2), L(2), and N2(2) including only the stray light components.

Therefore, the amplification rate α6 is set to a value satisfying the following equation:

photoelectric conversion signal *K*(2)+photoelectric conversion signal *L*(2)−photoelectric conversion signal N2(2)·α6=0.

That is, the amplification rate α6 is set as follows:

(photoelectric conversion signal *K*(2)+photoelectric conversion signal *L*(2))/photoelectric conversion signal *N*2(2).

As a result, the amplifier 32 outputs photoelectric conversion signal N2(1)·α6+(photoelectric conversion signal K(2)+photoelectric conversion signal L(2)), which is obtained by multiplying photoelectric conversion signal N2(1)+photoelectric conversion signal N2(2) by α6.

The subtracter 33 subtracts: the amplification result of the amplifier 32 {N2(1)·α6+(photoelectric conversion signal K(2)+photoelectric conversion signal L(2))}; from the addition result of the adder 31 (photoelectric conversion signal K(1)+photoelectric conversion signal K(2)+photoelectric conversion signal L(1)+photoelectric conversion signal L(2). This subtraction result of the subtracter 33 is as follows:

photoelectric conversion signal *K*(1)+photoelectric conversion signal *L*(1)−photoelectric conversion signal *N*2(1)·α6.

As shown by this equation, the subtraction result of the subtracter 33 indicates that the stray light received by the light-receiving areas K and L of the light-receiving surface 13 is canceled out by the stray light received by the light-receiving surface N2.

The subtracter 34 subtracts: the subtraction result of the subtracter 33 (photoelectric conversion signal K(1)+photoelectric conversion signal L(1)−photoelectric conversion signal N2(1)·α6); from the subtraction result of the subtracter 30 (photoelectric conversion signal I(1)+photoelectric conversion signal J(1)−photoelectric conversion signal N1(1)·α5). This subtraction result of the subtracter 34 is as follows:

photoelectric conversion signal *I*(1)+photoelectric conversion signal *J*(1)−photoelectric conversion signal *K*(1)−photoelectric conversion signal *L*(1)−photoelectric conversion signal *N*1(1)·α5+ photoelectric conversion signal *N*2(1)·α6.

As shown by this equation, the subtracter 34 outputs the signal corresponding to the light amount of the −first-order reflected light with the stray light canceled out, which is a basis of the tracking error signal.

The adder 35 adds: the subtraction result of the subtracter 27 (photoelectric conversion signal E(1)+photoelectric conversion signal F(1)−photoelectric conversion signal G(1)−photoelectric conversion signal H(1)−photoelectric conversion signal M1(1)·α3+photoelectric conversion signal M2(1) ·α4); and the subtraction result of the subtracter 34

(photoelectric conversion signal I(1)+photoelectric conversion signal J(1))−photoelectric conversion signal K(1)−photoelectric conversion signal L(1)−photoelectric conversion signal N1(1)·α5+photoelectric conversion signal N2(1)·α6). As a result, the adder 35 outputs (photoelectric conversion signal E(1)+photoelectric conversion signal F(1))−(photoelectric conversion signal G(1)+photoelectric conversion signal H(1))+(photoelectric conversion signal I(1)+photoelectric conversion signal J(1))−(photoelectric conversion signal K(1)+photoelectric conversion signal L(1))−photoelectric conversion signal M1(1)·α3+photoelectric conversion signal M2(1)·α4−photoelectric conversion signal N1(1)·α5+photoelectric conversion signal N2(1)·α6.

The direct-current signal generator 38 generates a direct-current signal Vc for canceling out {−photoelectric conversion signal M1(1)·α3+photoelectric conversion signal M2(1)·α4−photoelectric conversion signal N1(1)·α5+photoelectric conversion signal N2(1)·α6} of the addition result of the adder 35 to be output to the subtracter 39. Describing the direct-current signal Vc in specific, the photoelectric conversion signal M1(1) is a signal corresponding to the light amount of the +first-order reflected light of zero-order, which is obtained by removing the stray light components from the +first-order reflected light of zero-order and the stray light received by the light-receiving surface M1. The photoelectric conversion signal M1(1) is a direct-current signal having signal components unchanged since the light amount of the +first-order reflected light of zero-order is constant, irrespective of whether or not the +first-order diffracted light intersects the track of the target information recording layer (L0 or L1) of the optical disc 90. Similarly, the photoelectric conversion signal M2(1) is a signal corresponding to the light amount of the +first-order reflected light of zero-order, which is obtained by removing the stray light components from the +first-order reflected light of zero-order and the stray light received by the light-receiving surface M2. The photoelectric conversion signal M2(1) is a direct-current signal having signal components unchanged since the light amount of the +first-order reflected light of zero-order is constant, irrespective of whether or not the +first-order diffracted light intersects the track of the target information recording layer (L0 or L1) of the optical disc 90. The photoelectric conversion signal N1(1) is a signal corresponding to the light amount of the −first-order reflected light of zero-order, which is obtained by removing the stray light components from the −first-order reflected light of zero-order and the stray light received by the light-receiving surface N1. The photoelectric conversion signal N1(1) is a direct-current signal having signal components unchanged since the light amount of the −first-order reflected light of zero-order is constant, irrespective of whether or not the −first-order diffracted light intersects the track of the target information recording layer (L0 or L1) of the optical disc 90. Similarly, the photoelectric conversion signal N2(1) is a signal corresponding to the light amount of the −first-order reflected light of zero-order, which is obtained by removing the stray light components from the −first-order reflected light of zero-order and the stray light received by the light-receiving surface N2. The photoelectric conversion signal N2(1) is a direct-current signal having signal components unchanged since the light amount of the −first-order reflected light of zero-order is constant, irrespective of whether or not the −first-order diffracted light intersects the track of the target information recording layer (L0 or L1) of the optical disc 90. Therefore, the direct-current signal generator 38 generates the direct-current signal Vc equivalent to {−photoelectric conversion signal M1(1)·α3+photoelectric conversion signal M2(1)·α4−photoelectric conversion signal N1(1)·α5+photoelectric conversion signal N2(1)·α6}, which is a direct-current signal. The above direct-current signal Vc generated by the direct-current signal generator 38 can be obtained from actual measurement values, simulations, etc., after setting the amplification rate α3 of the amplifier 22, the amplification rate α4 of the amplifier 25, the amplification rate α5 of the amplifier 29, and the amplification rate α6 of the amplifier 32.

The subtracter 39 subtracts: the direct-current signal Vc of the direct-current signal generator 38; from the addition result of the adder 35 {(photoelectric conversion signal E(1)+photoelectric conversion signal F(1))−(photoelectric conversion signal G(1)+photoelectric conversion signal H(1))+(photoelectric conversion signal I(1)+photoelectric conversion signal J(1))−(photoelectric conversion signal K(1)+photoelectric conversion signal L(1))−photoelectric conversion signal M1(1)·α3+photoelectric conversion signal M2(1)·α4−photoelectric conversion signal N1(1)·α5+photoelectric conversion signal N2(1)·α6}.

As a result, the subtraction result of the subtracter 39 is (photoelectric conversion signal E(1)+photoelectric conversion signal F(1))−(photoelectric conversion signal G(1)+photoelectric conversion signal H(1))+(photoelectric conversion signal I(1)+photoelectric conversion signal J(1))−(photoelectric conversion signal K(1)+photoelectric conversion signal L(1)), which is obtained by the subtraction of the +first-order reflected light of zero-order received by the light-receiving surfaces M1 and M2 and the −first-order reflected light of zero-order received by the light-receiving surfaces N1 and N2.

The amplifier 36 amplifies at an amplification rate X the subtraction result of the subtracter 39 (photoelectric conversion signal E(1)+photoelectric conversion signal F(1))−(photoelectric conversion signal G(1)+photoelectric conversion signal H(1))+(photoelectric conversion signal I(1)+photoelectric conversion signal J(1))−(photoelectric conversion signal K(1)+photoelectric conversion signal L(1)). The amplification rate X is a value defined to adjust a difference in light intensity between the zero-order light and the ±first-order diffracted light due to the diffraction efficiency of the diffraction grating 3. The amplifier 36 outputs X·{(photoelectric conversion signal E(1)+photoelectric conversion signal F(1))−(photoelectric conversion signal G(1)+photoelectric conversion signal H(1))+(photoelectric conversion signal I(1)+photoelectric conversion signal J(1))−(photoelectric conversion signal K(1)+photoelectric conversion signal L(1))} to the subtracter 56.

The subtracter 37 subtracts: the amplification result of the amplifier 36 [X·{(photoelectric conversion signal E(1)+photoelectric conversion signal F(1))−(photoelectric conversion signal G(1)+photoelectric conversion signal H(1))+(photoelectric conversion signal I(1)+photoelectric conversion signal J(1))−(photoelectric conversion signal K(1)+photoelectric conversion signal L(1))}]; from the subtraction result of the subtracter 43 {(photoelectric conversion signal A+photoelectric conversion signal B)−(photoelectric conversion signal C+photoelectric conversion signal D)} to generate a tracking error signal. The tracking error signal is {(photoelectric conversion signal A+photoelectric conversion signal B)−(photoelectric conversion signal C+photoelectric conversion signal D)}−X·{(photoelectric conversion signal E(1)+photoelectric conversion signal F(1))−(photoelectric conversion signal G(1)+photoelectric conversion signal H(1))+(photoelectric conversion signal I(1)+photoelectric conversion signal J(1))−(photoelectric conversion signal K(1)+photoelectric conversion signal L(1))}, which is a signal obtained by canceling out the stray light received by the light-receiving areas E to H and I to L of the light-receiving surfaces 12 and 13 by the stray light received by the light-receiving surfaces M1, M2, N1, and N2. That is, there is generated a tracking error signal that accurately corresponds to the displacement of the zero-order light with respect to the track of the target information recording layer (L0 or L1) of the optical disc 90.

According to the third other embodiment, the stray light can be canceled out in accordance with the light intensity distribution of the stray light from the other information recording layer by disposing the light-receiving surfaces M1 and M2(N1 and N2) on the light-receiving areas E, F (I, J) and the light-receiving areas G, H (K, L), respectively. As a result, more accurate tracking error signal and focus error signal can be detected based on the reception results of the light-receiving surfaces 12 and 13, and the zero-order light can more accurately be condensed on one information recording layer (L0 or L1) of the optical disc 90.

Although the cancellation of the stray light for the generation of a tracking error signal has been described, this is not a limitation and the same effects can be achieved for the generation of the focus error signal.

Fourth Other Embodiment

Figure 13:
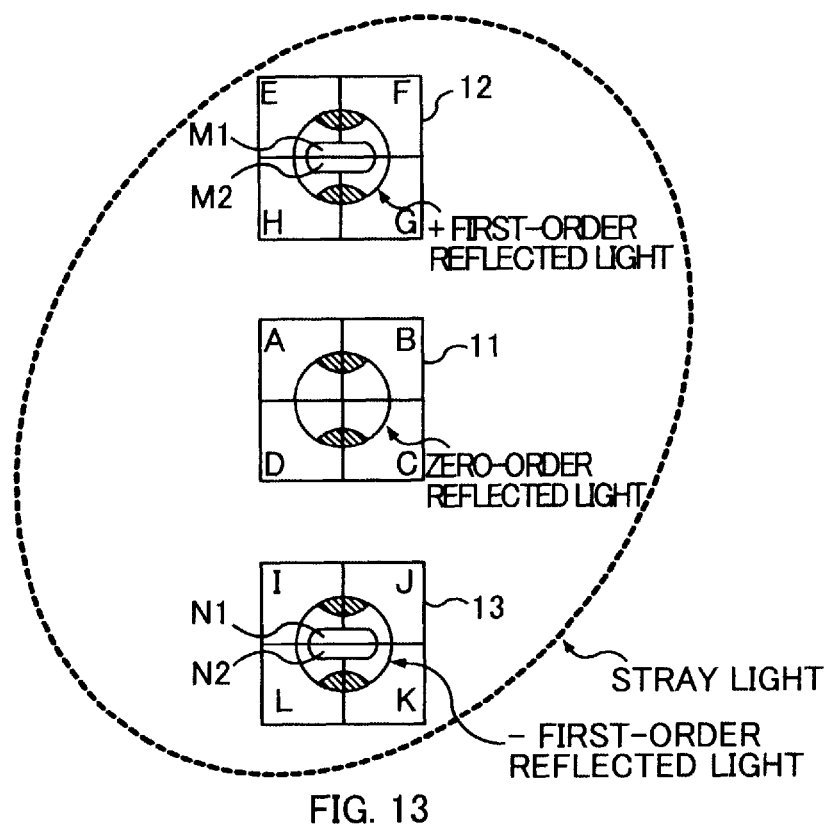
FIG. 13 is a diagram of another embodiment of the light-receiving surfaces included in the photodetector according to one embodiment of the present invention.

Although the light-receiving surfaces M1, M2, N1, and N2 shown in FIG. 11 are disposed in substantially rectangular shape in the above third other embodiment, this is not a limitation. For example, as shown in FIG. 13, the same effects can be achieved by disposing the light-receiving surface M in elliptical shape consisting of the divided light-receiving surfaces M1 and M2 and the light-receiving surface N in elliptical shape consisting of the divided light-receiving surfaces N1 and N2. These light-receiving surfaces M1, M2 and N1, N2 in elliptical shape or other shape are as described in the first other embodiment.

Fifth Other Embodiment

Figure 14:
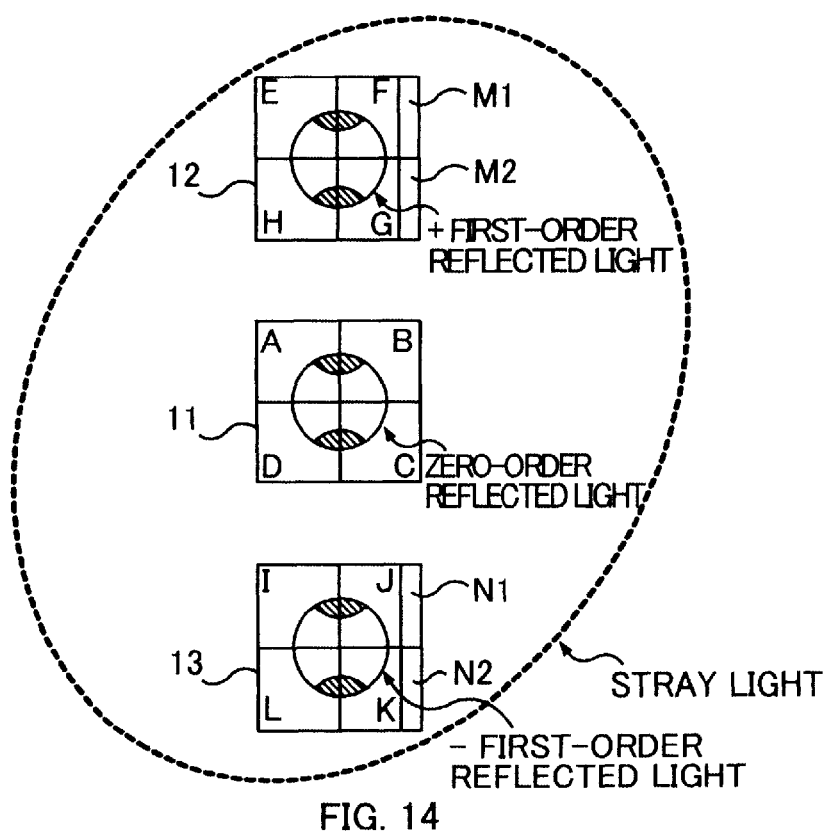
FIG. 14 is a diagram of another embodiment of the light-receiving surfaces included in the photodetector according to one embodiment of the present invention.

For example, as shown in FIG. 14, the light-receiving surfaces M1, M2, N1, and N2 may be disposed on areas other than areas for receiving the +first-order reflected light in the light-receiving surfaces 12 and 13. In this case, the same effects can be achieved, as those can in the above second other embodiment.

Although the detection of the focus error signal based on the differential astigmatic method has been described in the above embodiment and other embodiments, this is not a limitation. For example, when detecting the focus error signal based on the astigmatic method, the light-receiving surface 12 may be divided into only two light-receiving areas E, F and G, H, and the light-receiving surface 13 may be divided into only two light-receiving areas I, J and K, L. Although the light-receiving surfaces M and N (M1, M2, N1, and N2) are disposed on the light-receiving surfaces 12 and 13 respectively to cancel out the stray light in the above description, this is not a limitation. For example, only the light-receiving surface M (M1 and M2) may be disposed on the light-receiving surface 12 so as to cancel out the stray light received by the light-receiving surface 13 based on the stray light received by the light-receiving surface M (M1 and M2), and vice versa. Although the stray light from the other information recording layer of the optical disc 90 is canceled out in the description of the above embodiment, etc., the stray light may not completely be canceled out because of some variations, manufacturing errors, etc., of the amplifier 22, etc., configuring the operation circuit 20, etc., which are not according to the present invention. However, since the photodetector 10 according to one embodiment of the present invention includes the light-receiving surfaces M, N, etc., for the purpose of canceling out the stray light, the photodetector 10 can at least reduce the stray light and is more useful than conventional photodetectors.

==Configuration of Photodetector (3)==

Figure 15:
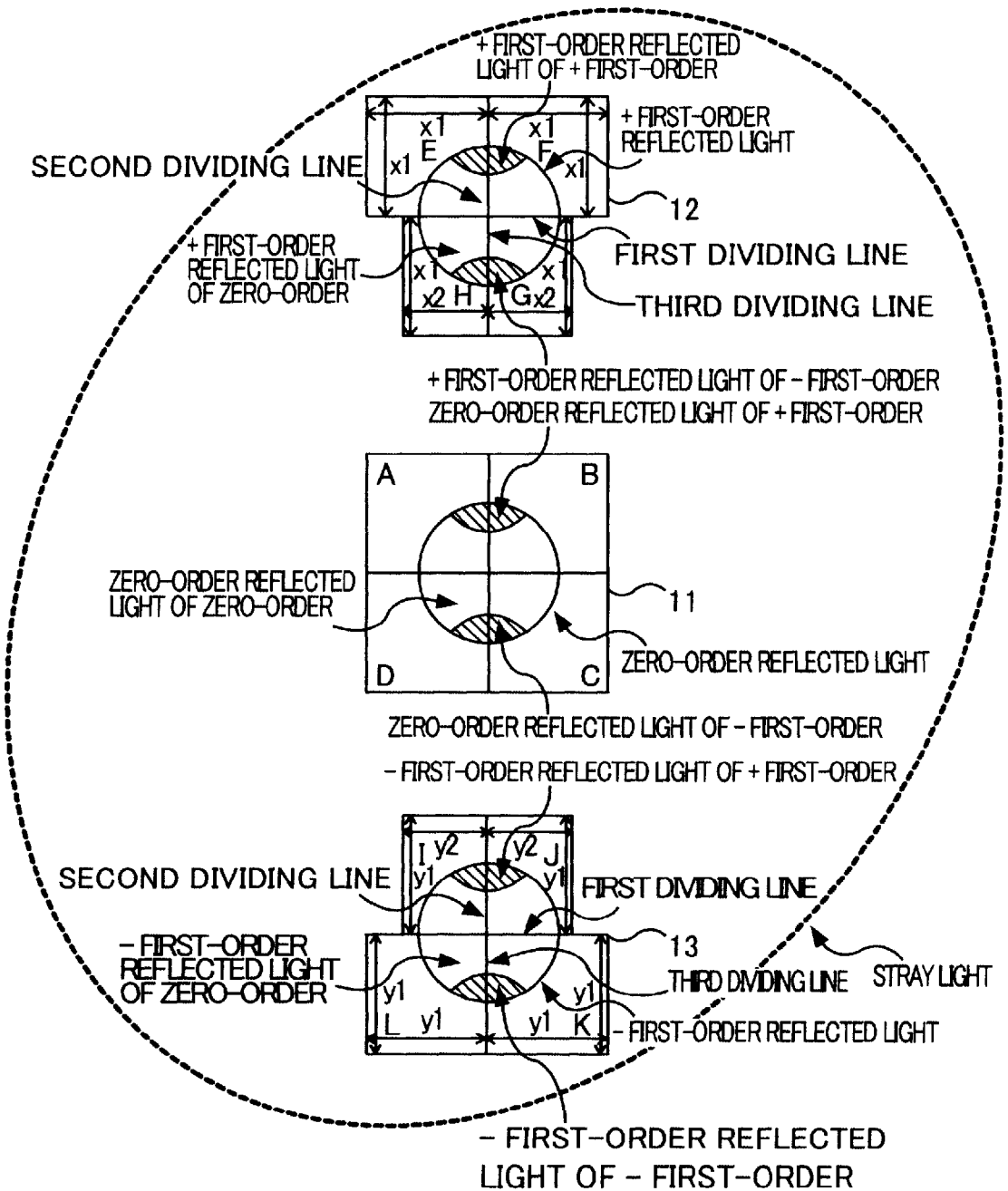
FIG. 15 is a diagram of the light-receiving surfaces included in the photodetector according to one embodiment of the present invention.
Figure 16:
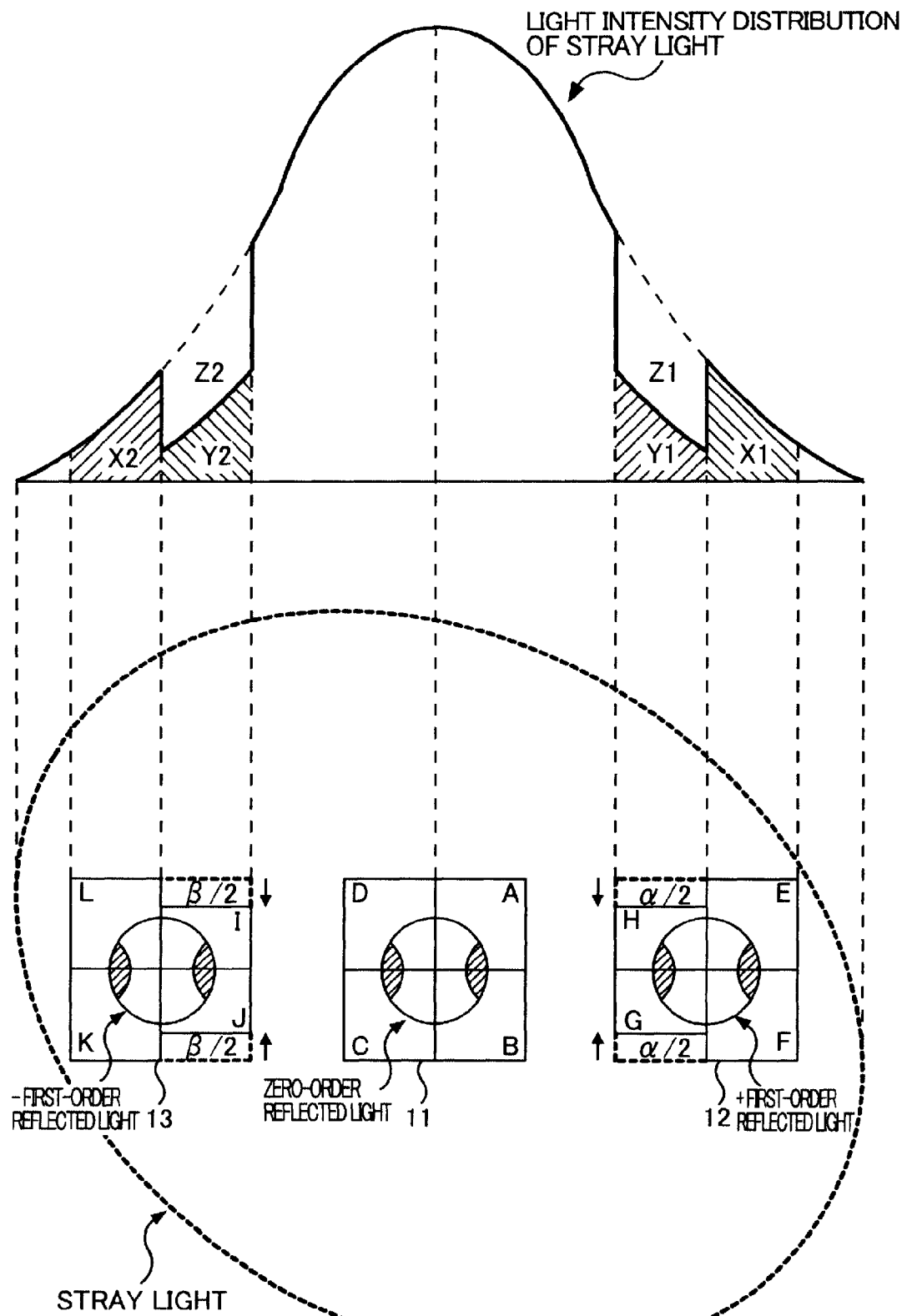
FIG. 16 is a diagram of light intensity distribution of stray light received by the light-receiving surfaces of the photodetector according to one embodiment of the present invention.
Figure 17:
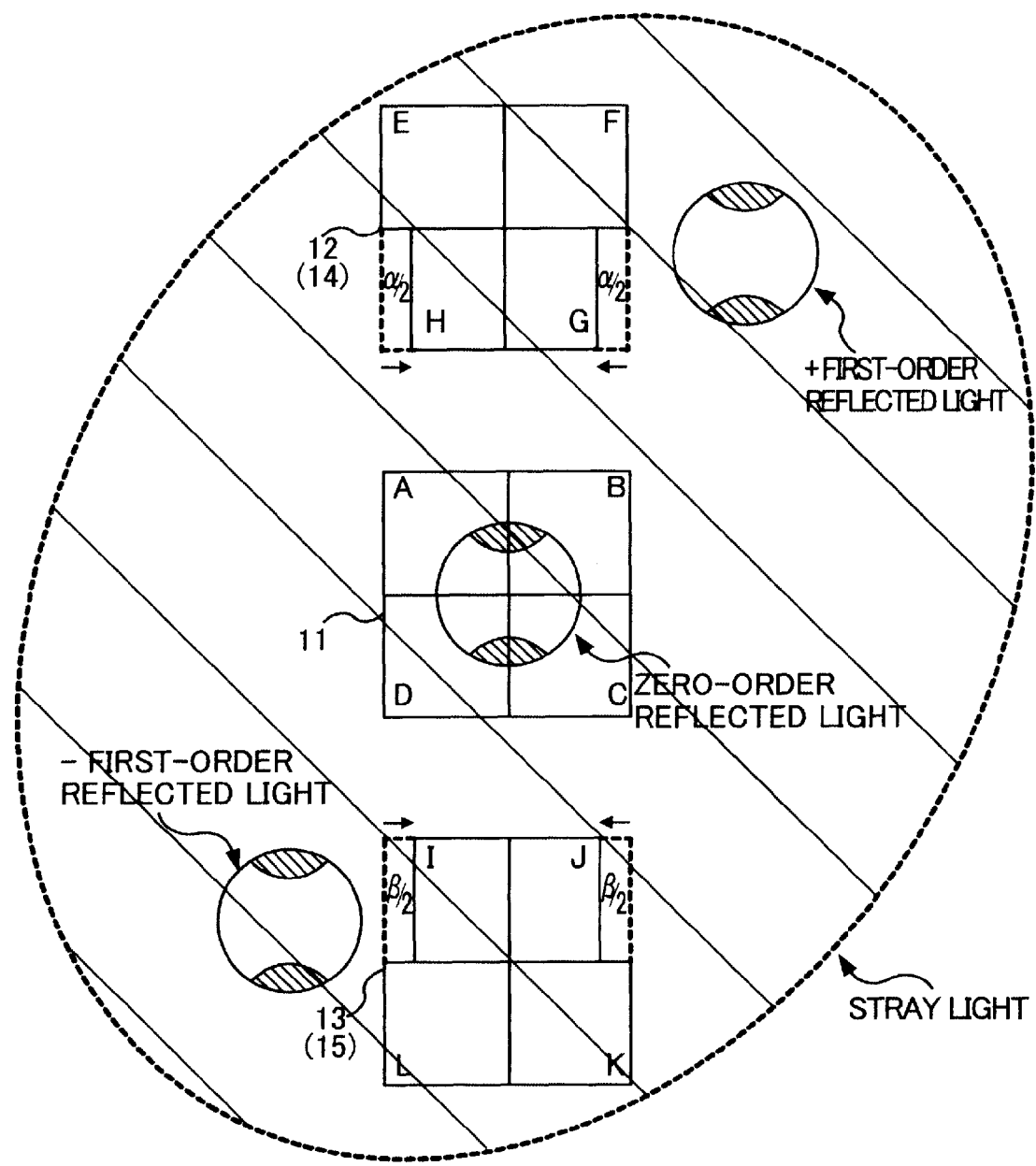
FIG. 17 is a diagram showing a state where only zero-order reflected light and stray light are received in the photodetector according to one embodiment of the present invention.

The configuration of the photodetector 10 according to one embodiment of the present invention will hereinafter be described with reference to FIGS. 15, 16, and 17, and FIGS. 2, 28, and 30 as needed. FIG. 15 is a diagram of the light-receiving surfaces 11 to 13 included in the photodetector 10 according to one embodiment of the present invention. FIG. 16 is a diagram of light intensity distribution of stray light received by the light-receiving surfaces 11 to 13 of the photodetector 10 according to one embodiment of the present invention. FIG. 17 is a diagram showing a state where only zero-order reflected light and stray light are received in the photodetector 10 according to one embodiment of the present invention by rotating the diffraction grating 3. FIG. 15 etc. shows a light receiving state where the zero-order reflected light and the ±first-order reflected light are received by the light-receiving surfaces 11 to 13 when the zero-order light is focused on and driven to follow the target track of the target information recording layer (L0 or L1) of the optical disc 90.

The photodetector 10 includes the light-receiving surface 11 (first light-receiving surface), the light-receiving surface 12 (second light-receiving surface, third light-receiving surface), and the light-receiving surface 13 (second light-receiving surface, fourth light-receiving surface).

The whole light-receiving area of the light-receiving surface 11 is, for example, in square shape, and includes light-receiving areas A to D for receiving the zero-order reflected light. The light-receiving areas A to D are formed by dividing the whole light-receiving area into four areas, such that the radial angles formed by any adjacent two thereof with respect to the center of the whole light-receiving area are the same to make each light-receiving area into a square shape. Specifically, the whole light-receiving area is divided into the light-receiving areas A, B and the light-receiving areas C, D, with a dividing line that passes through the center of the zero-order reflected light of zero-order when the zero-order light is focused on the target track of the target information recording layer (L0 or L1) of the optical disc 90 and that corresponds to the tangent line of the target track. The whole light-receiving area is divided into the light-receiving areas A, D and the light-receiving areas B, C, with a dividing line: that passes through the center of the zero-order reflected light of zero-order when the zero-order light is focused on the target track of the target information recording layer (L0 or L1); and that corresponds to the radius of the optical disc 90. As a result of the division, the light-receiving areas A to D are formed square in shape with the same side length as that of the conventional square light-receiving areas A' to D', for example. In the light-receiving areas A and B, the light-receiving surface 11 receives a portion of the zero-order reflected light of zero-order and the zero-order reflected light of +first-order (shaded portion) of the zero-order reflected light from the target information recording layer (L0 or L1). In the light-receiving areas C and D, the light-receiving surface 11 receives another portion of the zero-order reflected light of zero-order and the zero-order reflected light of −first-order (shaded portion) of the zero-order reflected light from the target information recording layer (L0 or L1). In the light-receiving areas A to D, the light-receiving surface 11 receives the stray light from the non-target information recording layer (L1 or L0). However, because of such a reason that the stray light received by the light-receiving surface 11 is not amplified like the stray light received by, for example, the light-receiving surfaces 12 and 13, the effects of the stray light received by the light-receiving surface 11 on the tracking error signal and the focus error signal are smaller than those of the stray light received by the light-receiving surfaces 12 and 13. Therefore, in this embodiment, the stray light received by the light-receiving surface 11 will not be described. The light-receiving surface 11 generates photoelectric conversion signals A to D corresponding to the light amount of the zero-order reflected light received in the light-receiving areas A to D to be output to an operation circuit 40 (see FIG. 18 described later) that generates the tracking error signal and an operation circuit 60 (see FIG. 19 described later) that generates the focus error signal in the subsequent stage.

Since the light-receiving surface 11 substantially evenly receives the zero-order reflected light as shown in FIG. 15 when the zero-order light is focused on and driven to follow the target track of the target information recording layer (L0 or L1), there become substantially equal in amount: a portion of the zero-order reflected light of zero-order and the zero-order reflected light of +first-order received in the light-receiving area A; a portion of the zero-order reflected light of zero-order and the zero-order reflected light of +first-order received in the light-receiving area B; another portion of the zero-order reflected light of zero-order and a portion of the zero-order reflected light of −first-order received in the light-receiving area C; and another portion of the zero-order reflected light of zero-order and a portion of the zero-order reflected light of −first-order received in the light-receiving area D.

The light-receiving surface 12 is adjacent to the light-receiving surface 11 with a predetermined interval and the whole light-receiving area is in T-shape, for example. The light-receiving surface 12 includes a light-receiving area E (first light-receiving area, third light-receiving area), a light-receiving area F (first light-receiving area, third light-receiving area), a light-receiving area G (second light-receiving area, fourth light-receiving area), and a light-receiving area H (second light-receiving area, fourth light-receiving area), for receiving the +first-order reflected light. The light-receiving areas E to H are formed by dividing the whole light-receiving area of the light-receiving surface 12 into four areas to make the light-receiving area E and the light-receiving area F in square shape and to make the light-receiving area G and the light-receiving area H in rectangular shape. Specifically, the whole light-receiving area of the light-receiving surface 12 is divided into the light-receiving areas E, F and the light-receiving areas G, H, by a first linear dividing line: that passes through the center of the +first-order reflected light of zero-order when the zero-order light is focused on the target track of the target information recording layer (L0 or L1); and that corresponds to the tangent line of a first adjacent track of the target information recording layer (L0 or L1) onto which the +first diffracted light is condensed. The whole light-receiving area of the light-receiving surface 12 is divided into the light-receiving areas E, H and the light-receiving areas F, G, by a second dividing line and a third dividing line: that pass through the center of the +first-order reflected light of zero-order when the zero-order light is focused on the target track of the target information recording layer (L0 or L1); that are orthogonal to the first dividing line; and that correspond to the radius of the optical disc 90. As a result of the division, the light-receiving areas E and F are formed square in shape with a side length x1 which is equal to the side length of the light-receiving areas A to D and is equal to the side length of the conventional square light-receiving areas E' and F' shown in FIGS. 28 and 30. The light-receiving areas G and H are formed rectangular in shape with: a length x1, in the dividing direction corresponding to the radius of the optical disc 90, which is equal to the side length of the conventional square light-receiving areas G' and H' shown in FIGS. 28 and 30; and a length x2, in the dividing direction corresponding to the tangent line of the first adjacent track, which is shorter than the side length of the conventional square light-receiving areas G' and H'.

The length x2 of the light-receiving areas G and H is defined as follows, so as to substantially equalize the light amounts of the stray light received by the light-receiving areas in accordance with the areas thereof, between G, H and E, F. The areas of the light-receiving areas G and H will hereinafter described in detail with reference to FIGS. 16 and 17. For convenience of description, a sum of the light-receiving areas E and F is referred to as a light-receiving area E+F, and a sum of the light-receiving areas G and H is referred to as a light-receiving area G+H.

Since the laser beam emitted by the semiconductor laser 2 has light intensity exhibiting the Gaussian distribution as described above, the light intensity distribution of the stray light shows the light intensity thereof is the highest at the center and becomes lower with distance from the center as shown in FIG. 16 (including Z1 and Z2). Therefore, the light-receiving area G+H that is a shorter distance from the light-receiving surface 11 than the light-receiving area E+F is, receives the stray light higher in light intensity than that received by the light-receiving area E+F. Therefore, if the light-receiving area G+H is equal in area to the light-receiving area E+F (if an area shown in heavy broken lines ($\alpha/2 \cdot 2 = \alpha$) of FIGS. 16 and 17 is added to the light-receiving area G+H), a light amount (Y1+Z1) of the stray light received by the light-receiving area G+H becomes greater than a light amount (X1) of the stray light received by the light-receiving area E+F in accordance with a difference in light intensity between the above two light-receiving areas. Therefore, in this embodiment, the area of the light-receiving area G+H is defined by the length x2 of the light-receiving areas G and H such that the light-receiving area G+H receives only a light amount (Y1) of the stray light substantially equal to a light amount (X1) of the stray light received by the light-receiving area E+F.

The length x2 in the light-receiving areas G and H is obtained from $$\alpha/2 = x1 \cdot (x1 - x2) \text{ as follows:}$$

$$x2 = x1 - \{\alpha/(2 \cdot x1)\}.$$

When the length x2 in the light-receiving areas G and H is set at a value obtained from the above equation, the area of the light-receiving area G+H is set to receive only the light amount (Y1) of the stray light substantially equal to the light amount (X1) of the stray light received by the light-receiving area E+F. It is desirable that the length x2 in the light-receiving areas G and H be equal to or greater than the radius of the +first-order reflected light of zero-order. This is because if the length x2 in the light-receiving areas G and H is equal to or greater than the radius of the +first-order reflected light of zero-order, the light-receiving surface 12 receives all the +first-order reflected light in the light-receiving areas G and H, and more accurate tracking error signal and focus error signal can be detected.

The above area $\alpha/2$ not receiving the stray light can be detected, for example, by using a following method. When the diffraction grating 3 is rotated in a predetermined direction (e.g., from the top side toward the back side of the page of FIG. 2), the light-receiving surface 12 receives only the stray light in the light-receiving areas E to H as shown in FIG. 17. Therefore, the photoelectric conversion signals E to H generated by the light-receiving surface 12 in this case are signals including only the stray light components (hereinafter, the photoelectric conversion signals E to H consisting of the stray light components are referred to as photoelectric conversion signals E(2) to H(2)). Therefore, the area of the light-receiving area G+H is adjusted, for example, through simulations, such that (photoelectric conversion signal G(2)+photoelectric conversion signal H(2)−(photoelectric conversion signal E(2)+photoelectric conversion signal F(2)) becomes zero. As a result, the area of the light-receiving area G+H is set so as to be able to receive only the light amount (Y1) of the stray light substantially equal to the light amount (X1) of the stray light received by the light-receiving area E+F. The above area α/2 can be detected by subtracting: the area of the light-receiving area G+H after the adjustment through simulations, etc.; from the area of the light-receiving area G+H before the adjustment through simulations (the area of the light-receiving area G'+the area of the light-receiving area H' shown in FIGS. 28 and 30). Alternatively, the area α/2 not receiving the stray light can be detected through simulations, etc., based on light intensity distribution of the laser beam emitted from the semiconductor laser 2.

In the light-receiving areas E and F, the light-receiving surface 12 receives a portion of the +first-order reflected light of zero-order (a portion of the first reflected light of zero-order and a portion of the fourth reflected light of zero-order) and the +first-order reflected light of +first-order (shaded portion) of the +first-order reflected light from the target information recording layer (L0 or L1). In the light-receiving areas G and H, the light-receiving surface 12 receives another portion of the +first-order reflected light of zero-order (another portion of the first reflected light and another portion of the fourth reflected light) and the +first-order reflected light of −first-order (shaded portion) of the +first-order reflected light from the target information recording layer (L0 or L1). In the light-receiving areas E to H, the light-receiving surface 12 also receives the stray light from the non-target information recording layer (L1 or L0). The light-receiving surface 12 generates photoelectric conversion signals E to H corresponding to the light amounts of the +first-order reflected light and the stray light received in the light-receiving areas E to H to be output to the operation circuits 40 and 60 in the subsequent stage. Although it is described that a portion of the +first-order reflected light of zero-order and another portion of the +first-order reflected light of zero-order are assumed to be one and the other of two divided portions of the circular +first-order reflected light of zero-order as shown in FIG. 15 in the description of the embodiment, this is not a limitation. For example, a portion of the +first-order reflected light of zero-order may be the above-mentioned portion of the +first-order reflected light of zero-order, and another portion of the +first-order reflected light of zero-order may be a subportion other than the above-mentioned portion, of the +first-order reflected light of zero-order.

Since the light-receiving surface 12 substantially uniformly receives the +first-order reflected light as shown in FIG. 15 when the zero-order light is focused on and driven to follow the target track of the target information recording layer (L0 or L1), there become substantially equal in light amount: a portion of the +first-order reflected light of zero-order and the +first-order reflected light of +first-order received in the light-receiving area E; a portion of the +first-order reflected light of zero-order and the +first-order reflected light of +first-order received in the light-receiving area F; another portion of the +first-order reflected light of zero-order and the +first-order reflected light of −first-order received in the light-receiving area G; and another portion of the +first-order reflected light of zero-order and the +first-order reflected light of −first-order received in the light-receiving area H.

The light-receiving surface 13 is adjacent to the light-receiving surface 11 with a predetermined interval on the opposite side of the light-receiving surface 12 and the whole light-receiving area is in convex shape, for example. The light-receiving surface 13 includes a light-receiving area I (first light-receiving area, fifth light-receiving area), a light-receiving area J (first light-receiving area, fifth light-receiving area), a light-receiving area K (second light-receiving area, sixth light-receiving area), and a light-receiving area L (second light-receiving area, sixth light-receiving area), for receiving the −first-order reflected light. The light-receiving areas I to L are formed by dividing the whole light-receiving area of the light-receiving surface 13 into four areas to make the light-receiving area I and the light-receiving area J in rectangular shape and to make the light-receiving area K and the light-receiving area L in square shape. Specifically, the whole light-receiving area of the light-receiving surface 13 is divided into the light-receiving areas I, J and the light-receiving areas K, L, by a first dividing line: that passes through the center of the −first-order reflected light of zero-order when the zero-order light is focused on the target track of the target information recording layer (L0 or L1); and that corresponds to the tangent line of a second adjacent track of the target information recording layer (L0 or L1) onto which the −first diffracted light is condensed. The whole light-receiving area of the light-receiving surface 13 is divided into the light-receiving areas I, L and the light-receiving areas J, K by a second dividing line and a third dividing line: that pass through the center of the −first-order reflected light of zero-order when the zero-order light is focused on the target track of the target information recording layer (L0 or L1); that are orthogonal to the first dividing line; and that correspond to the radius of the optical disc 90. As a result of the division, the light-receiving areas K and L are formed square in shape with a side length y1 which is equal to the side length of the light-receiving areas A to D and is equal to the side length of the conventional square light-receiving areas K' and L' shown in FIGS. 28 and 30. The light-receiving areas I and J are formed rectangular in shape with: a length y1, in the dividing direction corresponding to the radius of the optical disc 90, which is equal to the side length of the conventional square light-receiving areas I' and J' shown in FIGS. 28 and 30; and a length y2, in the dividing direction corresponding to the tangent line of the second adjacent track, which is shorter than the side length of the conventional square light-receiving areas I' and J'.

The length y2 of the light-receiving areas I and J is defined as follows, so as to substantially equalize the light amounts of the stray light received by the light-receiving areas in accordance with the areas thereof, between I, J and K, L. The areas of the light-receiving areas I and J will hereinafter be described in detail with reference to FIG. 16. For convenience of description, a sum of the light-receiving areas I and J is referred to as a light-receiving area I+J, and a sum of the light-receiving areas K and L is referred to as a light-receiving area K+L.

As described above, the light intensity distribution shows the light intensity thereof is the highest at the center and becomes lower with distance from the center (see FIG. 16 (including Z1 and Z2)). Therefore, the light-receiving area I+J that is a shorter distance from the light-receiving surface 11 than the light-receiving area K+L is, receives the stray light higher in light intensity than that received by the light-receiving area K+L. Therefore, if the light-receiving area I+J is equal in area to the light-receiving area K+L (if an area shown in heavy broken lines (β/2·2=β) of FIGS. 16 and 17 is added to the light-receiving area I+J), a light amount (Y2+Z2) of the stray light received by the light-receiving area I+J is greater than a light amount (X2) of the stray light received by the light-receiving area K+L in accordance with a difference in light intensity between the above two light-receiving areas. Therefore, in this embodiment, the area of the light-receiving area I+J is defined by the length y2 of the light-receiving areas I and J such that the light-receiving area I+J receives only a light amount (Y2) of the stray light substantially equal to a light amount (X2) of the stray light received by the light-receiving area K+L.

The length y2 in the light-receiving areas I and J is obtained from $$\beta/2 = y1 \cdot (y1 - y2) \text{ as follows:}$$

$$y2 = y1 - \{\beta/(2 \cdot y1)\}.$$

When the length y2 in the light-receiving areas I and J is set at a value obtained from the above equation, the area of the light-receiving area I+J is set to receive only the light amount (Y2) of the stray light substantially equal to the light amount (X2) of the stray light received by the light-receiving area I+J. It is desirable that the length y2 in the light-receiving areas I and J be equal to or greater than the radius of the −first-order reflected light of zero-order. This is because if the length y2 in the light-receiving area I and J is equal to or greater than the radius of the −first-order reflected light of zero-order, the light-receiving surface 13 receives all the −first-order reflected light in the light-receiving areas I and J, and more accurate tracking error signal and focus error signal can be detected. The above area β/2 not receiving the stray light can be detected in the same way as the above area α/2 is detected.

In the light-receiving areas I and J, the light-receiving surface 13 receives a portion of the −first-order reflected light of zero-order (a portion of the first reflected light of zero-order and a portion of seventh reflected light of zero-order) and the −first-order reflected light of +first-order (shaded portion) of the −first-order reflected light from the target information recording layer (L0 or L1). In the light-receiving areas K and L, the light-receiving surface 13 receives another portion of the −first-order reflected light of zero-order (another portion of the first reflected light and another portion of the seventh reflected light) and the −first-order reflected light of −first-order (shaded portion) of the −first-order reflected light from the target information recording layer (L0 or L1). In the light-receiving areas I to L, the light-receiving surface 13 also receives the stray light from the non-target information recording layer (L1 or L0). The light-receiving surface 13 generates photoelectric conversion signals I to L corresponding to the light amounts of the −first-order reflected light and the stray light received in the light-receiving areas I to L to be output to the operation circuits 40 and 60 in the subsequent stage. Although a portion of the −first-order reflected light of zero-order and another portion of the −first-order reflected light of zero-order are assumed to be one and the other of two divided portions of the circular −first-order reflected light of zero-order as shown in FIG. 15 in the description of the embodiment, this is not a limitation. For example, a portion of the −first-order reflected light of zero-order maybe the above-mentioned portion of the −first-order reflected light of zero-order, and another portion of the −first-order reflected light of zero-order may be a subportion other than the above-mentioned portion, of the −first-order reflected light of zero-order.

Since the light-receiving surface 13 substantially uniformly receives the −first-order reflected light as shown in FIG. 15 when the zero-order light is focused on and driven to follow the target track of the target information recording layer (L0 or L1), there become substantially equal in light amount: a portion of the −first-order reflected light of zero-order and the −first-order reflected light of +first-order received in the light-receiving area I; a portion of the −first-order reflected light of zero-order and the −first-order reflected light of +first-order received in the light-receiving area J; another portion of the −first-order reflected light of zero-order and the −first-order reflected light of −first-order received in the light-receiving area K; and another portion of the −first-order reflected light of zero-order and the −first-order reflected light of −first-order received in the light-receiving area L.

==Cancellation of Stray Light Using Photodetector (3)==

The effects of the light reception result of the photodetector 10 according to one embodiment of the present invention will be described with reference to FIGS. 18 and 19, and FIG. 15 as needed.

<<When Generating Tracking Error Signal>>

Figure 18:
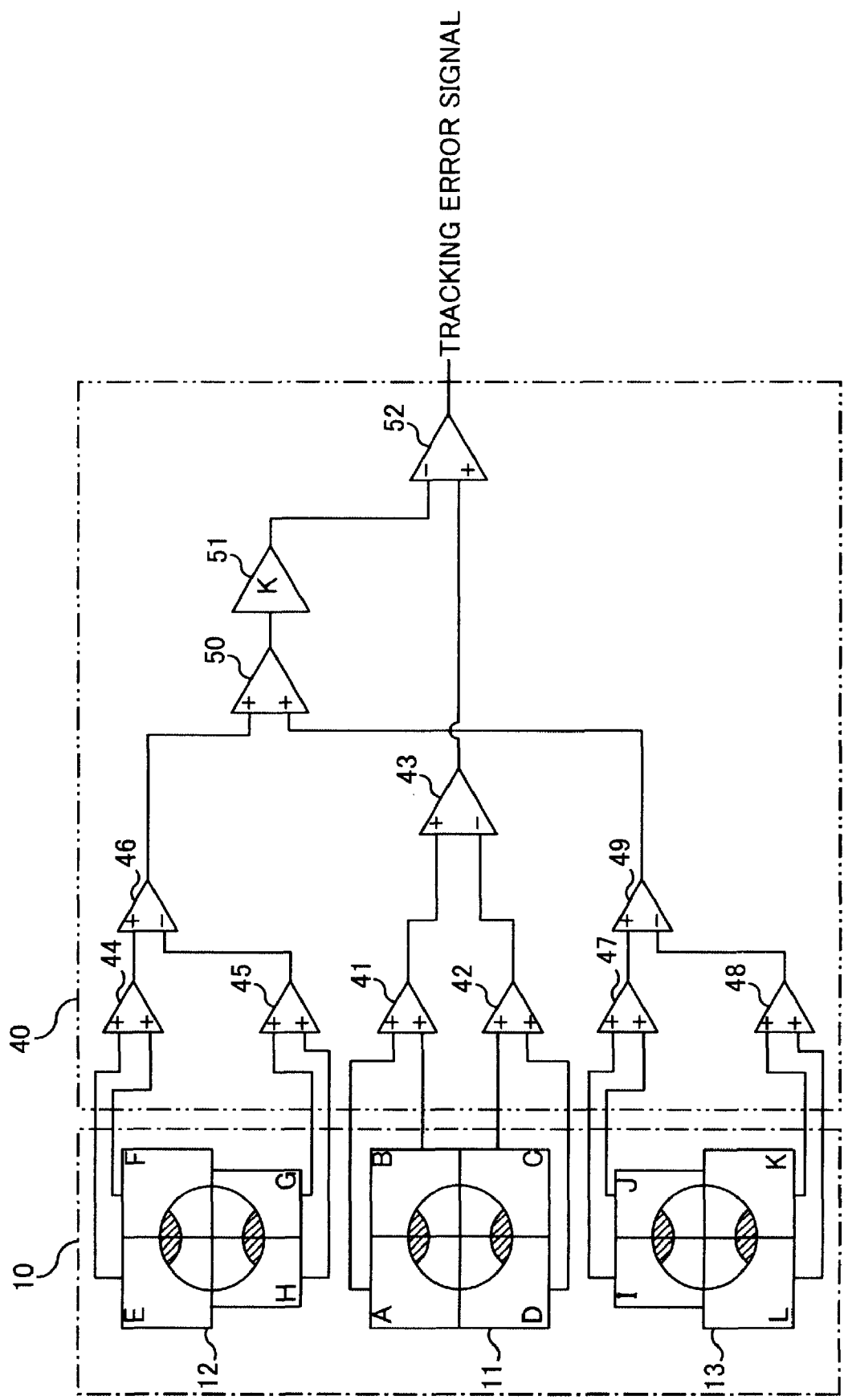
FIG. 18 is a circuit diagram of an overall configuration of an operation circuit that generates a tracking error signal.

FIG. 18 is a circuit diagram of an example of an overall configuration of the operation circuit 40 that generates a tracking error signal based on the light reception result of the photodetector 10 according to one embodiment of the present invention.

The operation circuit 40 includes adders 41, 42, 44, 45, 47, 48, 50, subtracters 43, 46, 49, 52, and an amplifier 51.

The adders 41, 42, and the subtracter 43 are disposed for generating a signal corresponding to the light amount of the zero-order reflected light, which is a basis of the tracking error signal.

The adder 41 adds: the photoelectric conversion signal A corresponding to the light amounts of a portion of the zero-order reflected light of zero-order and the zero-order reflected light of +first-order received in the light-receiving area A of the light-receiving surface 11 of the photodetector 10; and the photoelectric conversion signal B corresponding to the light amounts of a portion of the zero-order reflected light of zero-order and the zero-order reflected light of +first-order received in the light-receiving area B.

The adder 42 adds: the photoelectric conversion signal C corresponding to the light amounts of another portion of the zero-order reflected light of zero-order and the zero-order reflected light of −first-order received in the light-receiving area C of the light-receiving surface 11 of the photodetector 10; and the photoelectric conversion signal D corresponding to the light amounts of another portion of the zero-order reflected light of zero-order and the zero-order reflected light of −first-order received in the light-receiving area D.

The subtracter 43 subtracts: the addition result of the adder 42 (photoelectric conversion signal C+photoelectric conversion signal D); from the addition result of the adder 41 (photoelectric conversion signal A+photoelectric conversion signal B). As a result, the subtracter 43 outputs a signal {(photoelectric conversion signal A+photoelectric conversion signal B)−(photoelectric conversion signal C+photoelectric conversion signal D)} corresponding to the light amount of the zero-order reflected light, which is a basis of the tracking error signal.

The adders 44, 45, and the subtracter 46 are disposed for generating a signal corresponding to the light amount of the +first-order reflected light with the stray light canceled out, which is a basis of the tracking error signal.

The adder 44 adds: the photoelectric conversion signal E corresponding to the light amounts of a portion of the +first-order reflected light of zero-order, the +first-order reflected light of +first-order, and the stray light received in the light-receiving area E of the light-receiving surface 12 of the photodetector 10; and the photoelectric conversion signal F corresponding to the light amounts of a portion of the +first-order reflected light of zero-order, the +first-order reflected light of +first-order, and the stray light received in the light-receiving area F. In the photoelectric conversion signal E and the photoelectric conversion signal F, the components corresponding to the light amounts of a portion of the +first-order reflected light of zero-order and the +first-order reflected light of +first-order are hereinafter referred to as the photoelectric conversion signal E(1) and the photoelectric conversion signal F(1) in the following description. Therefore, the addition result of the adder 44 is photoelectric conversion signal E(1)+photoelectric conversion signal E(2)+photoelectric conversion signal F(1)+photoelectric conversion signal F(2).

The adder 45 adds: the photoelectric conversion signal G corresponding to the light amounts of another portion of the +first-order reflected light of zero-order, the +first-order reflected light of −first-order, and the stray light received in the light-receiving area G of the light-receiving surface 12 of the photodetector 10; and the photoelectric conversion signal H corresponding to the light amounts of another portion of the +first-order reflected light of zero-order, the +first-order reflected light of −first-order, and the stray light received in the light-receiving area H. In the photoelectric conversion signal G and the photoelectric conversion signal H, the components corresponding to the light amounts of another portion of the +first-order reflected light of zero-order and the +first-order reflected light of −first-order are hereinafter referred to as the photoelectric conversion signal G(1) and the photoelectric conversion signal H(1) in the following description. Therefore, the addition result of the adder 45 is photoelectric conversion signal G(1)+photoelectric conversion signal G(2)+photoelectric conversion signal H(1)+photoelectric conversion signal H(2).

The subtracter 46 subtracts: the addition result of the adder 45 (photoelectric conversion signal G(1)+photoelectric conversion signal G(2)+photoelectric conversion signal H(1)+ photoelectric conversion signal H(2)); from the addition result of the adder 44 (photoelectric conversion signal E(1)+ photoelectric conversion signal E(2)+photoelectric conversion signal F(1)+photoelectric conversion signal F(2). Since the area of the light-receiving area G+H is set to receive only the light amount (Y1) of the stray light substantially equal to the light amount (X1) of the stray light received by the light-receiving area E+F, photoelectric conversion signal E(2)+ photoelectric conversion signal F(2) and photoelectric conversion signal G(2)+photoelectric conversion signal H(2) are substantially equal in terms of the corresponding light amount (X1 or Y1). As a result, photoelectric conversion signal E(2)+photoelectric conversion signal F(2) are canceled out by photoelectric conversion signal G(2)+photoelectric conversion signal H(2) through the subtracting process of the subtracter 46. That is, the stray light received by the light-receiving areas E and F of the light receiving surface 12 is canceled out by the stray light received by the light-receiving areas G and H. Therefore, the subtraction result of the subtracter 46 is photoelectric conversion signal E(1)+photoelectric conversion signal F(1)−(photoelectric conversion signal G(1)+photoelectric conversion signal H(1)), which corresponds to the light amount of the +first-order reflected light with the stray light canceled out, and there can be prevented or alleviated the effects of the stray light received in the light-receiving areas E to L of the light-receiving surface 12 on the tracking error signal.

The adders 47, 48, and the subtracter 49 are disposed for generating a signal corresponding to the light amount of the −first-order reflected light with the stray light canceled out, which is a basis of the tracking error signal.

The adder 47 adds: the photoelectric conversion signal I corresponding to the light amounts of a portion of the −first-order reflected light of zero-order, the −first-order reflected light of +first-order, and the stray light received in the light-receiving area I of the light-receiving surface 13 of the photodetector 10; and the photoelectric conversion signal J corresponding to the light amounts of a portion of the −first-order reflected light of zero-order, the −first-order reflected light of +first-order, and the stray light received in the light-receiving area J. In the photoelectric conversion signal I and the photoelectric conversion signal J, the components corresponding to the light amounts of a portion of the −first-order reflected light of zero-order and the −first-order reflected light of +first-order are hereinafter referred to as the photoelectric conversion signal I(1) and the photoelectric conversion signal J(1) and the components corresponding to the light amounts of the stray light are referred to as the photoelectric conversion signal I(2) and the photoelectric conversion signal J(2) in the following description.

The adder 48 adds: the photoelectric conversion signal K corresponding to the light amounts of another portion of the −first-order reflected light of zero-order, the −first-order reflected light of −first-order, and the stray light received in the light-receiving area K of the light-receiving surface 13 of the photodetector 10; and the photoelectric conversion signal L corresponding to the light amounts of another portion of the −first-order reflected light of zero-order, the −first-order reflected light of −first-order, and the stray light received in the light-receiving area L. In the photoelectric conversion signal K and the photoelectric conversion signal L, the components corresponding to the light amounts of another portion of the −first-order reflected light of zero-order and the −first-order reflected light of −first-order are hereinafter referred to as the photoelectric conversion signal K(1) and the photoelectric conversion signal L(1) and the components corresponding to the light amounts of the stray light are hereinafter referred to as the photoelectric conversion signal K(2) and the photoelectric conversion signal L(2) in the following description.

The subtracter 49 subtracts: the addition result of the adder 48 (photoelectric conversion signal K(1)+photoelectric conversion signal K(2)+photoelectric conversion signal L(1)+ photoelectric conversion signal L(2)); from the addition result of the adder 47 (photoelectric conversion signal I(1)+ photoelectric conversion signal I(2)+photoelectric conversion signal J(1)+photoelectric conversion signal J(2)). Since the area of the light-receiving area I+J is set to receive only the light amount (Y2) of the stray light substantially equal to the light amount (X2) of the stray light received by the light-receiving area K+L, photoelectric conversion signal I(2)+ photoelectric conversion signal J(2) and photoelectric conversion signal K(2)+photoelectric conversion signal L(2) are substantially equal in terms of the corresponding light amount (X2 or Y2). As a result, photoelectric conversion signal I(2)+photoelectric conversion signal J(2) are canceled out by photoelectric conversion signal K(2)+photoelectric conversion signal L(2) through the subtracting process of the subtracter 49. That is, the stray light received by the light-receiving areas I and J of the light receiving surface 13 is canceled out by the stray light received by the light-receiving areas K and L. Therefore, the subtraction result of the subtracter 49 is photoelectric conversion signal I(1)+photoelectric conversion signal J(1)−(photoelectric conversion signal K(1)+photoelectric conversion signal L(1)), which corresponds to the light amount of the −first-order reflected light with the stray light canceled out, and there can be prevented or alleviated the effects of the stray light received in the light-receiving areas I to L of the light-receiving surface 13 on the tracking error signal.

The adder 50 adds: the subtraction result of the subtracter 46 {(photoelectric conversion signal E(1)+photoelectric conversion signal F(1)−(photoelectric conversion signal G(1)+photoelectric conversion signal H(1))}; and the subtraction result of the subtracter 49 {(photoelectric conversion signal I(1)+photoelectric conversion signal J(1)−(photoelectric conversion signal K(1)+photoelectric conversion signal L(1))}.

The amplifier 51 amplifies at an amplification rate K the addition result of the adder 501 (photoelectric conversion signal E(1)+photoelectric conversion signal F(1))−(photoelectric conversion signal G(1)+photoelectric conversion signal H(1))+(photoelectric conversion signal I(1)+photoelectric conversion signal J(1))−(photoelectric conversion signal K(1)+photoelectric conversion signal L(1))}. The amplification rate K is a value defined to adjust a difference in light intensity between the zero-order light and the ±first-order diffracted light due to the diffraction efficiency of the diffraction grating 3.

The subtracter 52 subtracts the amplification result of the amplifier 51 [K·{(photoelectric conversion signal E(1)+photoelectric conversion signal F(1))−(photoelectric conversion signal G(1)+photoelectric conversion signal H(1))+(photoelectric conversion signal I(1)+photoelectric conversion signal J(1))−(photoelectric conversion signal K(1)+photoelectric conversion signal L(1))}]; from the subtraction result of the subtracter 43 {(photoelectric conversion signal A+photoelectric conversion signal B)−(photoelectric conversion signal C+photoelectric conversion signal D)}, to generate a tracking error signal. The tracking error signal is {(photoelectric conversion signal A+photoelectric conversion signal B)−(photoelectric conversion signal C+photoelectric conversion signal D)}−K·{(photoelectric conversion signal E(1)+photoelectric conversion signal F(1))−(photoelectric conversion signal G(1)+photoelectric conversion signal H(1))+(photoelectric conversion signal I(1)+photoelectric conversion signal J(1))−(photoelectric conversion signal K(1)+photoelectric conversion signal L(1))}, which is a signal exhibiting the cancellation out of the stray lights received: by the light-receiving areas E to H of the light-receiving surface 12; and by the light-receiving areas I to L of the light-receiving surface 13. That is, there is generated a tracking error signal that accurately corresponds to the displacement of the zero-order light with respect to the target track of the target information recording layer (L0 or L1).

<<When Generating Focus Error Signal>>

Figure 19:
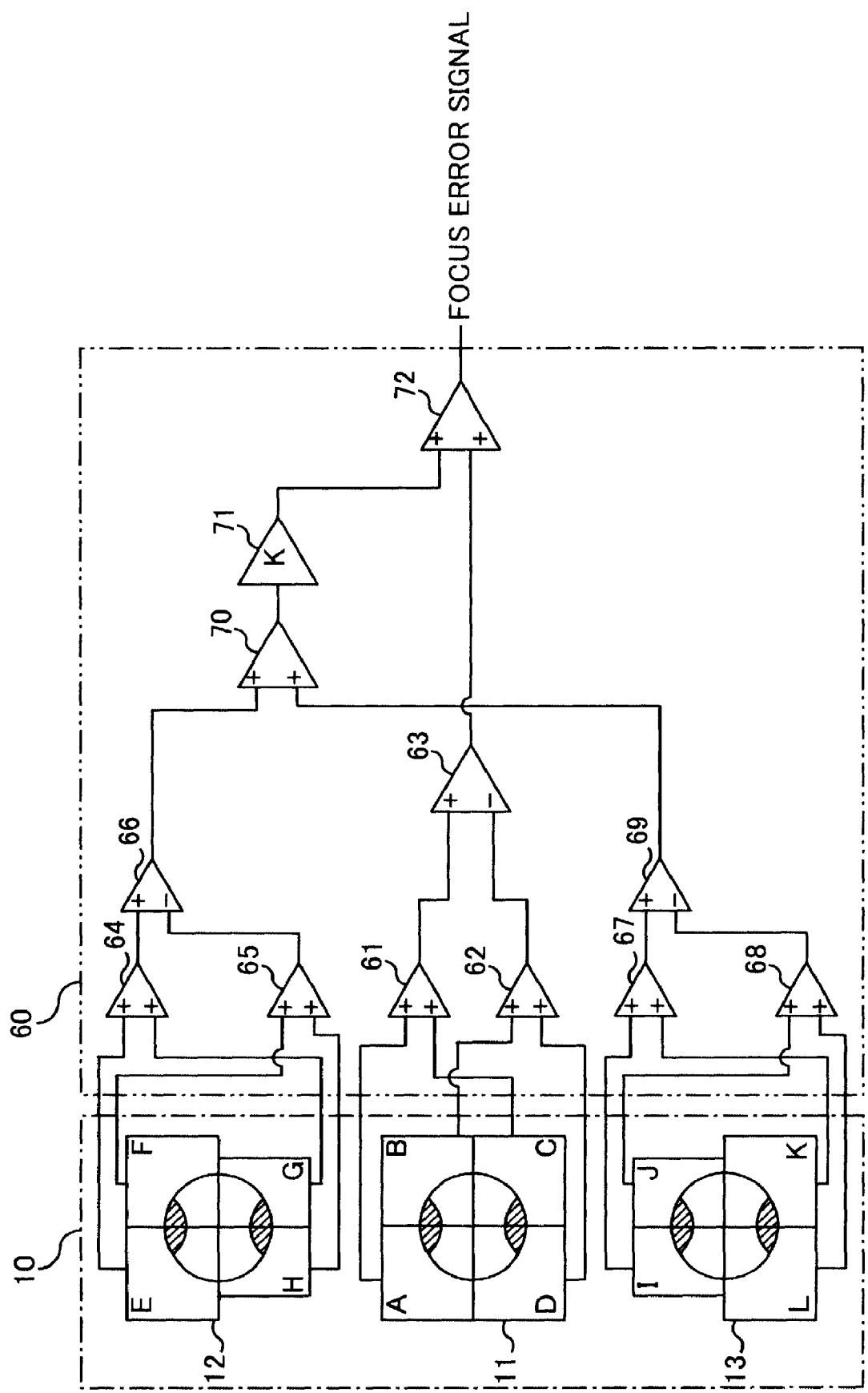
FIG. 19 is a circuit diagram of an overall configuration of an operation circuit that generates a focus error signal.

FIG. 19 is a circuit diagram of an example of an overall configuration of the operation circuit 60 that generates a focus error signal based on the light reception result of the photodetector 10 according to one embodiment of the present invention.

The operation circuit 60 includes adders 61, 62, 64, 65, 67, 68, 70, 72, subtracters 63, 66, 69, and an amplifier 71.

The adders 61, 62, and the subtracter 63 are disposed for generating a signal corresponding to the light amount of the zero-order reflected light, which is a basis of the focus error signal.

The adder 61 adds: the photoelectric conversion signal A corresponding to the light amounts of a portion of the zero-order reflected light of zero-order and the zero-order reflected light of +first-order received in the light-receiving area A of the light-receiving surface 11 of the photodetector 10; and the photoelectric conversion signal C corresponding to the light amounts of another portion of the zero-order reflected light of zero-order and the zero-order reflected light of −first-order received in the light-receiving area C.

The adder 62 adds: the photoelectric conversion signal B corresponding to the light amounts of a portion of the zero-order reflected light of zero-order and the zero-order reflected light of +first-order received in the light-receiving area B of the light-receiving surface 11 of the photodetector 10; and the photoelectric conversion signal D corresponding to the light amounts of another portion of the zero-order reflected light of zero-order and the zero-order reflected light of −first-order received in the light-receiving area D.

The subtracter 63 subtracts: the addition result of the adder 62 (photoelectric conversion signal B+photoelectric conversion signal D); from the addition result of the adder 61 (photoelectric conversion signal A+photoelectric conversion signal C). As a result, the subtracter 63 outputs a signal {(photoelectric conversion signal A+photoelectric conversion signal C)−(photoelectric conversion signal B+photoelectric conversion signal D)} corresponding to the light amount of the zero-order reflected light, which is a basis of the focus error signal.

The adders 64, 65, and the subtracter 66 are disposed for generating a signal corresponding to the light amount of the +first-order reflected light with the stray light canceled out, which is a basis of the focus error signal.

The adder 64 adds: the photoelectric conversion signal E(1) corresponding to the light amounts of a portion of the +first-order reflected light of zero-order and the +first-order reflected light of +first-order and the photoelectric conversion signal E(2) corresponding to the light amount of the stray light received in the light-receiving area E of the light-receiving surface 12 of the photodetector 10; and the photoelectric conversion signal G(1) corresponding to the light amounts of another portion of the +first-order reflected light of zero-order and the +first-order reflected light of −first-order and the photoelectric conversion signal G(2) corresponding to the light amount of the stray light received in the light-receiving area G.

The adder 65 adds: the photoelectric conversion signal F(1) corresponding to the light amounts of a portion of the +first-order reflected light of zero-order and the +first-order reflected light of +first-order and the photoelectric conversion signal F(2) to the light amount of the stray light received in the light-receiving area F of the light-receiving surface 12 of the photodetector 10; and the photoelectric conversion signal H(1) corresponding to the light amounts of another portion of the +first-order reflected light of zero-order and the +first-order reflected light of −first-order and the photoelectric conversion signal H(2) corresponding to the light amount of the stray light received in the light-receiving area H.

The subtracter 66 subtracts: the addition result of the adder 65 (photoelectric conversion signal F(1)+photoelectric conversion signal F(2)+photoelectric conversion signal H(1)+photoelectric conversion signal H(2)); from the addition result of the adder 64 (photoelectric conversion signal E(1)+photoelectric conversion signal E(2)+photoelectric conversion signal G(1)+photoelectric conversion signal G(2)). The area of the light-receiving area G+H is set to receive only the light amount (Y1) of the stray light substantially equal to the light amount (X1) of the stray light received by the light-receiving area E+F; the light-receiving areas E and F are equal in area; the light-receiving areas G and H are equal in area; and therefore, photoelectric conversion signal E(2)+photoelectric conversion signal G(2) and photoelectric conversion signal F(2)+photoelectric conversion signal H(2) are substantially equal in light amount (X1 or Y1). As a result, photoelectric conversion signal E(2)+photoelectric conversion signal G(2) are canceled out by photoelectric conversion signal F(2)+photoelectric conversion signal H(2) through the subtracting process of the subtracter 66. That is, the stray light received by the light-receiving areas E and G of the light receiving surface 12 is canceled out by the stray light received by the light-receiving areas F and H. Therefore, the subtraction result of the subtracter 66 is photoelectric conversion signal E(1)+photoelectric conversion signal G(1)−(photoelectric conversion signal F(1)+photoelectric conversion signal H(1)), which corresponds to the light amount of the +first-order reflected light with the stray light canceled out, and there can be prevented or alleviated the effects of the stray light received in the light-receiving areas E to L of the light-receiving surface 12 on the focus error signal.

The adders 67, 68, and the subtracter 69 are disposed for generating a signal corresponding to the light amount of the −first-order reflected light with the stray light canceled out, which is a basis of the focus error signal.

The adder 67 adds: the photoelectric conversion signal I(1) corresponding to the light amounts of a portion of the −first-order reflected light of zero-order and the −first-order reflected light of +first-order and the photoelectric conversion signal I(2) corresponding to the light amount of the stray light received in the light-receiving area I of the light-receiving surface 13 of the photodetector 10; and the photoelectric conversion signal K(1) corresponding to the light amounts of another portion of the −first-order reflected light of zero-order and the −first-order reflected light of −first-order and the photoelectric conversion signal K(2) corresponding to the light amount of the stray light received in the light-receiving area K.

The adder 68 adds: the photoelectric conversion signal J(1) corresponding to the light amounts of a portion of the −first-order reflected light of zero-order and the −first-order reflected light of +first-order and the photoelectric conversion signal J(2) corresponding to the light amount of the stray light received in the light-receiving area J of the light-receiving surface 13 of the photodetector 10; and the photoelectric conversion signal L(1) corresponding to the light amounts of another portion of the −first-order reflected light of zero-order and the −first-order reflected light of −first-order and the photoelectric conversion signal L(2) corresponding to the light amount of the stray light received in the light-receiving area L.

The subtracter 69 subtracts: the addition result of the adder 68 (photoelectric conversion signal J(1)+photoelectric conversion signal J(2)+photoelectric conversion signal L(1)+ photoelectric conversion signal L(2)); from the addition result of the adder 67 (photoelectric conversion signal I(1)+ photoelectric conversion signal I(2)+photoelectric conversion signal K(1)+photoelectric conversion signal K(2)). The area of the light-receiving area I+J is set to receive only the light amount (Y2) of the stray light substantially equal to the light amount (X2) of the stray light received by the light-receiving area K+L; the light-receiving areas I and J are equal in area; the light-receiving areas K and L are equal in area; and therefore, photoelectric conversion signal I(2)+photoelectric conversion signal K(2) and photoelectric conversion signal J(2)+photoelectric conversion signal L(2) are substantially equal in light amount (X2 or Y2). As a result, photoelectric conversion signal I(2)+photoelectric conversion signal K(2) are canceled out by photoelectric conversion signal J(2)+ photoelectric conversion signal L(2) through the subtracting process of the subtracter 69. That is, the stray light received by the light-receiving areas I and K of the light receiving surface 13 is canceled out by the stray light received by the light-receiving areas J and L. Therefore, the subtraction result of the subtracter 69 is photoelectric conversion signal I(1)+photoelectric conversion signal K(1)−(photoelectric conversion signal J(1)+photoelectric conversion signal L(1)), which corresponds to the light amount of the −first-order reflected light with the stray light canceled out, and there can be prevented or alleviated the effects of the stray light received in the light-receiving areas I to L of the light-receiving surface 13 on the focus error signal.

The adder 70 adds: the subtraction result of the subtracter 66 {(photoelectric conversion signal E(1)+photoelectric conversion signal G(1)−(photoelectric conversion signal F(1)+ photoelectric conversion signal H(1))}; and the subtraction result of the subtracter 69 {(photoelectric conversion signal I(1)+photoelectric conversion signal K(1)−(photoelectric conversion signal J(1)+photoelectric conversion signal L(1))}.

The amplifier 71 amplifies at an amplification rate K the addition result of the adder 70 {(photoelectric conversion signal E(1)+photoelectric conversion signal G(1))−(photoelectric conversion signal F(1)+photoelectric conversion signal H(1))+(photoelectric conversion signal I(1)+photoelectric conversion signal K(1))−(photoelectric conversion signal J(1)+photoelectric conversion signal L (1))}. The amplification rate K is substantially equal to the amplification rate K of the amplifier 51 of the operation circuit 40 in the preceding stage.

The adder 72 adds: the subtraction result of the subtracter 63 {(photoelectric conversion signal A+photoelectric conversion signal C)−(photoelectric conversion signal B+photoelectric conversion signal D)}; and the amplification result of the amplifier 71 [K·{(photoelectric conversion signal E(1)+ photoelectric conversion signal G(1))−(photoelectric conversion signal F(1)+photoelectric conversion signal H(1))+(photoelectric conversion signal I(1)+photoelectric conversion signal K(1))−(photoelectric conversion signal J(1)+photoelectric conversion signal L(1))}], to generate a focus error signal. The focus error signal is {(photoelectric conversion signal A+photoelectric conversion signal C)−(photoelectric conversion signal B+photoelectric conversion signal D)}+ K·{(photoelectric conversion signal E(1)+photoelectric conversion signal G(1))−(photoelectric conversion signal F(1)+ photoelectric conversion signal H(1))+(photoelectric conversion signal I(1)+photoelectric conversion signal K(1))−(photoelectric conversion signal J(1)+photoelectric conversion signal L(1))}, which is a signal exhibiting the cancellation out of the stray lights received: by the light-receiving areas E to H of the light-receiving surface 12; and by the light-receiving areas I to L of the light-receiving surface 13. That is, there is generated a focus error signal that accurately corresponds to the displacement of the zero-order light with respect to the target information recording layer (L0 or L1). As a result, the zero-order light can accurately be focused on and driven to follow one information recording layer (L0 or L1) of the optical disc 90 and information can favorably be reproduced from or recorded in the optical disc 90 by performing the focus control based on this focus error signal and the tracking control based on the above tracking error signal.

According to the above embodiment, the stray light received by the light-receiving area E+F (K+L) and the stray light received by the light-receiving area G+H (I+J) can be canceled out with each other, by setting the areas of the light-receiving area E+F (K+L) and the light-receiving area G+H (I+J) so as to substantially equalize the light amounts of the stray light from the other information recording layer of the optical disc 90, between the area E+F (K+L) and the area G+H (I+J). As a result, good tracking error signal and/or focus error signal can be detected and the zero-order light can accurately be condensed on one information recording layer of the optical disc 90. Therefore, information can favorably be reproduced from or recorded in one information recording layer of the optical disc 90. Since no light-receiving surface needs to be disposed separately for receiving the stray light, the size, costs, etc., can be reduced in the photodetector 10.

The stray light received by the light-receiving area E+F (K+L) and the stray light received by the light-receiving area G+H (I+J) can certainly be canceled out with each other by setting the area of the light-receiving area H+G (I+J) that is a shorter distance from the light-receiving surface 11 smaller than the light-receiving area E+F (K+L) that receives the stray light having a light intensity lower than that of the stray light received by the light-receiving area H+G (I+J). Since the area of the light-receiving area G+H (I+J) is set by subtracting the area α (β) from an area of the conventional light-receiving area G'+H' (I'+J') (area obtained by adding α (β) to the area of the light-receiving area G+H (I+J)), the size, etc., can be reduced in the photodetector 10.

Since the light-receiving areas E to H and I to L are formed by dividing the whole light-receiving areas of the light-receiving surface 12 and 13 with the above first to third dividing lines, the focus control can be performed based on the differential astigmatic method.

Since the light-receiving surface 12, the light-receiving surface 13, and the light-receiving areas E to L are disposed correspondingly to the +first-order diffracted light and −first-order diffracted light generated based on the laser beam, the stray light received by the light-receiving area E+F and the stray light received by the light-receiving area G+H can be canceled out with each other, and the stray light received by the light-receiving area I+J and the stray light received by the light-receiving area K+L can be canceled out with each other. As a result, the detection of the tracking error signal and/or the detection of the focus error signal can appropriately be performed with the +first-order reflected light and the −first-order reflected light, and the zero-order light can accurately be condensed on one information recording layer of the optical disc 90.

By setting the areas of the light-receiving area E+F (K+L) and the light-receiving area G+H (I+J) so as to substantially equalize the light amounts of the stray light from the other information recording layer of the optical disc 90, between the area E+F (K+L) and the area G+H (I+J), the optical pickup apparatus 1 can be provided in which the stray light received by the light-receiving area E+F (K+L) and the stray light received by the light-receiving area G+H (I+J) can be canceled out with each other. As a result, good tracking error signal and/or focus error signal can be detected and the zero-order light can accurately be condensed on one information recording layer of the optical disc 90. Therefore, information can favorably be reproduced from or recorded in one information recording layer of the optical disc 90. Since no light-receiving surface needs to be disposed separately for receiving the stray light, the size, costs, etc., can be reduced in the photodetector 10 included in the optical pickup apparatus 1.

Other Embodiments of Photodetector (3)

First Other Embodiment

<Configuration>

Figure 20:
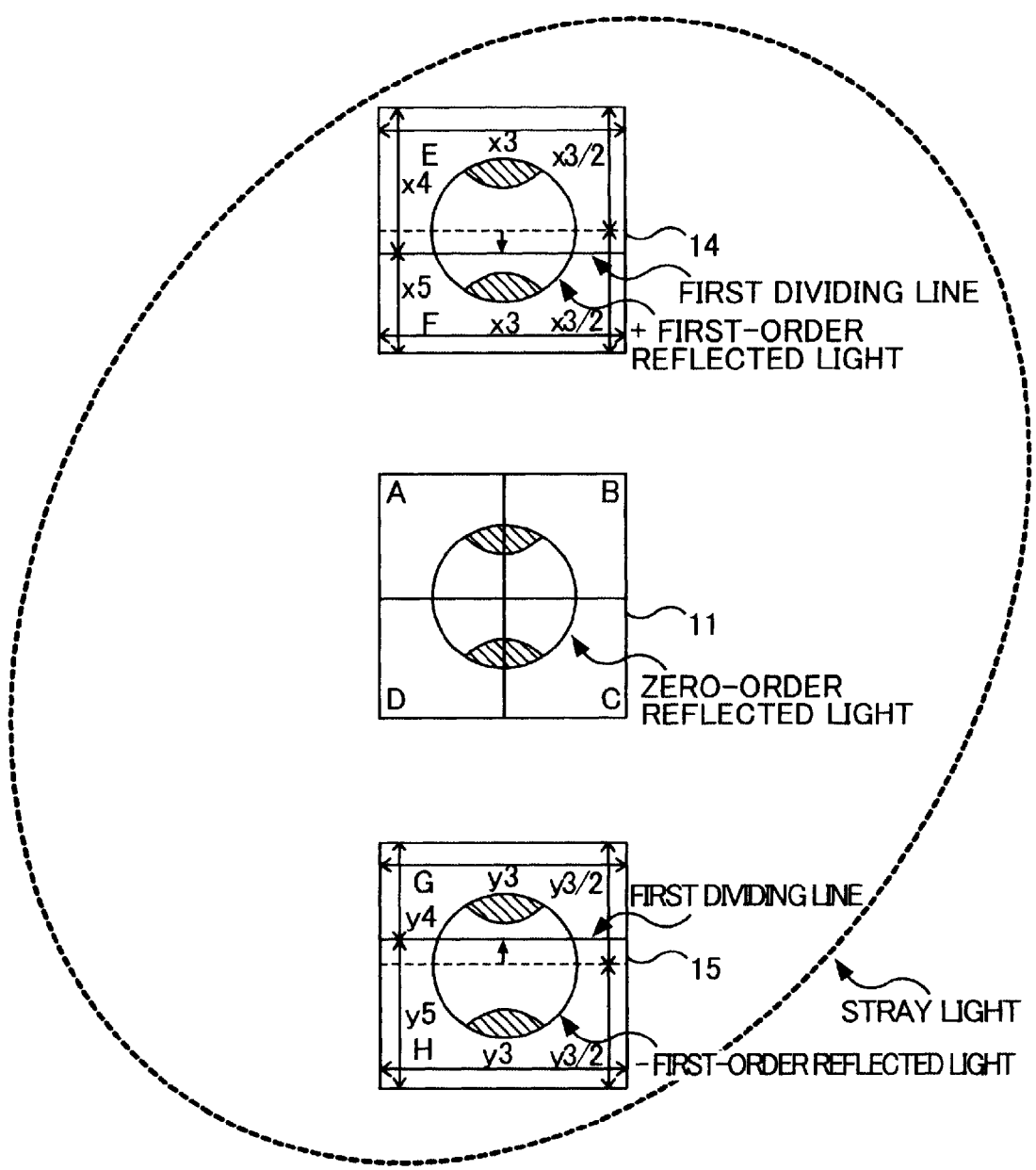
FIG. 20 is a diagram of another embodiment of the light-receiving surfaces included in the photodetector according to one embodiment of the present invention.
Figure 21:
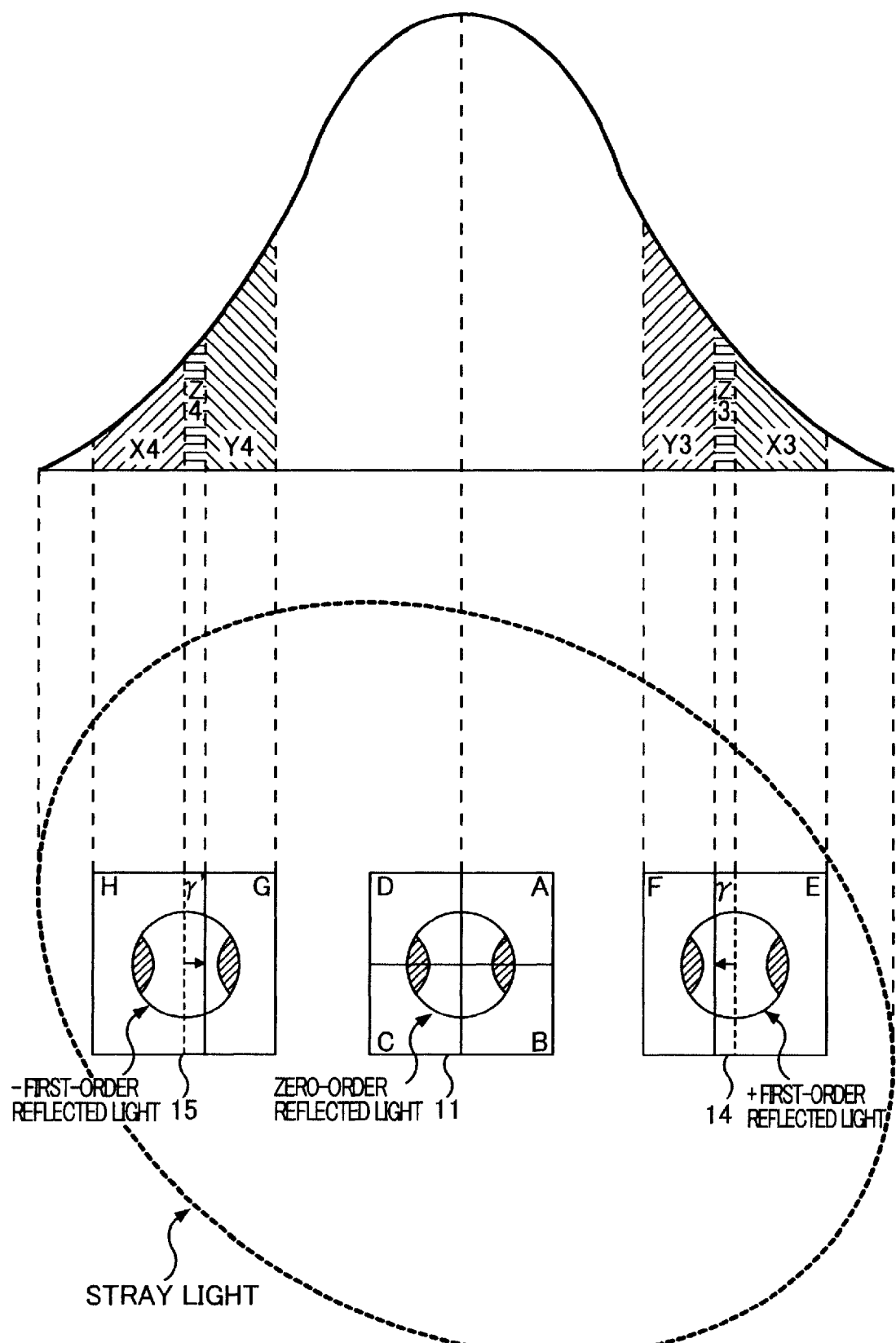
FIG. 21 is a diagram of light intensity distribution of stray light received by the light-receiving surfaces of the photodetector according to one embodiment of the present invention.

Other Embodiments of the photodetector 10 according to one embodiment of the present invention will hereinafter be described with reference to FIGS. 20 and 21, and FIGS. 17, 28, and 30 as needed. FIG. 20 is a diagram of the light-receiving surfaces 11, 14 and 15 included in the photodetector 10 according to one embodiment of the present invention. FIG. 21 is a diagram of light intensity distribution of stray light received by the light-receiving surfaces 11, 14 and 15 of the photodetector 10 according to one embodiment of the present invention. In the light-receiving surfaces 11, 14 and 15 of FIGS. 20 and 21, the same reference numerals are added to the same constituent elements as those in FIG. 15 and the description thereof will be omitted. It is assumed that the optical pickup apparatus 1 (see FIG. 2) provided with the photodetector 10 including the light-receiving surfaces shown in FIGS. 20 and 21 perform, for example, the tracking control based on the differential push-pull method and the focus control based on the differential astigmatic method in the following description.

The light-receiving surface 14 is adjacent to the light-receiving surface 11 with a predetermined interval and the whole light-receiving area is in square shape, for example. The light-receiving surface 14 includes a light-receiving area E(first light-receiving area, third light-receiving area) and a light-receiving area F (second light-receiving area, fourth light-receiving area) for receiving the +first-order reflected light. The light-receiving area E and the light-receiving area F are formed by dividing the whole light-receiving area of the light-receiving surface 14 into two areas to make the shape thereof into a rectangular shape. Specifically, the light-receiving area E and the light-receiving area F, into which the whole light-receiving area of the light-receiving surface 14 is divided by a first dividing line parallel to a line segment corresponding to a tangent line of the first adjacent track of the target information recording layer (L0 or L1) onto which the +first diffracted light is condensed. As a result of the division, the light-receiving area E becomes a rectangular shape; the length thereof in the dividing direction corresponding to a tangent line of the above first adjacent track is a length x3 equal to a longitudinal length of light-receiving area A+light-receiving area B (light-receiving area C+light-receiving area D) and equal to a longitudinal length of the conventional rectangular light-receiving area E'+F' shown in FIGS. 28 and 30; and the length thereof in the direction corresponding to the radius of the optical disc 90 is a length x4 longer than a length of the short side of the conventional rectangular light-receiving area E'+F'. The light-receiving area F becomes a rectangular shape; the length thereof in the dividing direction corresponding to a tangent line of the above first adjacent track is a length x3 equal to a longitudinal length of light-receiving area A+light-receiving area B (light-receiving area C+light-receiving area D) and equal to a longitudinal length of the conventional rectangular light-receiving area G'+H' shown in FIGS. 28 and 30; and the length thereof in the direction corresponding to the radius of the optical disc 90 is a length x5 shorter than a length of the short side of the conventional rectangular light-receiving area G'+H'. The length x4 of the light-receiving areas E and the length x5 of the light-receiving areas F are defined as follows, so as to substantially equalize the light amounts of the stray light received by the light-receiving areas in accordance with the areas thereof, between E and F.

Since the laser beam emitted by the semiconductor laser 2 has light intensity exhibiting the Gaussian distribution as described above, the light intensity distribution of the stray light shows the light intensity thereof is the highest at the center and becomes lower with distance from the center as shown in FIG. 21. Therefore, the light-receiving area F that is a shorter distance from the light-receiving surface 11 than the light-receiving area E is, receives the stray light higher in light than that received by the light-receiving area E. Therefore, if the light-receiving area E is equal in area to the light-receiving area F (if the whole light-receiving area of the light-receiving surface 14 is divided by a broken line shown in FIGS. 20 and 21), a light amount (Y3+Z3) of the stray light received by the light-receiving area F becomes greater than a light amount (X3) of the stray light received by the light-receiving area E in accordance with a difference in light intensity between the above two light-receiving areas. Therefore, in this embodiment, the area of the light-receiving area E is defined by the length x4 and the area of the light-receiving area F is defined by the length x5 so as to substantially equalize the light amounts of the stray light received by the light-receiving areas in accordance with the areas thereof, between E and F. It is assumed in this description that when the light-receiving area E receives a light amount X3+Z3 of the stray light in accordance with the area thereof and the light-receiving area F receives a light amount Y3 of the stray light in accordance with the area thereof, the light amounts X3+Z3 and Y3 of the stray light are substantially equal. It is also assumed that γ is an area to be added to the area of the light-receiving area E to set the light amount of the stray light received by the light-receiving area E to X3+Z3 when the light-receiving area E is equal in area to the light-receiving area F. Conversely, γ is an area to be subtracted from the area of the light-receiving area F to set the light amount of the stray light received by the light-receiving area F to Y3 when the light-receiving area E is equal in area to the light-receiving area F.

The length x4 of the light-receiving area E is obtained from $$x4 = \gamma/x3 + x3/2$$
$$= (2 \cdot \gamma + x3^2)/2 \cdot x3.$$

The length x5 of the light-receiving area F is obtained from $$x5 = x3 - x4$$
$$= (x3^2 - 2 \cdot \gamma)/2 \cdot x3.$$

When the length x4 of the light-receiving area E is set to a value obtained from the above equation and the length x5 of the light-receiving area F is set to a value obtained from the above equation, the area of the light-receiving area E and the area of the light-receiving area F are set such that the light amount of the stray light received by the light-receiving area E becomes X3+Z3 and that the light amount of the stray light received by the light-receiving area F becomes Y3. With regard to the length x4 of the light-receiving area E and the length x5 of the light-receiving area F, it is desirable that the dividing line of the light-receiving areas E and F defined by x4 and x5 be positioned between the +first-order reflected light of +first-order and the +first-order reflected light of −first-order. This is because when the dividing line of the light-receiving areas E and F defined by x4 and x5 is positioned between the +first-order reflected light of +first-order and the +first-order reflected light of −first-order, the light-receiving area E receives all the +first-order reflected light of +first-order; the light-receiving area F receives all the +first-order reflected light of −first-order; and more accurate tracking error signals can be detected.

The above area γ to be added to the light-receiving area E(conversely, the area γ subtracted from the light-receiving area F) can be detected, for example, by using the following method. When the diffraction grating 3 is rotated in a predetermined direction (e.g., from the top side toward the back side of the page of FIG. 2), the light-receiving surface 14 receives only the stray light in the light-receiving areas E and F as shown in FIG. 17 (in FIG. 17, the light-receiving area E+F represents the light-receiving areas E of this embodiment and the light-receiving area G+H represents the light-receiving areas F of this embodiment). Therefore, the photoelectric conversion signal E and the photoelectric conversion signal F generated by the light-receiving surface 14 in this case are signals including only the stray light components. Therefore, the area γ is adjusted, for example, through simulations, such that photoelectric conversion signal F−photoelectric conversion signal E becomes zero. As a result, the area γ is detected so as to substantially equalize the light amounts of the stray light received by the light-receiving areas in accordance with the areas thereof, between E and F. Alternatively, the area γ can be detected through simulations, etc., based on light intensity distribution of the laser beam emitted from the semiconductor laser 2.

In the light-receiving area E, the light-receiving surface 14 receives a portion of the +first-order reflected light of zero-order and the +first-order reflected light of +first-order (shaded portion) of the +first-order reflected light from the target information recording layer (L0 or L1). In the light-receiving area F, the light-receiving surface 14 receives another portion of the +first-order reflected light of zero-order and the +first-order reflected light of −first-order (shaded portion) of the +first-order reflected light from the target information recording layer (L0 or L1). In the light-receiving area E and the light-receiving area F, the light-receiving surface 14 also receives the stray light from the non-target information recording layer (L1 or L0). The light-receiving surface 14 generates the photoelectric conversion signal E and the photoelectric conversion signal F corresponding to the light amounts of the +first-order reflected light and the stray light received in the light-receiving area E and the light-receiving area F, to be output to the operation circuit 20 (see FIG. 22 described later) that generates the tracking error signal in the subsequent stage.

The light-receiving surface 15 is adjacent to the light-receiving surface 11 with a predetermined interval on the opposite side of the light-receiving surface 14 and the whole light-receiving area is in square shape, for example. The light-receiving surface 15 includes a light-receiving area G (first light-receiving area, fifth light-receiving area) and a light-receiving area H (second light-receiving area, sixth light-receiving area) for receiving the −first-order reflected light. The light-receiving area G and the light-receiving area H are formed by dividing the whole light-receiving area of the light-receiving surface 15 into two areas to make the shape thereof into a rectangular shape. Specifically, the light-receiving area G and the light-receiving area H, into which the whole light-receiving area of the light-receiving surface 15 is divided by a first dividing line parallel to a line segment corresponding to a tangent line of the second adjacent track of the target information recording layer (L0 or L1) onto which the −first diffracted light is condensed. As a result of the division, the light-receiving area G becomes a rectangular shape; the length thereof in the dividing direction corresponding to a tangent line of the above second adjacent track is a length y3 equal to a longitudinal length of light-receiving area A+light-receiving area B (light-receiving area C+light-receiving area D) and equal to a longitudinal length of the conventional rectangular light-receiving area I'+J' shown in FIGS. 28 and 30; and the length thereof in the direction corresponding to the radius of the optical disc 90 is a length y4 shorter than a length of the short side of the conventional rectangular light-receiving area I'+J'. The light-receiving area H becomes a rectangular shape; the length thereof in the dividing direction corresponding to a tangent line of the above second adjacent track is a length y3 equal to a longitudinal length of light-receiving area A+light-receiving area B (light-receiving area C+light-receiving area D) and equal to a longitudinal length of the conventional rectangular light-receiving area K'+L' shown in FIGS. 28 and 30; and the length thereof in the direction corresponding to the radius of the optical disc 90 is a length y5 longer than a length of the short side of the conventional rectangular light-receiving area K'+L'. The length y4 of the light-receiving areas G and the length y5 of the light-receiving areas H are defined as follows, so as to substantially equalize the light amounts of the stray light received by the light-receiving areas in accordance with the areas thereof, between G and H.

As described above, in the light intensity distribution, the light intensity distribution of the stray light is highest at the center and becomes lower with distance from the center (see FIG. 21). Therefore, the light-receiving area G that is a shorter distance from the light-receiving surface 11 than the light-receiving area H is, receives the stray light higher in light than that received by the light-receiving area H. Therefore, if the light-receiving area G is equal in area to the light-receiving area H (if the whole light-receiving area of the light-receiving surface 15 is divided by a broken line shown in FIGS. 20 and 21), a light amount (Y4+Z4) of the stray light received by the light-receiving area G becomes greater than a light amount (X4) of the stray light received by the light-receiving area H in accordance with a difference in light intensity between the above two light-receiving areas. Therefore, in this embodiment, the area of the light-receiving area G is defined by the length y4 and the area of the light-receiving area H is defined by the length y5 so as to substantially equalize the light amounts of the stray light received by the light-receiving areas in accordance with the areas thereof, between G and H. It is assumed in this description that when the light-receiving area H receives a light amount X4+Z4 of the stray light and the light-receiving area G receives a light amount Y4 of the stray light, the light amounts X4+Z4 and Y4 of the stray light are substantially equal. It is also assumed that γ' is an area to be added to the area of the light-receiving area H to set the light amount of the stray light received by the light-receiving area H to X4+Z4 when the light-receiving area G is equal in area to the light-receiving area H. Conversely, γ' is an area to be subtracted from the area of the light-receiving area G to set the light amount of the stray light received by the light-receiving area G to Y4 when the light-receiving area G is equal in area to the light-receiving area H.

The length y5 of the light-receiving area H is obtained from $$y5 = \gamma'/y3 + y3/2$$
$$= (2 \cdot \gamma' + y3^2)/2 \cdot y3.$$

The length y4 of the light-receiving area G is obtained from $$y4 = y3 - y5$$
$$= (y3^2 - 2 \cdot \gamma')/2 \cdot y3.$$

When the length y5 of the light-receiving area H is set to a value obtained from the above equation, the area of the light-receiving area G and the area of the light-receiving area H are set such that the light amount of the stray light received by the light-receiving area G becomes Y4 and that the light amount of the stray light received by the light-receiving area H becomes X4+Z4. With regard to the length y4 of the light-receiving area G and the length y5 of the light-receiving area H, it is desirable that the dividing line of the light-receiving areas G and H defined by y4 and y5 be positioned between the −first-order reflected light of +first-order and the −first-order reflected light of −first-order. This is because when the dividing line of the light-receiving areas G and H defined by y4 and y5 is positioned between the −first-order reflected light of +first-order and the −first-order reflected light of −first-order, the light-receiving area G receives all the −first-order reflected light of +first-order; the light-receiving area H receives all the −first-order reflected light of −first-order; and more accurate tracking error signals can be detected. The above area γ' can be detected in the same way as the above area γ.

In the light-receiving area G, the light-receiving surface 15 receives a portion of the −first-order reflected light of zero-order and the −first-order reflected light of +first-order (shaded portion) of the −first-order reflected light from the target information recording layer (L0 or L1). In the light-receiving area H, the light-receiving surface 15 receives another portion of the −first-order reflected light of zero-order and the −first-order reflected light of −first-order (shaded portion) of the −first-order reflected light from the target information recording layer (L0 or L1). In the light-receiving area G and the light-receiving area H, the light-receiving surface 15 also receives the stray light from the non-target information recording layer (L1 or L0). The light-receiving surface 15 generates the photoelectric conversion signal G and the photoelectric conversion signal H corresponding to the light amounts of the −first-order reflected light and the stray light received in the light-receiving area G and the light-receiving area H to be output to the operation circuit 20 in the subsequent stage.

<Cancellation of Stray Light>

Figure 22:
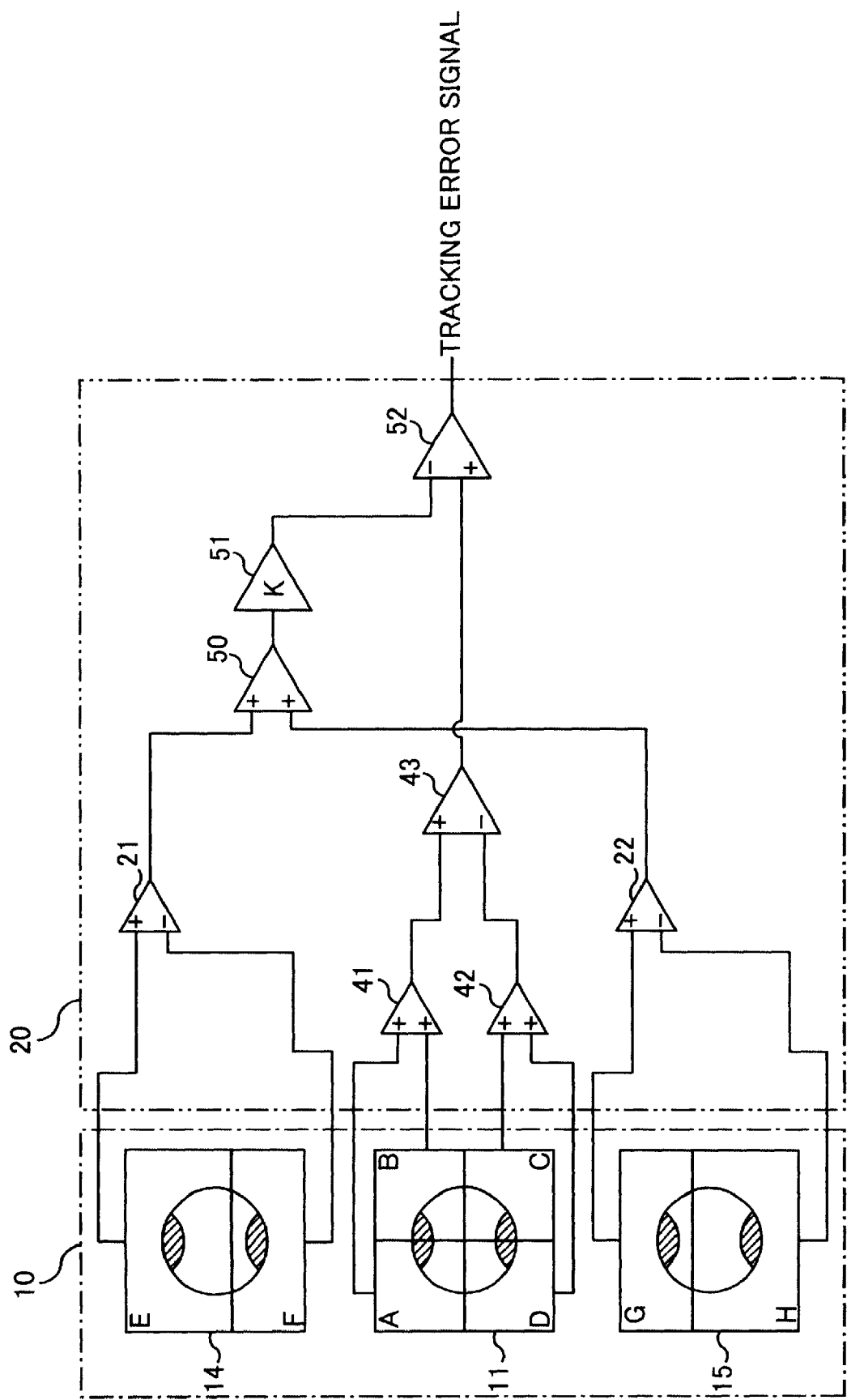
FIG. 22 is a circuit diagram of an overall configuration of an operation circuit that generates a tracking error signal.

The effects of the light reception result of the photodetector 10 according to one embodiment of the present invention will hereinafter be described with reference to FIG. 22, and FIG. 20 as needed. FIG. 22 is a circuit diagram of an example of an overall configuration of the operation circuit 20 that generates a tracking error signal based on the light reception result of the photodetector 10 according to one embodiment of the present invention. In the operation circuit 20 shown in FIG. 22, the same reference numerals are added to the same constituent elements as those in the operation circuit 40 shown in FIG. 18 and the description thereof will be omitted.

The operation circuit 20 includes subtracters 21, 22, 43, 52, adders 41, 42, 50, and an amplifier 51.

The subtracter 21 is disposed for generating a signal corresponding to the light amount of the +first-order reflected light with the stray light canceled out, which is a basis of the tracking error signal. The subtracter 21 subtracts: the photoelectric conversion signal F(1) corresponding to the light amounts of another portion of the +first-order reflected light of zero-order and the +first-order reflected light of −first-order and the photoelectric conversion signal F(2) corresponding to the light amount of the stray light received in the light-receiving area F; from the photoelectric conversion signal E(1) corresponding to the light amounts of a portion of the +first-order reflected light of zero-order and the +first-order reflected light of +first-order and the photoelectric conversion signal E(2) corresponding to the light amount of the stray light received in the light-receiving area E, of the light-receiving surface 14 of the photodetector 10. Since the area of the light-receiving area E and the area of the light-receiving area F are set such that the light amount (X3+Z3) of the stray light received by the light-receiving area E in accordance with the area thereof becomes substantially equal to the light amount (Y3) of the stray light received by the light-receiving area F in accordance with the area thereof, the photoelectric conversion signal E(2) and the photoelectric conversion signal F(2) are substantially equal in terms of corresponding light amount (X3+Z3 or Y3). As a result, the photoelectric conversion signal E(2) and the photoelectric conversion signal F(2) are canceled out with each other through the subtracting process of the subtracter 21. That is, the stray light received by the light-receiving area E and the stray light received by the light-receiving area F of the light receiving surface 14 are canceled out with each other. Therefore, the subtraction result of the subtracter 21 is photoelectric conversion signal E(1)−photoelectric conversion signal F(1), which corresponds to the light amount of the +first-order reflected light with the stray light canceled out, and there can be prevented or alleviated the effects of the stray light received in the light-receiving areas E and F of the light-receiving surface 14 on the tracking error signal.

The subtracter 22 is disposed for generating a signal corresponding to the light amount of the −first-order reflected light with the stray light canceled out, which is a basis of the tracking error signal. The subtracter 22 subtracts: the photoelectric conversion signal H(1) corresponding to the light amounts of another portion of the −first-order reflected light of zero-order and the −first-order reflected light of −first-order and the photoelectric conversion signal H(2) corresponding to the light amount of the stray light received in the light-receiving area H; from the photoelectric conversion signal G(1) corresponding to the light amounts of a portion of the −first-order reflected light of zero-order and the −first-order reflected light of +first-order and the photoelectric conversion signal G(2) corresponding to the light amount of the stray light received in the light-receiving area G, of the light-receiving surface 15 of the photodetector 10. Since the area of the light-receiving area G and the area of the light-receiving area H are set such that the light amount (Y4) of the stray light received by the light-receiving area G in accordance with the area thereof becomes substantially equal to the light amount (X4+Z4) of the stray light received by the light-receiving area H in accordance with the area thereof, the photoelectric conversion signal G(2) and the photoelectric conversion signal H(2) are substantially equal in terms of the corresponding light amount (Y4 or X4+Z4). As a result, the photoelectric conversion signal G(2) and the photoelectric conversion signal H(2) are canceled out with each other through the subtracting process of the subtracter 22. That is, the stray light received by the light-receiving area G and the stray light received by the light-receiving area H of the light receiving surface 15 are canceled out with each other. Therefore, the subtraction result of the subtracter 22 is photoelectric conversion signal G(1)−photoelectric conversion signal H(1), which corresponds to the light amount of the −first-order reflected light with the stray light canceled out, and there can be prevented or alleviated the effects of the stray light received in the light-receiving area G and the light-receiving area H of the light-receiving surface 15 on the tracking error signal.

The subtraction result of the subtracter 52, i.e., a tracking error signal is {(photoelectric conversion signal A+photoelectric conversion signal B)−(photoelectric conversion signal C+photoelectric conversion signal D)}−K·{(photoelectric conversion signal E(1)−photoelectric conversion signal F(1))+(photoelectric conversion signal G(1)−photoelectric conversion signal H(1))}, which is a signal exhibiting the cancellation out of the stray lights received: by the light-receiving area E and the light-receiving area F of the light-receiving surface 14; and the stray light received by the light-receiving area G and the light-receiving area H of the light-receiving surface 15. That is, there is generated a tracking error signal that accurately corresponds to the displacement of the zero-order light with respect to the target track of the target information recording layer (L0 or L1). The zero-order light can accurately be focused on and driven to follow one information recording layer (L0 or L1) of the optical disc 90 and information can favorably be reproduced from or recorded in the optical disc 90 by performing the tracking control based on this tracking error signal and the focus control based on the focus error signal {(photoelectric conversion signal A+photoelectric conversion signal C)−(photoelectric conversion signal B+photoelectric conversion signal D)}. That is, the same effects as the above embodiments can be achieved.

Second Other Embodiment

Although the areas of the light-receiving areas G and H are set so as to substantially equalize the light amounts of the stray light received by the light-receiving areas in accordance with the areas thereof, between G, H and E, F according to the above embodiment described in FIG. 15, this is not a limitation. Similarly, although the areas of the light-receiving areas I and J are set so as to substantially equalize the light amounts of the stray light received by the light-receiving areas in accordance with the areas thereof, between I, J and K, L, this is not a limitation.

Figure 23:
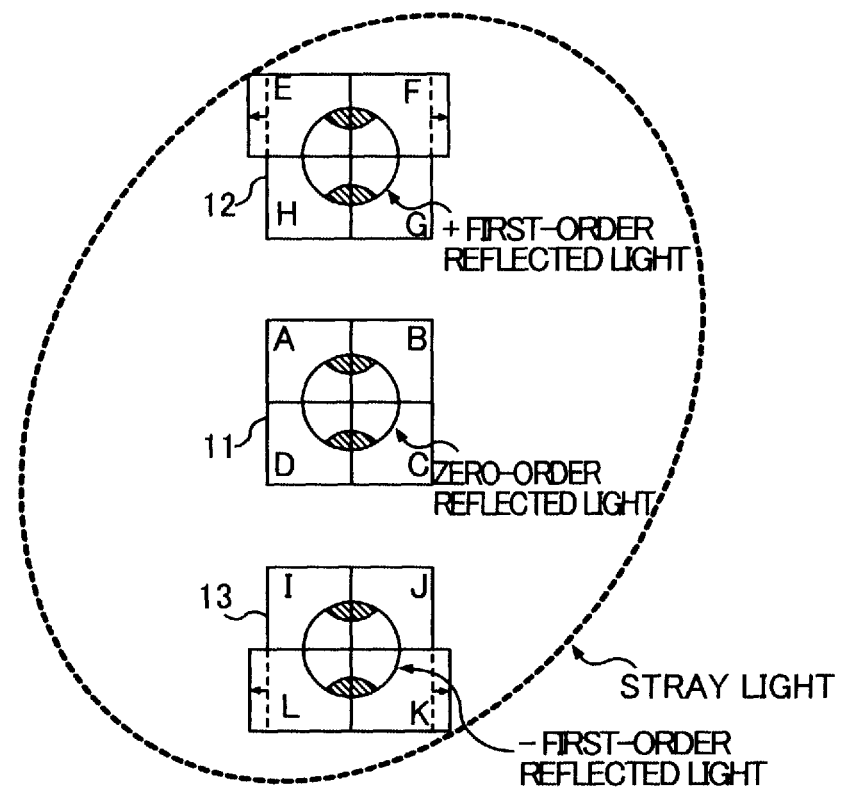
FIG. 23 is a diagram of another embodiment of the light-receiving surfaces included in the photodetector according to one embodiment of the present invention.

For example, as shown in FIG. 23, the areas of the light-receiving areas E and F that are a longer distance from the light-receiving surface 11 than the light-receiving areas G and H are may be set so as to make the light amount of the stray light received by the light-receiving area E+F substantially equal to the light amount (Y1+Z1) of the stray light received by the light-receiving area G+H, and the areas of the light-receiving areas E and F to substantially equalize the above light amounts of the stray light can be set by defining the lengths of the light-receiving areas E and F in a dividing direction corresponding to a tangent line of the first adjacent track. Similarly, as shown in FIG. 23, the areas of the light-receiving areas K and L that is a longer distance from the light-receiving surface 11 than the light-receiving areas I and J may be set so as to make the light amount of the stray light received by the light-receiving area K+L substantially equal to the light amount (Y2+Z2) of the stray light received by the light-receiving area I+J, by defining the lengths of the light-receiving areas K and L in a dividing direction corresponding to a tangent line of the second adjacent track. The same method as the above embodiment can be used to define the lengths of the light-receiving areas E, F, K and L in the dividing directions corresponding to tangent lines of the first and second adjacent tracks.

By setting the areas of the light-receiving area E, the light-receiving area F, the light-receiving area K, and the light-receiving area L in this way, the light-receiving surface 12 and the light-receiving surface 13 can receive all the ±first-order reflected light of zero-order with astigmatism introduced by the detection lens 9, and a more accurate focus error signal can be detected based on the differential astigmatic method.

Although either the areas of the light-receiving area E and the light-receiving area F or the areas of the light-receiving area G and the light-receiving area H are set so as to substantially equalize the light amounts of the stray light received by the light-receiving areas in accordance with the areas thereof, between E, F and G, H according to the embodiments of FIGS. 23 and 15, this is not a limitation. Similarly, although either the areas of the light-receiving area I and the light-receiving area J or the areas of the light-receiving area K and the light-receiving area L are set so as to substantially equalize the light amounts of the stray light received by the light-receiving areas in accordance with the areas thereof, between I, J and K, L, this is not a limitation.

Figure 24:
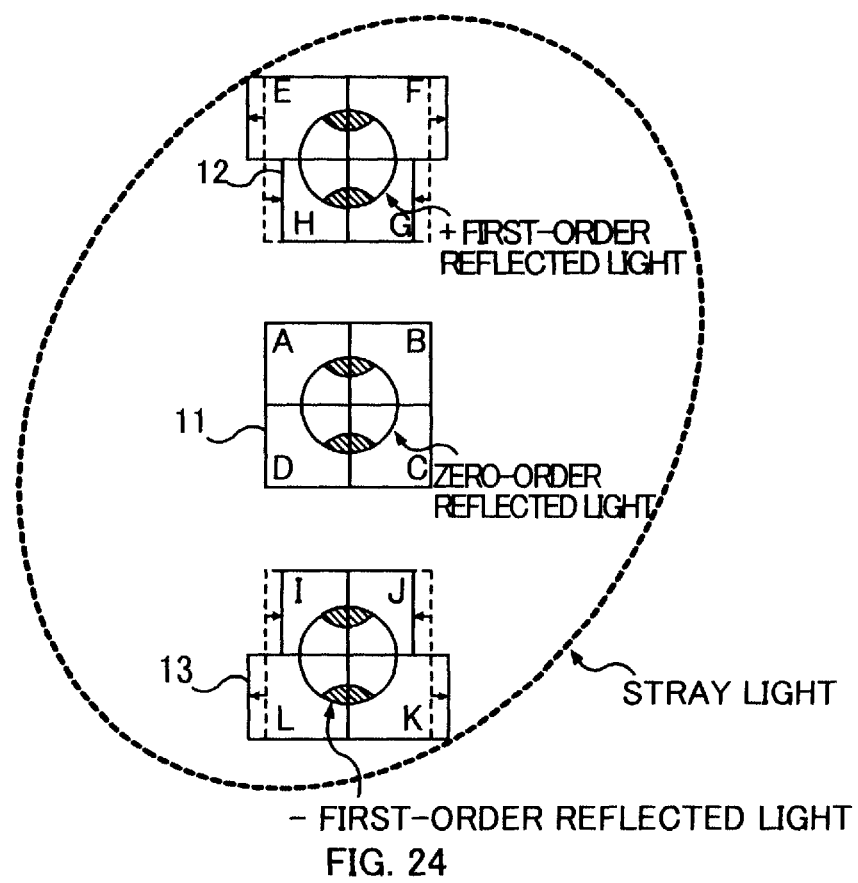
FIG. 24 is a diagram of another embodiment of the light-receiving surfaces included in the photodetector according to one embodiment of the present invention.

For example, as shown in FIG. 24, the areas of the light-receiving areas E to H may be set by defining the lengths of the light-receiving areas E to H in a dividing direction corresponding to a tangent line of the first adjacent track so as to substantially equalize the light amounts of the stray light received by the light-receiving areas in accordance with the areas thereof, between E, F and G, H. Similarly, as shown in FIG. 24, the areas of the light-receiving areas I to L may be set by defining the lengths of the light-receiving areas I to L in a dividing direction corresponding to a tangent line of the second adjacent track so as to substantially equalize the light amounts of the stray light received by the light-receiving areas in accordance with the areas thereof, between I, J and K, L. The same method as the above embodiment can be used to define the lengths of the light-receiving areas E to H and the light-receiving areas I to L in the dividing directions corresponding to tangent lines of the first and second adjacent tracks.

According to the above embodiment described in FIG. 15, although the lengths of the light-receiving area G and the light-receiving area H in the direction corresponding to a tangent line of the first adjacent track are defined to set the areas of the light-receiving area G and the light-receiving area H so as to substantially equalize the light amounts of the stray light received by the light-receiving areas in accordance with the areas thereof, between E, F and G, H, this is not a limitation. Similarly, although the lengths of the light-receiving area I and the light-receiving area J in the direction corresponding to a tangent line of the second adjacent track are defined to set the areas of the light-receiving area I and the light-receiving area J so as to substantially equalize the light amounts of the stray light received by the light-receiving areas in accordance with the areas thereof, between I, J and K, L, this is not a limitation.

Figure 25:
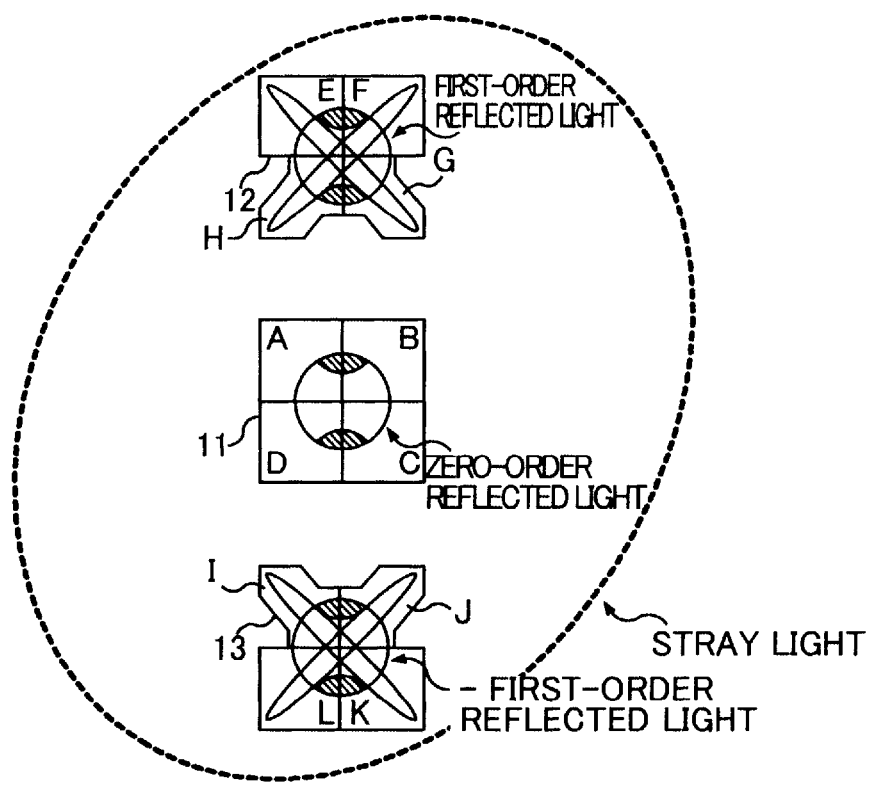
FIG. 25 is a diagram of another embodiment of the light-receiving surfaces included in the photodetector according to one embodiment of the present invention.

For example, as shown in FIG. 25, by removing areas other than light-receiving areas of the +first-order reflected light of zero-order changing due to the astigmatism introduced by the detection lens 9, the areas of the light-receiving area G and the light-receiving area H may be set so as to substantially equalize the light amounts of the stray light received by the light-receiving areas in accordance with the areas thereof, between G, H and E, F. Similarly, as shown in FIG. 25, by removing areas other than light-receiving areas of the −first-order reflected light of zero-order changing due to the astigmatism being introduced by the detection lens 9, the areas of the light-receiving area I and the light-receiving area J may be set so as to substantially equalize the light amounts of the stray light received by the light-receiving areas in accordance with the areas thereof, between I, J and K, L. The areas of the light-receiving areas G, H, I and J can be set through simulations, etc., of various shapes of the light-receiving areas G, H, I and J. By setting the areas of the light-receiving areas G, H, I and J in this way, the same effects as in the case of the embodiment shown in FIG. 23 can be achieved, and the sizes of the light-receiving surfaces 12 and 13 can be prevented from increasing. The embodiment shown in FIG. 25 can be applied to the above embodiments shown in FIGS. 23 and 24.

Third Other embodiment

According to the above embodiment described with reference to FIG. 20, although the whole light-receiving area is divided in the dividing direction corresponding to a tangent line of the first adjacent track to set the areas of the light-receiving area E and the light-receiving area F such that the stray light received by the light-receiving area E in accordance with the area thereof becomes substantially equal in light amount to the stray light received by the light-receiving area F in accordance with the area thereof, this is not a limitation. Similarly, although the whole light-receiving area is divided in the dividing direction corresponding to a tangent line of the second adjacent track to set the areas of the light-receiving area G and the light-receiving area H such that the stray light received by the light-receiving area G in accordance with the area thereof becomes substantially equal in light amount to the stray light received by the light-receiving area H in accordance with the area thereof according to the above embodiment described in FIG. 20, this is not a limitation.

Figure 26:
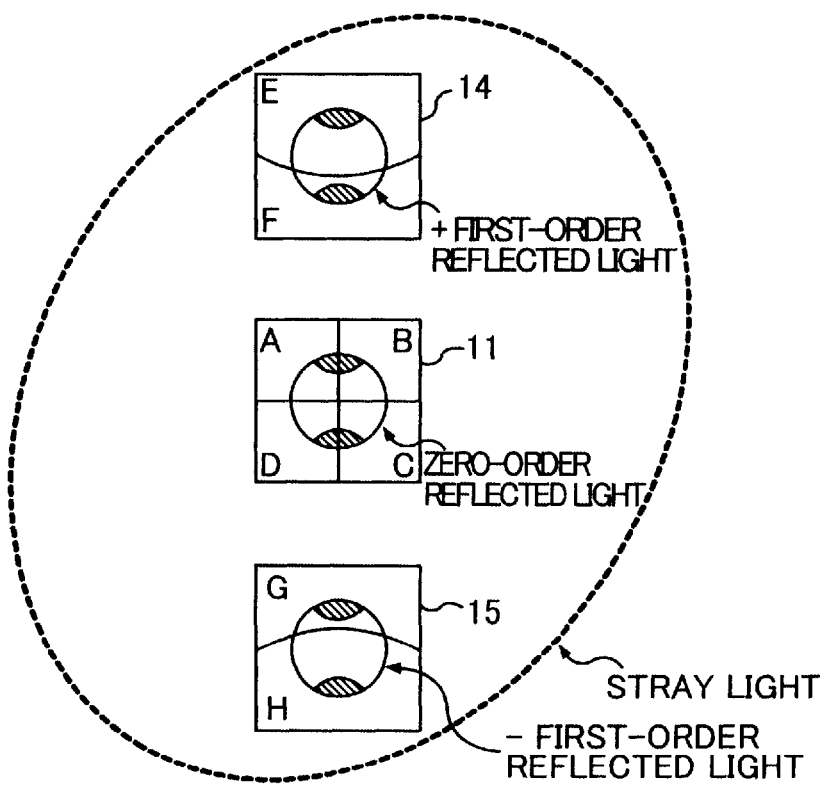
FIG. 26 is a diagram of another embodiment of the light-receiving surfaces included in the photodetector according to one embodiment of the present invention.
Figure 27:
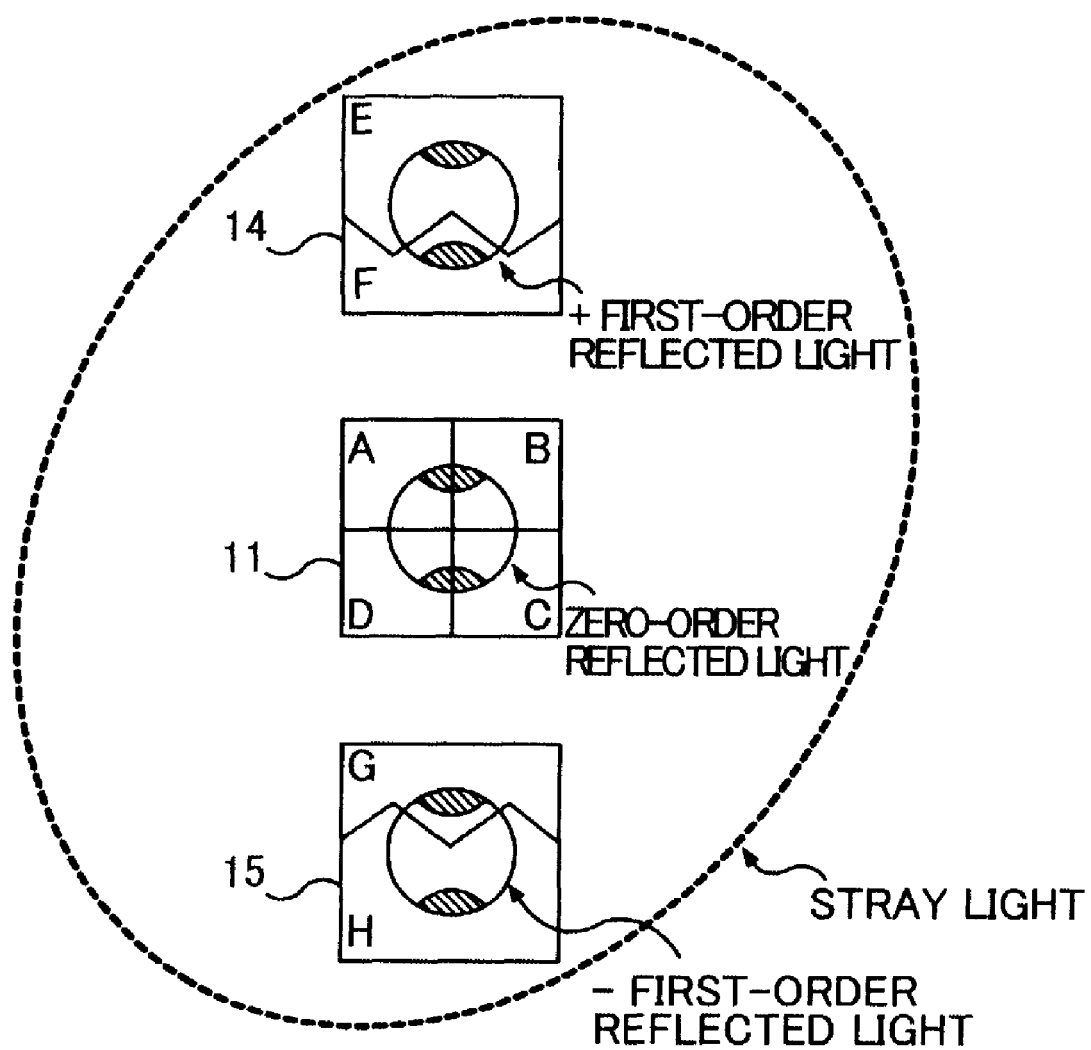
FIG. 27 is a diagram of another embodiment of the light-receiving surfaces included in the photodetector according to one embodiment of the present invention.
Figure 28:
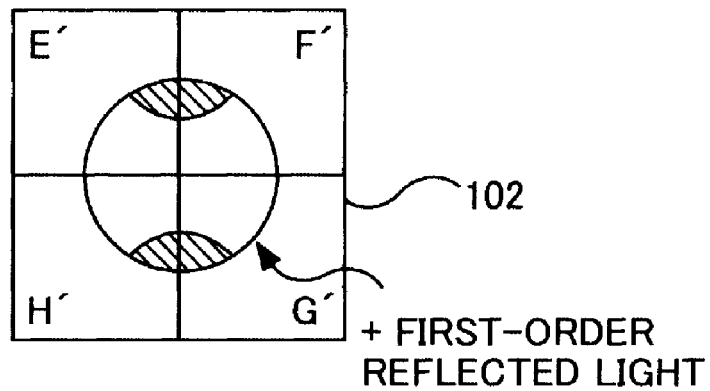
FIG. 28 is a diagram of light-receiving surfaces included in a photodetector.
Figure 28:
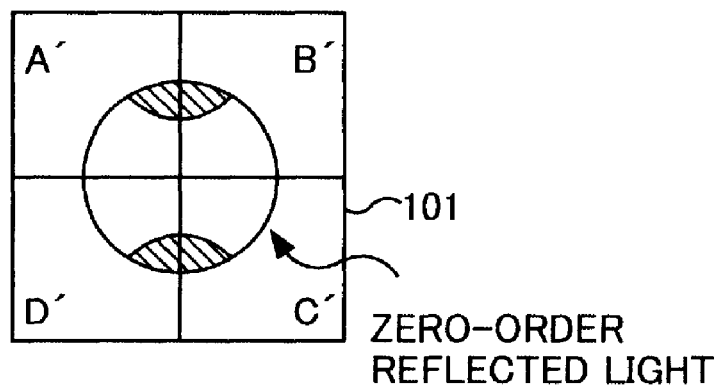
Figure 28:
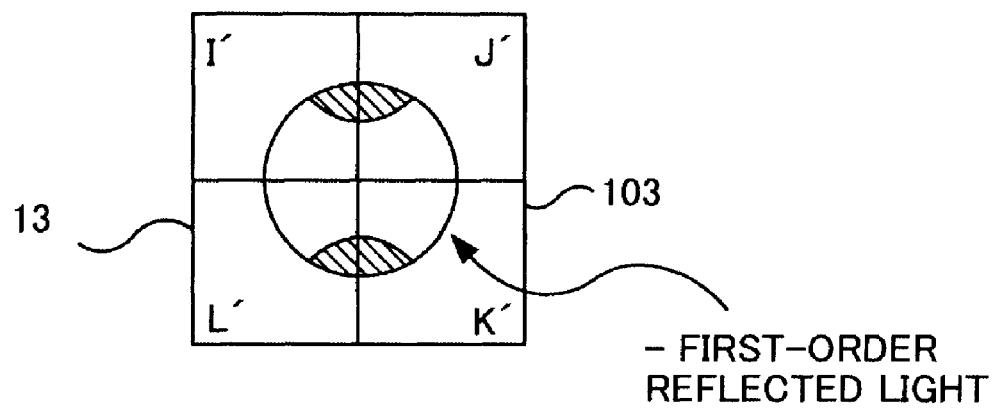
Figure 29A:
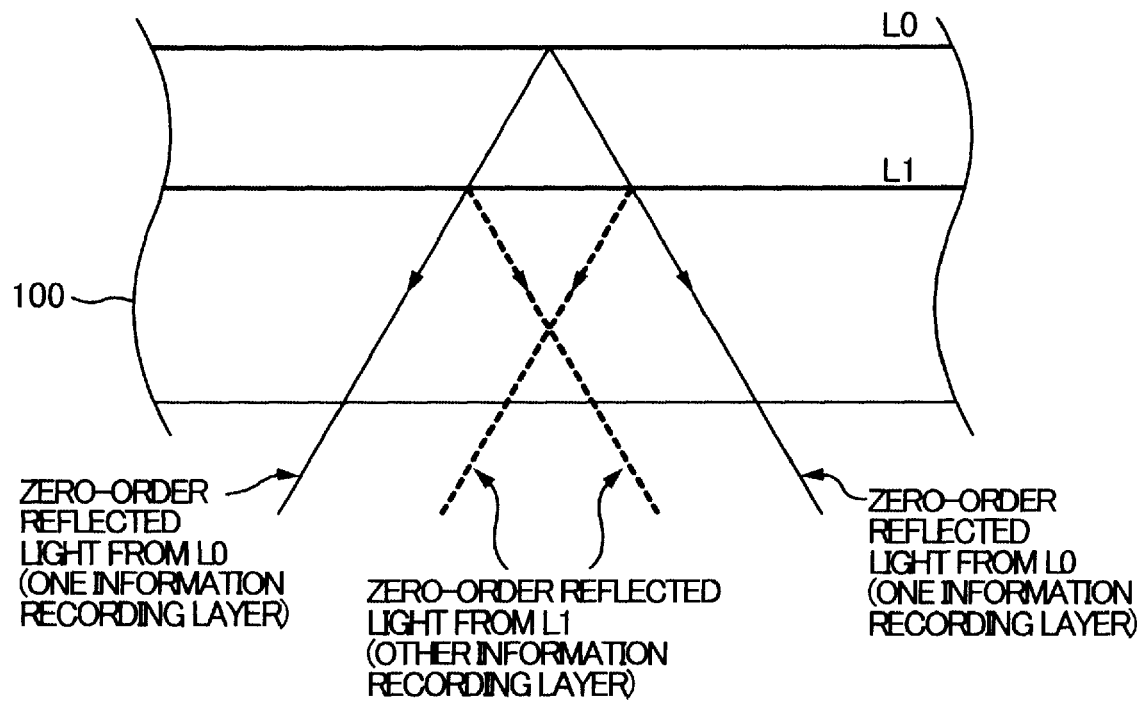
FIG. 29A is a diagram showing a state where a laser beam is applied to an information recording layer of a multilayer optical disc.
Figure 29B:
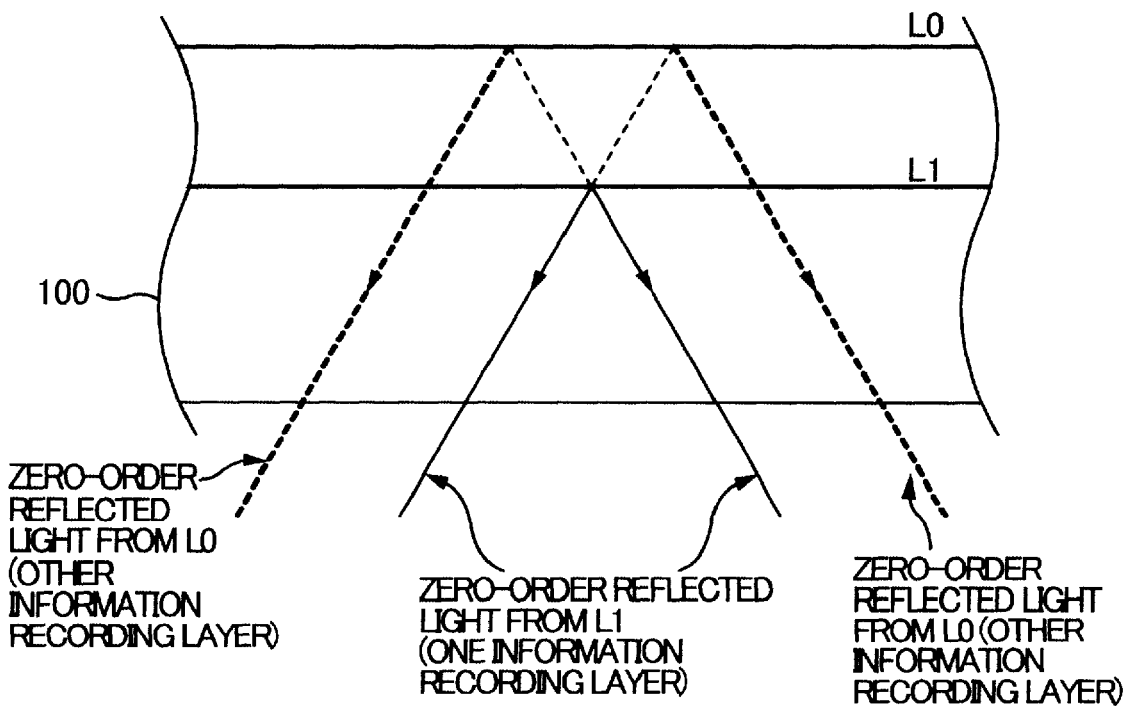
FIG. 29B is another diagram showing a state where a laser beam is applied to an information recording layer of a multilayer optical disc.
Figure 30:
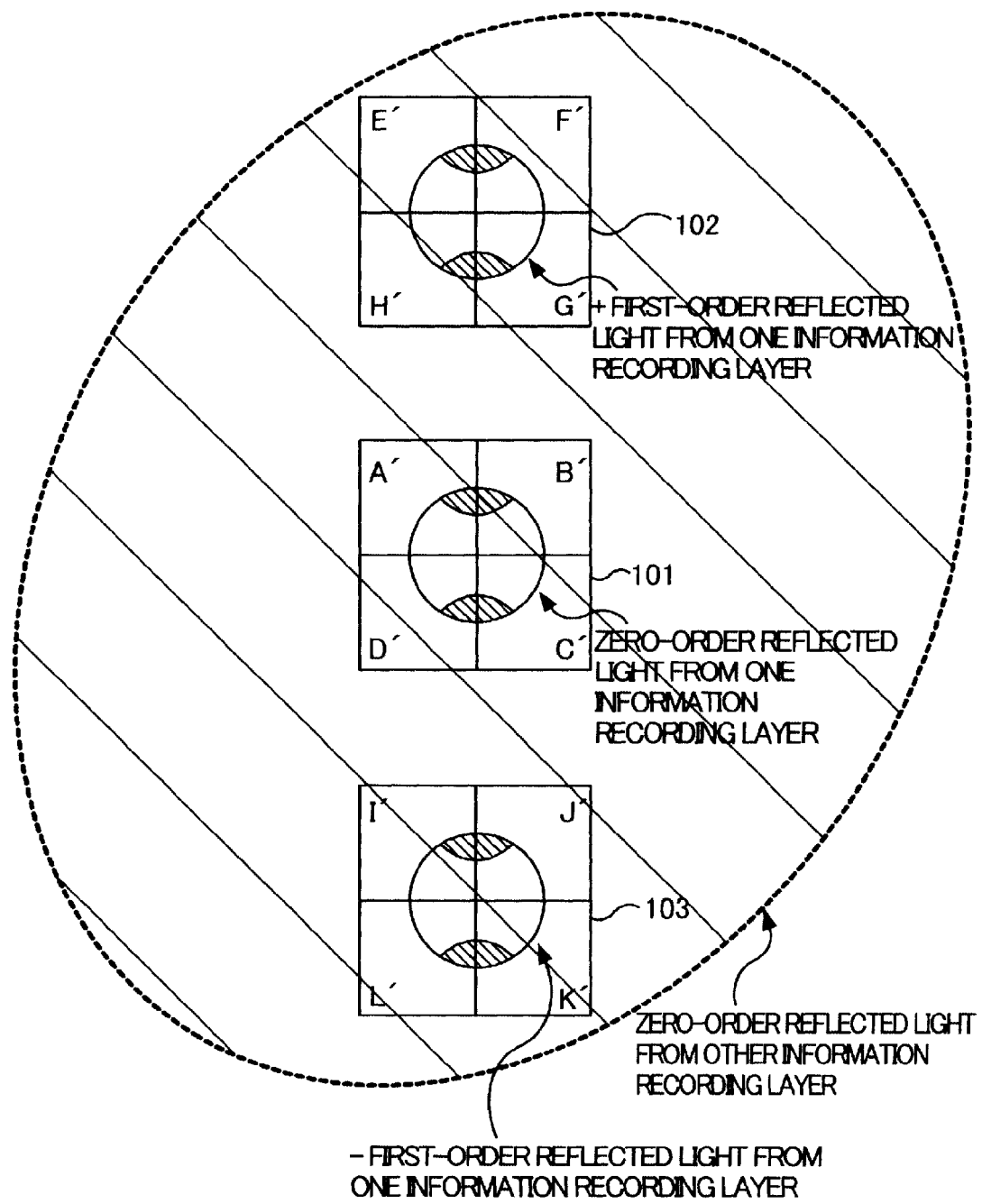
FIG. 30 is a diagram showing a state where stray light is applied to light-receiving surfaces of a photodetector.

For example, as shown in FIG. 26, the areas of the light-receiving area E and the light-receiving area F may be set by dividing the whole light-receiving area with a curved dividing line not corresponding to the first adjacent track direction. The areas of the light-receiving area E and the light-receiving area F shown in FIG. 26 are set by changing the above x4 and x5 in accordance with the shape-change of the dividing line defined by the x4 and x5, where x4 is the length of the light-receiving area E and x5 is the length of the light-receiving area F in the direction corresponding to the radius of the optical disc 90. The lengths x4 and x5 are changed such that the above area γ is added to the area of the light-receiving area E when the light-receiving area E is equal in area to the light-receiving area F. Conversely, the lengths x4 and x5 are changed such that the above area γ is subtracted from the area of the light-receiving area F when the light-receiving area E is equal in area to the light-receiving area F. Similarly, the areas of the light-receiving area G and the light-receiving area H may be set by dividing the whole light-receiving area with a curved dividing line not corresponding to the second adjacent track direction. The areas of the light-receiving area G and the light-receiving area H shown in FIG. 26 are set by changing the above y4 and y5 in accordance with the shape-change of the dividing line defined by the y4 and y5, where y4 is the length of the light-receiving area G and y5 is the length of the light-receiving area H in the direction corresponding to the radius of the optical disc 90. The lengths y4 and y5 are changed such that the above area γ is added to the area of the light-receiving area H when the light-receiving area G is equal in equal to the light-receiving area H. Conversely, the lengths y4 and y5 are changed such that the above area γ is subtracted from the area of the light-receiving area H when the light-receiving area G is equal in area to the light-receiving area H. By setting the areas of the light-receiving areas E to H in this way, the same effects as in the case of the embodiment shown in FIG. 20 can be achieved. For example, as shown in FIG. 27, the same effects can be achieved even when the areas of the light-receiving areas E to H are set by dividing the whole light-receiving area in a dividing direction in the shape of a triangular waveform not corresponding to the first adjacent track direction. The above embodiments shown in FIG. 15, FIGS. 23 to 25 and FIGS. 20, 26, and 27 can be combined.

Although the stray light from the other information recording layer of the optical disc 90 is canceled out in the description of the above embodiments, etc., the stray light may not completely be canceled out because of some variations, manufacturing errors, etc., of the adder 44, etc., making up the operation circuit 40, etc., which are not according to the present invention. However, since the areas of the light-receiving surfaces 12, 13 etc., are set for the purpose of canceling out the stray light, the photodetector 10 according to one embodiment of the present invention can at least reduce the stray light and is more useful than conventional photodetectors.

The above embodiments of the present invention are simply for facilitating the understanding of the present invention and are not in any way to be construed as limiting the present invention. The present invention may variously be changed or altered without departing from its spirit and encompass equivalents thereof.

What is claimed is:

1. A photodetector comprising:
   a first light-receiving surface configured to receive reflected light of zero-order light generated based on a laser beam, from one information recording layer of a multilayer optical disc;
   a second light-receiving surface that is adjacent to the first light-receiving surface with a predetermined interval, the second light-receiving surface being configured to receive reflected light of diffracted light generated based on the laser beam, from the one information recording layer; and
   a third light-receiving surface for canceling out reflected light of the zero-order light from other information recording layer of the multilayer optical disc, received by the first light-receiving surface or the second light-receiving surface, the third light-receiving surface being configured to receive the reflected light of the zero-order light from other information recording layer, wherein
   the third light-receiving surface is disposed on a portion of the second light-receiving surface so as to cancel out the reflected light of the zero-order light from the other information recording layer of the multilayer optical disc, received by the second light-receiving surface.

2. The photodetector of claim 1, wherein
   the reflected light of the diffracted light includes first reflected light of zero-order and diffracted second reflected light that are generated by reflection of the diffracted light on the one information recording layer, and wherein
   the third light-receiving surface is disposed on an area other than an area for receiving the second reflected light in the second light-receiving surface when the zero-order light is focused on the one information recording layer.

3. The photodetector of claim 1, wherein
   the reflected light of the diffracted light includes first reflected light of zero-order and diffracted second reflected light that are generated by reflection of the diffracted light on the one information recording layer, and wherein
   the third light-receiving surface is disposed on an area other than an area for receiving the first reflected light and the second reflected light in the second light-receiving surface when the zero-order light is focused on the one information recording layer.

4. The photodetector of claim 1, wherein
   the second light-receiving surface includes a first light-receiving area and a second light-receiving area for executing tracking control based on a differential push-pull method, and wherein
   the third light-receiving surface is disposed on each of the first light-receiving area and the second light-receiving area.

5. The photodetector of claim 1, wherein
   the diffracted light includes diffracted light of a positive diffraction order and diffracted light of a negative diffraction order generated based on the laser beam, wherein
   the second light-receiving surface includes:
      a fourth light-receiving surface that is adjacent to the first light-receiving surface with a predetermined interval, the fourth light-receiving surface being configured to receive reflected light of the diffracted light of the positive diffraction order from the one information recording layer; and
      a fifth light-receiving surface that is adjacent to the first light-receiving surface with a predetermined interval on the opposite side of the fourth light-receiving surface, the fifth light-receiving surface being configured to receive reflected light of the diffracted light of the negative diffraction order from the one information recording layer, and wherein
   the third light-receiving surface includes:
      a sixth light-receiving surface disposed on a portion of the fourth light-receiving surface, the sixth light-receiving surface being configured to receive the reflected light of the zero-order light from the other information recording layer, for canceling out the reflected light of the zero-order light from the other information recording layer, received by the fourth light-receiving surface; and
      a seventh light-receiving surface disposed on a portion of the fifth light-receiving surface, the seventh light-receiving surface being configured to receive the reflected light of the zero-order light from the other information recording layer, for canceling out the reflected light of the zero-order light from the other information recording layer, received by the fifth light-receiving surface.

6. A photodetector comprising:
   a first light-receiving surface configured to receive reflected light of zero-order light generated based on a laser beam, from one information recording layer of a multilayer optical disc;
   a second light-receiving surface that is adjacent to the first light-receiving surface with a predetermined interval, the second light-receiving surface being configured to receive reflected light of diffracted light generated based on the laser beam, from the one information recording layer; and
   a third light-receiving surface for canceling out reflected light of the zero-order light from other information recording layer of the multilayer optical disc, received by the first light-receiving surface or the second light-receiving surface, the third light-receiving surface being configured to receive the reflected light of the zero-order light from other information recording layer, wherein
   the third light-receiving surface is disposed on a portion of the first light-receiving surface so as to cancel out the reflected light of the zero-order light from the other information recording layer of the multilayer optical disc, received by the first light-receiving surface.

7. The photodetector of claim 6, wherein
   the reflected light of the zero-order light includes first reflected light of zero-order and diffracted second reflected light that are generated by reflection of the zero-order light on the one information recording layer, and wherein
   the third light-receiving surface is disposed on an area other than an area for receiving the first reflected light and the second reflected light in the first light-receiving surface when the zero-order light is focused on the one information recording layer.

8. An optical pickup apparatus comprising:
a first light-receiving surface configured to receive reflected light of zero-order light generated based on a laser beam, from one information recording layer of a multilayer optical disc;
a second light-receiving surface that is adjacent to the first light-receiving surface with a predetermined interval, the second light-receiving surface being configured to receive reflected light of diffracted light generated based on the laser beam, from the one information recording layer; and
a third light-receiving surface for canceling out reflected light of the zero-order light from other information recording layer of the multilayer optical disc, received by the first light-receiving surface or the second light-receiving surface, the third light-receiving surface being configured to receive the reflected light of the zero-order light from other information recording layer, wherein
the third light-receiving surface is disposed on a portion of the second light-receiving surface so as to cancel out the reflected light of the zero-order light from the other information recording layer of the multilayer optical disc, received by the second light-receiving surface.

9. A photodetector comprising:
a first light-receiving surface configured to receive reflected light of zero-order light generated based on a laser beam, from one information recording layer of a multilayer optical disc; and
a second light-receiving surface that is adjacent to the first light-receiving surface with a predetermined interval, the second light-receiving surface comprising
a first light-receiving area including a light-receiving area configured to receive a portion of first reflected light of zero-order and second reflected light of a positive diffraction order, and
a second light-receiving area including a light-receiving area configured to receive other portion of the first reflected light and third reflected light of a negative diffraction order,
all the reflected lights being generated by reflection of diffracted light generated based on the laser beam, on the one information recording layer,
the first light-receiving area and the second light-receiving area having areas that substantially equalize light amounts of reflected light of the zero-order light from other information recording layer of the multilayer optical disc, received: by the first light-receiving area; and the second light-receiving area.

10. The photodetector of claim 9, wherein
an area of one light-receiving area, which is a shorter distance from the first light-receiving surface, of the first light-receiving area and the second light-receiving area is set smaller than an area of the other light-receiving area in accordance with a light intensity of the reflected light of the zero-order light from the other information recording layer.

11. The photodetector of claim 9, wherein
the first light-receiving area and the second light-receiving area
are light-receiving areas formed by dividing a whole light-receiving area of the second light-receiving surface with a first linear dividing line and receive substantially the same light amounts of the first reflected light when the zero-order light is focused on the one information recording layer, wherein
the first light-receiving area
includes light-receiving areas formed by dividing a whole light-receiving area of the first light-receiving area with a second dividing line orthogonal to the first dividing line and
receives substantially the same light amount of the first reflected light received by the first light-receiving area in each light-receiving area divided with the second dividing line, and wherein
the second light-receiving area
includes light-receiving areas formed by dividing a whole light-receiving area of the second light-receiving area with a third dividing line orthogonal to the first dividing line and
receives substantially the same light amount of the first reflected light received by the second light-receiving area in each light-receiving area divided with the third dividing line.

12. The photodetector of claim 9, wherein
the diffracted light includes diffracted light of a positive diffraction order and diffracted light of a negative diffraction order generated based on the laser beam, wherein
the second light-receiving surface includes a third light-receiving surface adjacent to the first light-receiving surface with a predetermined interval and a fourth light-receiving surface adjacent to the first light-receiving surface with a predetermined interval on the opposite side of the third light-receiving surface, wherein
the third light-receiving surface includes a third light-receiving area and a fourth light-receiving area, wherein
the fourth light-receiving surface includes a fifth light-receiving area and a sixth light-receiving area, wherein
the third light-receiving area is a light-receiving area, corresponding to the first light-receiving area, including a light-receiving area configured to receive a portion of fourth reflected light of zero-order and fifth reflected light of a positive diffraction order that are generated by reflection of the diffracted light of the positive diffraction order on the one information recording layer, wherein
the fourth light-receiving area is a light-receiving area, corresponding to the second light-receiving area, including a light-receiving area configured to receive other portion of the fourth reflected light and sixth reflected light of a negative diffraction order, wherein
the fifth light-receiving area is a light-receiving area, corresponding to the first light-receiving area, including a light-receiving area configured to receive a portion of seventh reflected light of zero-order and eighth reflected light of a positive diffraction order that are generated by reflection of the diffracted light of the negative diffraction order on the one information recording layer, and wherein
the sixth light-receiving area is a light-receiving area, corresponding to the second light-receiving area, including a light-receiving area configured to receive other portion of the seventh reflected light and ninth reflected light of a negative diffraction order.

13. An optical pickup apparatus comprising the photodetector of claim 9.

* * * * *